United States Patent
van't Schip

(10) Patent No.: US 9,090,022 B1
(45) Date of Patent: Jul. 28, 2015

(54) BELT SPLICING APPARATUS FOR CONVEYOR BELTS

(75) Inventor: Joannes Stefanus van't Schip, Ionia, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 862 days.

(21) Appl. No.: 12/885,377

(22) Filed: Sep. 17, 2010

Related U.S. Application Data

(60) Provisional application No. 61/243,415, filed on Sep. 17, 2009.

(51) Int. Cl.
*B29C 65/20* (2006.01)
*B29C 65/00* (2006.01)

(52) U.S. Cl.
CPC ............. *B29C 66/4324* (2013.01); *B29C 66/95* (2013.01)

(58) Field of Classification Search
CPC  B29C 65/20; B29C 65/2092; B29C 66/4324; B29C 66/8241; B29C 66/855
USPC ............................................... 156/228, 583.1
See application file for complete search history.

(56) References Cited

U.S. PATENT DOCUMENTS

| | | | |
|---|---|---|---|
| 2,248,499 A | 7/1941 | Heintz | |
| 2,725,091 A | 11/1955 | Miner et al. | |
| 3,547,743 A | 12/1970 | Tunner | |
| 3,969,051 A * | 7/1976 | Hovila | 425/11 |
| 3,986,765 A | 10/1976 | Shaffer et al. | |
| 4,193,341 A | 3/1980 | Clements et al. | |
| 4,346,287 A | 8/1982 | Desloge | |
| 4,393,766 A | 7/1983 | Thies | |
| 4,423,674 A | 1/1984 | Thies | |
| 4,430,146 A | 2/1984 | Johnson | |
| 4,900,270 A | 2/1990 | Edwards et al. | |

(Continued)

FOREIGN PATENT DOCUMENTS

| | | |
|---|---|---|
| DE | 2 304 045 | 5/1974 |
| DE | 201 00 627 | 5/2001 |
| EP | 1 306 579 | 5/2003 |

OTHER PUBLICATIONS

Brochure for "MPX An Almex Lightweight Product" issued by Shaw Almex Industries, Jan. 2009 (1 page).

(Continued)

*Primary Examiner* — Mark A Osele
(74) *Attorney, Agent, or Firm* — Fitch, Even, Tabin & Flannery LLP

(57) ABSTRACT

A portable belt splicing apparatus is provided for joining the ends of one or more conveyor belts together. In one form, the belt splicing apparatus has upper and lower platens, with one formed of a metallic material that allows for operational deflection of the platens under elevated operation pressures while resisting permanent deformation upon being subjected to elevated operation temperatures. An elongate central region of the platens is heated by a heating element and the metallic material restricts the flow of heat from the elongate central region to elongate side edge portions so that the side edge portions remain cooler. In another form, a self-contained portable conveyor belt splicing apparatus is provided having an on-board fan device for rapid cooling of the clamped belt end and platens. An on-board control system is configured to receive power from different types of standard power supplies and supplies power to on-board components.

12 Claims, 28 Drawing Sheets

(56) References Cited

U.S. PATENT DOCUMENTS

| | | |
|---|---|---|
| 5,158,132 A | 10/1992 | Guillemot |
| 5,562,796 A | 10/1996 | Ertel |
| 5,714,738 A | 2/1998 | Hauschulz et al. |
| 5,929,386 A | 7/1999 | Hornick |
| 5,973,296 A | 10/1999 | Juliano et al. |
| 6,002,103 A | 12/1999 | Thommes |
| 6,109,977 A | 8/2000 | Baxter et al. |
| 6,227,881 B1 | 5/2001 | Tharp et al. |
| 6,228,200 B1 | 5/2001 | Willis et al. |
| 6,233,398 B1 | 5/2001 | Rutherford et al. |
| 6,263,158 B1 | 7/2001 | Rutherford |
| 6,392,208 B1 | 5/2002 | Arx |
| 6,433,317 B1 | 8/2002 | Arx et al. |
| 6,434,328 B2 | 8/2002 | Rutherford |
| 6,516,142 B2 | 2/2003 | Grant et al. |
| 6,539,171 B2 | 3/2003 | VonArx et al. |
| 6,692,614 B2 | 2/2004 | Wright |
| 6,720,527 B2 | 4/2004 | Gadamus et al. |
| 6,744,978 B2 | 6/2004 | Tweedy et al. |
| 6,748,646 B2 | 6/2004 | VonArx et al. |
| 7,049,523 B2 | 5/2006 | Shuman et al. |
| 7,304,276 B2 | 12/2007 | Lin et al. |
| 7,361,869 B2 | 4/2008 | Russegger |
| 7,422,452 B2 | 9/2008 | Achtner et al. |
| 7,465,901 B2 | 12/2008 | Yunk et al. |
| 7,507,114 B2 | 3/2009 | Kent et al. |
| 2001/0014212 A1 | 8/2001 | Rutherford |
| 2002/0090209 A1 | 7/2002 | VonArx et al. |
| 2003/0206804 A1 | 11/2003 | Smith |
| 2004/0066665 A1 | 4/2004 | Cheng |
| 2005/0098684 A1 | 5/2005 | Gullerud et al. |
| 2006/0108354 A1 | 5/2006 | Russegger |
| 2007/0090796 A1 | 4/2007 | Norris |
| 2007/0108176 A1 | 5/2007 | Ellis et al. |
| 2007/0119848 A1 | 5/2007 | Ellis et al. |
| 2008/0012526 A1 | 1/2008 | Sadow |
| 2008/0126292 A1 | 5/2008 | Bhogal et al. |
| 2008/0135185 A1 | 6/2008 | Marzona |
| 2009/0179022 A1 | 7/2009 | Ellis et al. |

OTHER PUBLICATIONS

Brochure for "Maestro Splicing Equipment" issued by Ammeraal Beltech Inc., Apr. 2008 (4 pages).

Operation manual for "Splice Press Series AERO 300-600-900-1200-1500" issued by Novitool TMC. Jan. 2009 (15 pages).

Brochure for "Splice Press Series AERO 300-600-900-1200-1500" issued by Novitool TMC, Jan. 2009 (4 pages).

\* cited by examiner

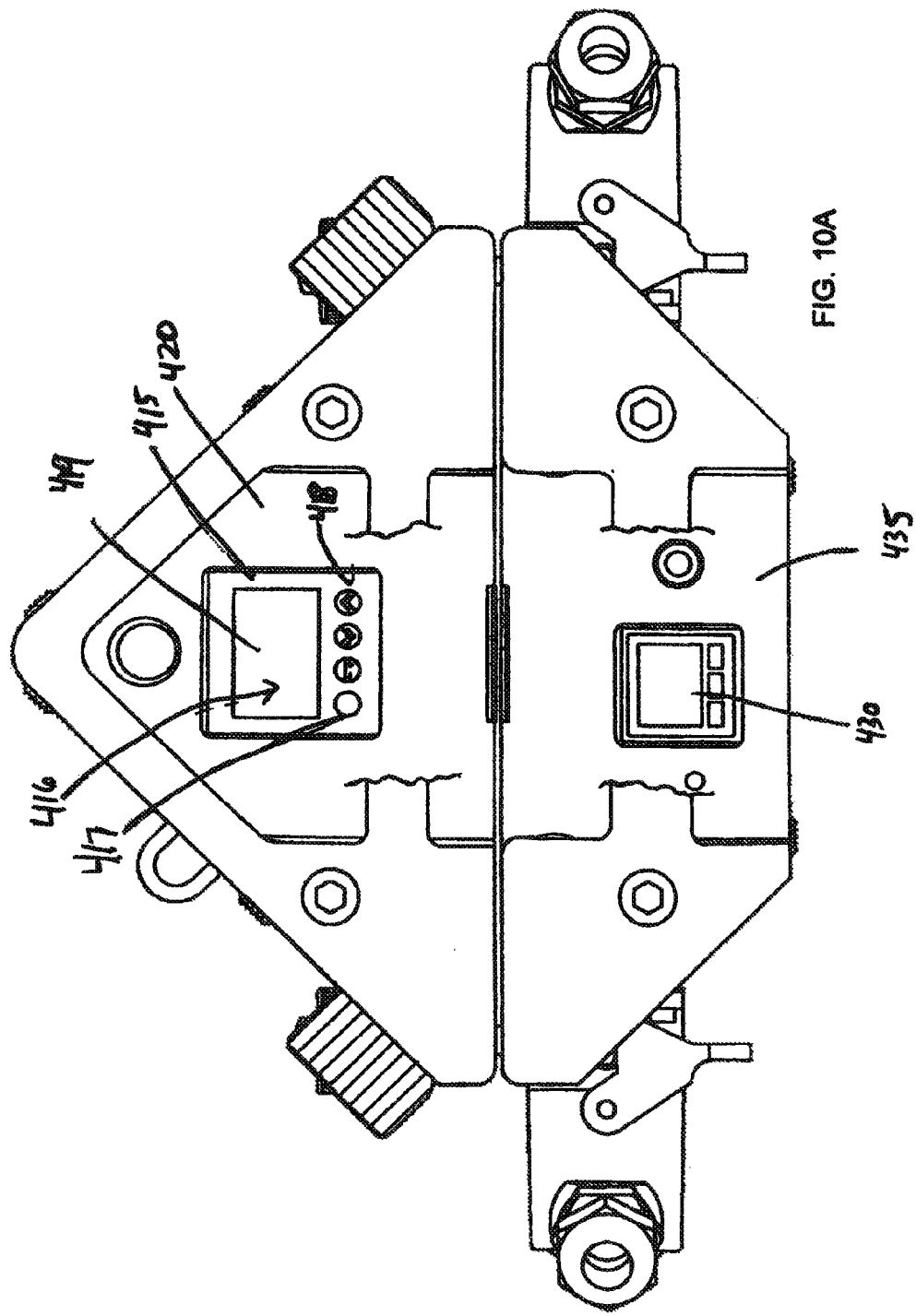

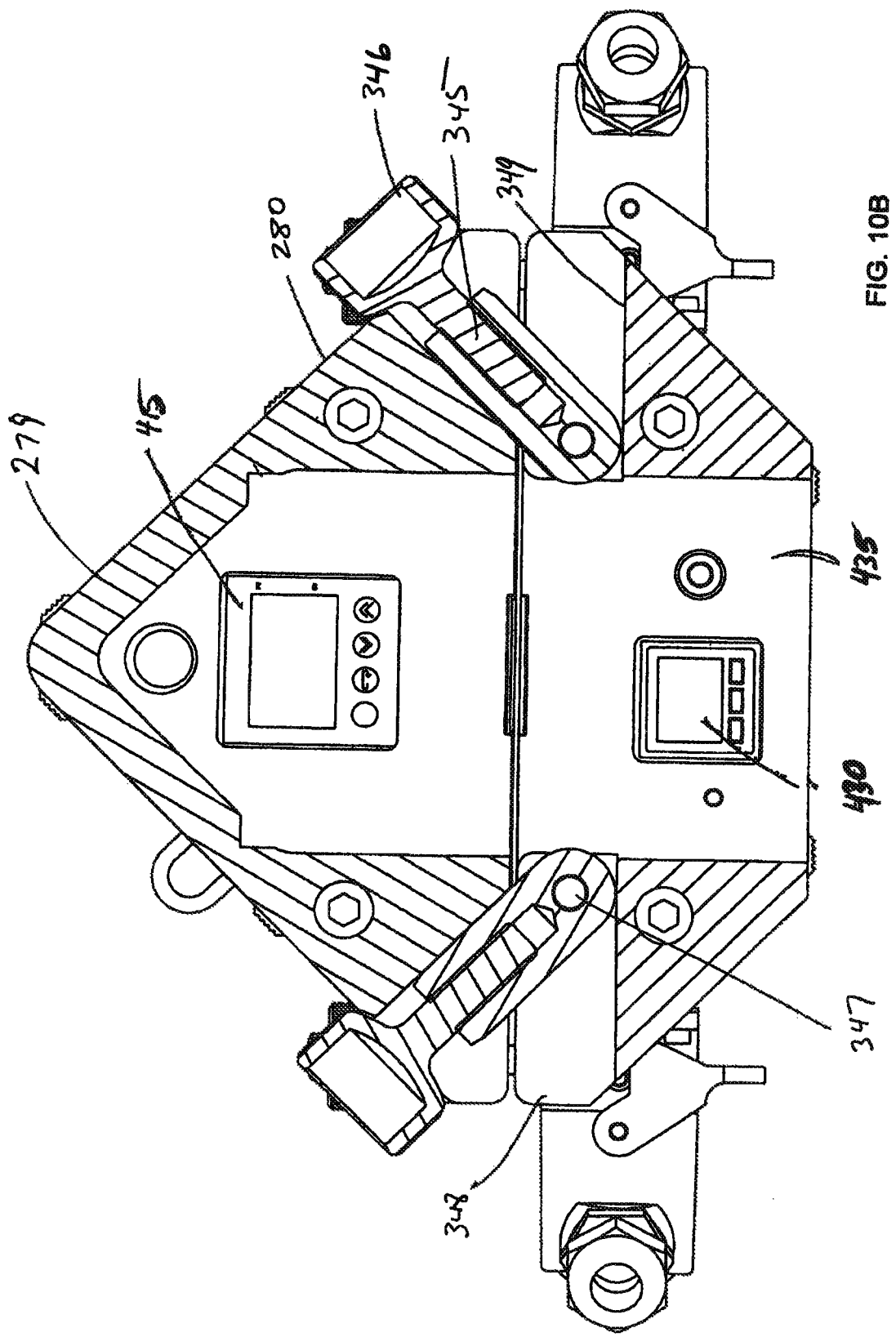

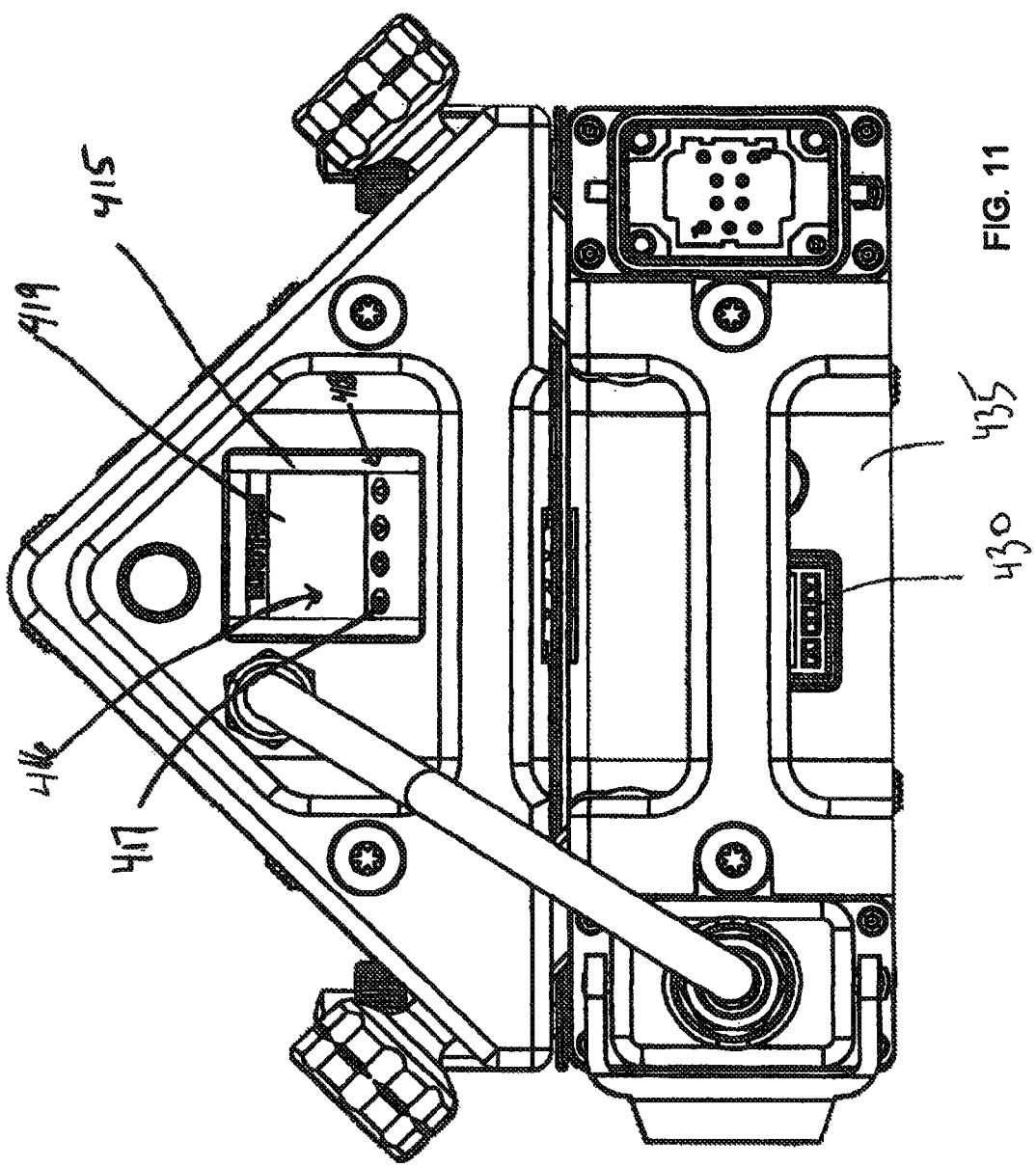

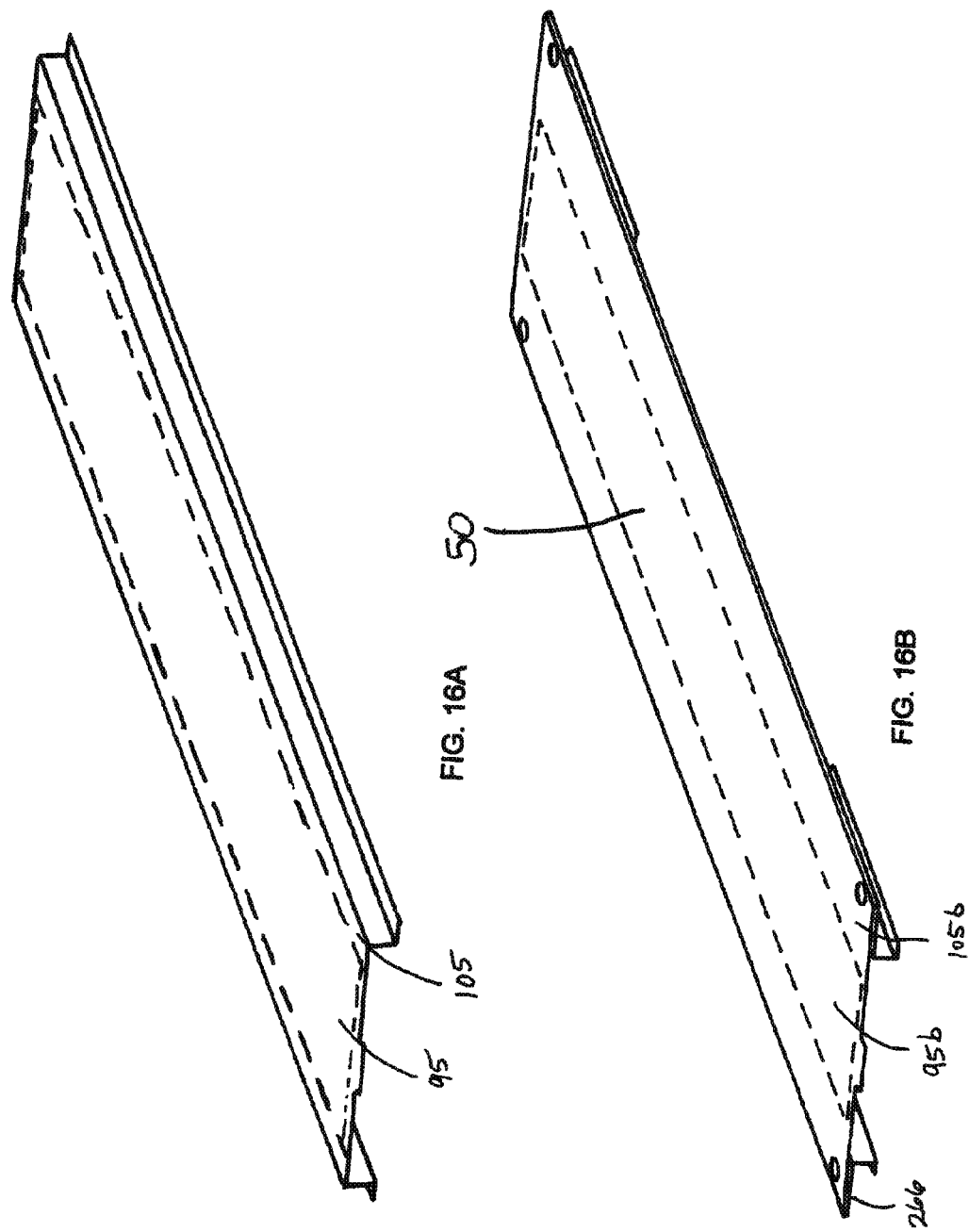

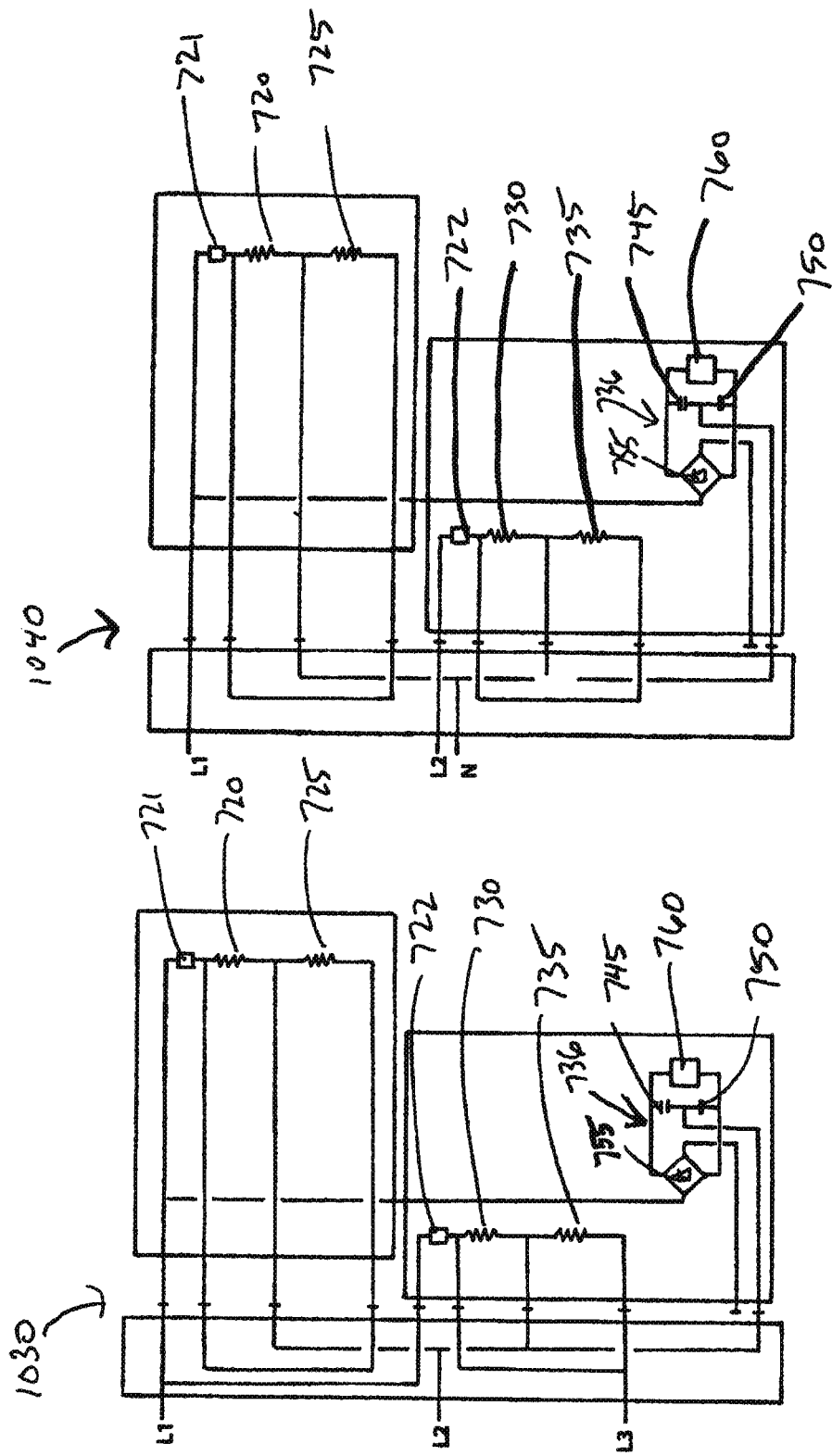

BELT SPLICING APPARATUS FOR CONVEYOR BELTS

CROSS REFERENCES TO RELATED APPLICATIONS

This patent claims benefit under 35 U.S.C. §119 (e) to U.S. Provisional Application No. 61/243,415 entitled "Splice Press Apparatus for Conveyor Belts" filed Sep. 17, 2009, the contents of which are incorporated herein by reference in its entirety.

FIELD OF THE INVENTION

The invention relates to an apparatus for joining together two ends of one or more conveyor belts and, more particularly, to a portable splice press apparatus for joining together two ends of one or more conveyor belts.

BACKGROUND OF THE INVENTION

Several industries utilize conveyor and process belts for transporting loads from one location to another location or for passing loads through successive processing operations. Many of these applications require conveyor belts that are able to maintain cleanliness under various and sometimes harsh conditions. For example, in the food and dairy industries, conveyor belts must provide sanitary surfaces for conveying food and dairy products to minimize the potential for contaminating these products. To meet this need, conveyor belt surfaces are often formed of materials, for example thermoplastic materials, that do not become easily contaminated when contacted with food or dairy products on the conveyor belt surface. To provide additional tensile strength, light to medium duty conveyor belts used in these applications are typically formed in a plurality of plies, including one or more fabric layers sandwiched between thermoplastic or rubber layers. Thus, in the food product industry, for example, the conveying surface may be formed of a thermoplastic material that does not easily absorb liquid from conveyed food, while the carcass may be formed from a woven fabric to provide strength to the conveyor belt. In addition, in the food product industry and other industries, belts with uniform thicknesses and smooth continuous surfaces have greater strength, produce less wear on a conveyor system, and operate using smaller rollers than belts with nonuniform thicknesses or noncontinuous surfaces.

During installation and maintenance of conveyor belts, the ends of one or more conveyor belts often must be joined together. While several existing methods and tools are capable of joining belt ends together, such as using adhesive or mechanical fasteners to adjoin the belt ends, vulcanized splicing is often the preferred method of joining the ends of conveyor belts, including light to medium duty polyvinyl chloride (PVC., polyurethane, and polyester belts, because it generally provides a more uniform and continuous joint and surface than other methods.

Vulcanized splicing typically includes preparing the ends of one or more belts for splicing in a generally overlapping or intermeshing pattern, positioning the prepared belt ends together in a generally end-to-end orientation between a pair of heated plates, and subjecting the belt ends to specific temperatures and pressures applied by one or both of the plates for a specific amount of time to cause the plastic material in the belt ends to melt or soften and flow together. Upon subsequently cooling the belt ends and releasing the pressure therefrom, the plastic will re-harden, fusing the material of the two belt ends to join the belt ends together. A high quality vulcanized splice will have a thickness that is close to the original thickness of the conveyor belts and a surface that is seamless and continuous between the splice area and the adjacent areas of the belts, without any weakened portions. A poor splice can result in an area of the splice that is thinner than the rest of the belt or an area that contains weakened material from overheating or scorching of the material or incomplete fusion between the materials of the two belt ends. Poor splices can also result in noticeable surface discontinuities, including, for example, recesses extending across the width of the belt. A splice of poor quality may become a weak portion of the belt, prone to subsequent failure. In addition, a poor splice may create surfaces discontinuities that may increase the likelihood of contamination by food products or other types of products and generally degrade the appearance of the conveyor belt to customers. Typical types of splices that may be made with a vulcanized splice press apparatus include finger-over-finger splices, standard finger splices, lapping splices and step joints, among others.

Vulcanized splices of conveyor belt ends have traditionally been formed using stationary or semi-stationary splice presses. These splice presses are relatively heavy, on the order of about 500-1500 lbs, and are either permanently located at a specific facility, or capable of being transported only after disassembling the press and transporting it in parts. These presses generally utilize external pressure or water supplies to provide pressure and coolant for the press during operation. To form a splice, press plates in these types of presses are heated and apply heat and pressure to a splice area of the belt for a predetermined amount of time, all of which depends upon the characteristics of the belts, including the materials from which the conveyor belts are formed, as well as the belt thicknesses.

Melting the ends of a conveyor belt while keeping the belt material adjacent to the melted belt ends cooler is known. Specifically, elevating the temperature of the lateral center or a hot region of the plates positioned at the splicing location on the belts, while maintaining the lateral edges or cool regions of the plates at a relatively lower temperature, causes belt material adjacent to the hot region to melt so that the belt ends can be joined while the material adjacent to the cool zones remains at a cooler temperature and generally remains solid or unmelted to restrict the flow of melted material away from the hot zone. During splicing in these types of presses, pressure is applied to both the hot and cool zones by the plates. Thus the solid belt material adjacent to the hot zone forms a barrier to restrict the flow of material from the hot zone and also forms a spacer for the press plates so that when pressure is applied to the heated belt ends by the press plates, the press plates will not move closer together than the thickness of the belt to form a splice of uniform thickness, which could otherwise squeeze melted belt material from the hot zone. It should be noted that these presses extend lengthwise transversely across the width of the belt so that the longitudinal ends of the belt or belts to be joined together are generally disposed at the lateral center of the belt splicing apparatus.

As is apparent, to achieve a high quality splice with the above-described approach a sufficient temperature gradient across the press plates must be achieved. To this end, U.S. Pat. No. 2,725,091 to Miner et al. describes that cooler areas can be maintained laterally adjacent to a heating platen by circulating coolant liquid through pipes in the cooler area. Other attempts have been made to utilize stainless steel press plates as the pressing surface of the splice press and to generate a temperature gradient across the stainless steel press plates. For example, U.S. Pat. No. 4,430,146 to Johnson describes that a narrow stainless steel sheet can be arranged below a center portion of a wider stainless steel sheet and heated so that the lateral edges of the wider sheet remain cooler than the center portion that is in contacted with the thinner heated sheet. Johnson describes that in this manner, a temperature gradient can be formed against the belt contacting wider stainless steel sheet. One reason stainless steel press plates were used in these presses is because the high stiffness characteristics of stainless steel were believed to withstand the high pressures applied to the press plates during operation without substantially deflecting. Several drawbacks, however, have been identified for each of these techniques. First, running a cooled fluid through lateral adjacent areas as described by Miner et al. significantly increases the complexity of a splice press by requiring coolant hook-ups and piping lines for the coolant. In addition, the splice press requires the use of an external source of hydraulic fluid, which may not be present at many locations where belt splicing is desired, significantly decreasing the usefulness of the splice press.

Further, heating a center portion of a steel press plate, as described by Johnson, has presented several problems. First, heating a center portion of a stainless steel press plate fails to produce adequate cool zones because the heat from the heated center zone rapidly transfers to the adjacent side edges so that the necessary temperature gradient does not form across the press plate. In addition, these stainless steel press plates as well as aluminum press plates have been found to suffer considerable deformation during a splicing operation and become permanently warped when subjected to the high temperatures required to melt and join the conveyor belt ends. Warping of the plates causes the plate surfaces to become uneven, which produces uneven pressure and heating distributions across the splice area during subsequent splicing operations, degrading the quality of the splices formed by the press.

Based on the difficulties for providing adequate cool zones and to avoid permanent deformation of the steel or aluminum platens as described for previous attempts, more recent splice presses have increased the stiffness of the clamping devices by adding a thick, substantially rigid member of heat insulating material in between the steel or aluminum platens and the belt ends. For example, U.S. Pat. No. 5,562,796 to Ertel describes a system that utilizes a narrow metal heating element mounted below a narrow sheet of aluminum. Positioned above the aluminum sheet is a thicker layer of rigid heat resistant phenolic resin, containing silicone and glass fibers. Another commercially available splice press utilizes a similar aluminum plate disposed between a heating element and a belt facing thick, rigid insulating press plate formed of fiberglass or other insulating material for applying heat and pressure to the belt ends. The aluminum layer of this system is used for its heat conducting characteristics to rapidly conduct heat from the heating element to the insulating plate. The insulating members are used in these presses to insulate the flow of heat across the surface of the plate in the lateral directions beyond the edges of aluminum plates therebelow. In this regard, the heating elements and metal portions of the plates in these presses are narrower than the thicker fiberglass plates and positioned laterally centrally below the insulating plate to restrict the flow of heat to the lateral edge portions of the insulating plates, thereby allowing a hot zone to form in the middle portion of the insulating plate with cooler zones being maintained at the lateral edge portions. The application of high heat to the clamping devices, including the platens and fiberglass plates will also typically not cause them to warp to the same extent as the steel or aluminum platens when used alone.

Insulating plate members, however, increase the complexity of the system by requiring the additional thick, substantially rigid layer of insulating material to be mounted over a narrower heated metal component that is adjacent to a heating element. In addition these thick insulating members require the heating elements to reach and maintain relatively higher temperatures during the belt splicing operation, because the insulating effect of the fiberglass tends to keep the maximum amount of heat from the heating element from reaching the overlying belt ends to be melted. In fact, the insulating members themselves substantially increase the amount of mass that must be heated within the system, because the entire thickness of the insulating member must be heated. Because more heat must be generated in order to sufficiently heat the belt ends when insulating members are utilized, this additional heat must also be removed by the system prior to performing a subsequent splice, increasing the cycle time of the press for each belt splicing operation. The fiberglass plates also increase the amount of time required for heating the belt engaging surfaces of the plates and for removing the heat after the splice is formed, decreasing the ability of the user to quickly apply and remove heat from the belt ends for quickly controlling the heat being applied to the belt ends. As a result, it may become more difficult to remove heat from the belt ends. This may detrimentally affect the quality of the splice, because the quality of the splice depends on the heated temperature applied to the belt ends and the amount of time the belt ends are exposed to the heated temperature. Thus, the ability to quickly remove the heat source from the belt ends to regulate the heated temperature is important to the resulting quality of the splice. Cooling the additional heated mass also increases the cycle time of the press before the press reaches a low enough temperature to perform a subsequent splice.

As mentioned previously, stainless steel press plates would often undergo considerable deformation upon heating to a high operation temperature, e.g. 200° C., and become permanently warped. Warping of the plates causes the plate surfaces to become uneven which produces uneven pressure and heating distributions across the splice area during subsequent splicing operations, degrading the quality of the splices formed by the press. Initially, it is believed the plates on these presses were made thicker in an attempt to reduce the amount of operational deflection and permanent deformation that the plates underwent (see e.g. U.S. Pat. No. 4,193,341 to Clements et al. Other presses, such as described by U.S. Pat. No. 6,228,200 to Willis et al., have used support rods and large plate sidewalls to restrict or control operational deflection and permanent warping of the metal plates. However, these approaches require additional strengthening materials that increase the weight of the press, thereby negatively affecting the portability of the press.

The thick, rigid insulating members that have been adopted more recently for being positioned between metal platens and the belt ends are also utilized as a structural member to restrict deflection of the platen by increasing the stiffness of the press surface. In addition, these thick, rigid insulating members do not experience as much permanent deformation as do stainless steel press plates. However, for the reasons described previously, these thick, rigid insulating members create several disadvantages, including increasing the amount of mass that is heated in the system and decreasing the amount of control that an operator has over the quickly adjusting the heat being applied to the belt ends.

As mentioned previously, traditional splice presses have included large stationary presses that are not intended to be transported between facilities other than to be disassembled and transported in pieces. Stationary splice presses are not useful for splicing conveyor belts in all situations. For example, in some instances of repair or installation of a conveyor belt, it may be necessary to form a splice between two belt ends in situ, with the belt left installed on the conveyor system. In addition, in facilities where it would be impractical to include a stationary splice press, it is still often desirable to repair belts at the facility rather than having to ship the belt off-site, which can cause significant expense and unnecessary downtime of operations where the belt is employed. However, these stationary splice presses are typically bulky and heavy and are difficult to transport to a specific site without expending considerable time disassembling, moving, and reassembling the press to the new location.

The traditional splice presses also typically utilize pneumatic or hydraulic fluid for cooling the splice press after performing a splice. More particularly, the heat generated by the heating elements in these presses for applying heat to the belt ends typically must be removed after performing a splice and prior to a subsequent splice, because the entire press may become hot if it is not cooled between splice operations. In addition, the platens should be cooled to a sufficient extent prior to a subsequent splice so that residual heat in the press plates does not cause uneven heat distribution to the belt ends during a subsequent splice, or modify the time heat is applied to the belt ends, since the starting temperature of the platens is higher, resulting in a splice of poor quality. To cool the apparatus, these presses are often connected with tubing to pneumatic or hydraulic supplies to circulate fluid or air from the pneumatic or hydraulic supply through the press to cool the press. However, requiring tubing lines and adapters for being connected to external supplies increases the complexity of the system and further reduces the ability to transport the press from facility to facility due to additional equipment that must be transported with the press and the need to use the press in a location that provides the necessary external supplies.

Attempts to address these problems have been largely unsuccessful. For example, attempts to make splice presses more compact so they can be transported from facility to facility have not considerably reduced the burden in transporting the presses other than to reduce the size of the equipment. Like traditional stationary splice presses, these types of presses are inconvenient for transporting between facilities and require the operator to transport additional equipment with the press and only allow the splice press to be used at certain facilities and at specific locations within the facility providing necessary external supplies. For example, one commercially available splice press requires an operator to transport attachment hoses for running cooling fluid from a fluid source within the facility to the press to cool the press after performing a splice. An additional hookup is required to supply compressed air from a pneumatic source to an inflatable pressure device in the splice press. Similarly, these types of presses either require the operator to use the press with a specific power source or to transport an additional external bulky transformer with the press. External controllers are also required for controlling the temperature applied to the belt ends by the press plates in these presses. For all of these reasons, these more compact splice presses do not provide adequate transportability of the splice press because they require a large number of external components to be transported with the press. Further, they greatly limit the locations at which the press can be used to areas where appropriate power supplies and pneumatic and/or hydraulic supplies are available.

Attempts to remove these external components and the need for external supplies have also proved unsuccessful. To avoid the need to connect hoses to external pneumatic or hydraulic supplies, other mobile presses, for example the press described in U.S. Pat. No. 4,430,146 to Johnson allows the press to passively cool by ambient air. This method, however, decreases the control the user has over the temperature of the press plates and the amount of time the belt ends remain heated after the heating element is turned off, which can degrade the quality of splices formed between belts with materials that are sensitive to temperatures and times. Moreover, as mentioned earlier, passive cooling increases the amount of time that a user must wait until the press reaches a sufficiently low temperature prior to performing a subsequent splice with the press. This delay between splices can be problematic, particularly for belt repair operators who bring these presses from facility to facility and often perform multiple splices at a particular facility, because they must wait to perform subsequent splices, reducing their efficiency.

A further problem with current splice presses is the tendency for the hot press plates to apply excessive heat to the outer surfaces of the conveyor belt before the interior or core belt material is sufficiently melted to join the belt ends, resulting in scorching of the conveyor belt surfaces. Current splice presses typically allow a user to select a melt temperature and melt time for a conveyor belt, using an external controller as described above. The controller subsequently performs a splice operation during which the plates reach the melt temperature and are maintained at the melt temperature for the duration of the melt time. However, in many situations, engaging the press plates against the belt surfaces at a temperature sufficient to melt the belt material and for a time sufficient to melt the material of the entire belt thickness so that the belt ends can be joined together often causes the belt surfaces to become overheated and scorched, degrading the strength and appearance of the splice.

Each of the problems associated with current splice presses reduces the overall quality of splices formed by the splice press and the mobility of the portable splice press, by increasing its weight, limiting the locations in which it may be used, and increasing the amount additional external equipment that must be transported with the press.

SUMMARY OF THE INVENTION

A portable belt splicing apparatus is provided for joining two ends of one or more conveyor belts together includes upper and lower frame portions with corresponding upper and lower platens for being clamped on the belt ends positioned therebetween. In accordance with one aspect, at least one of the upper and lower platens is formed of a relatively thin sheet of a metallic material that is configured to transmit a clamping force to the belt ends and to allow for operational deflection of the one platen due to high pressures applied thereto, while advantageously avoiding permanent deformation thereof despite lacking a thick, rigid insulating member positioned between the platen and the belt ends.

For this purpose, a pressure device that is operable to develop high pressures of up to about 2 bar is arranged to drive the thin sheet platen against the belt ends so that the metallic thin sheet platen directly transmit a clamping force to the belt ends. A heating device between the pressure device and the one platen is arranged to be operable to apply high temperatures of up to about 200° C. to an elongate central region of the platen so that elongate opposite side edge portions of the one platen remain cooler than the central heated region. The thin sheet platen is allowed to deflect during operation due to the high pressures applied by the pressure device, but avoids permanent deformation despite the high operation temperatures that the heating device applies to the platen and the temperature difference between the heated central region and the cooler side edge portions. Further, despite the prevailing modern use of insulator plates to form a stiff clamping device by having a combination of steel or aluminum platens with thick and rigid insulator members positioned between the steel or aluminum platens and the belt ends and using this combination to develop sufficient temperature gradient across the clamping device, the present belt splicing apparatus accomplishes both of these functions without the need for a thick and rigid insulating member positioned between the thin sheet platen and the belt ends to be joined.

Previous splice presses utilized stainless steel press plates, which had substantial stiffness to resist deflecting upon being subjected to operation pressures. Despite the stiffness of these steel press plates, they were found to undergo substantial and unacceptable permanent deformation under operational conditions after undergoing several cycles of heating and cooling. As previously discussed, to avoid this problem, prior approaches used a thick and rigid insulator member in conjunction with the steel platens to form a highly stiff and rigid clamping device. The platen of the present belt splicing apparatus substantially takes the opposite approach. In contrast, in the current splicing apparatus, the thin platen is formed of a metallic material, e.g. titanium, that has a lower Young's modulus than steel so that it will undergo deflection upon being subjected to elevated pressures. However, it has been found that the platen is able to resist becoming permanently deformed despite the fact that the predetermined material has a lower modulus of elasticity and stiffness than stainless steel and therefore is less able to restrict deflection upon operation of a pressure device that drives the lower platen against the belt ends than the previously used stainless steel press plates. Further, the platen of the current invention is able to resist permanent deformation without a thick rigid member being positioned between the conveyor belt ends and the lower platen to provide structural support thereto.

It is believed that because the operation temperatures of the heating device are high (up to about 200° C. during splicing operations), the permanent deformation of previous stainless steel platens was not due to pressures being applied thereto, but was rather caused by thermal expansion of the press plates in response to the elevated temperatures causing strain in the plates. This is particularly problematic, because the heated center portion would undergo greater expansion than the cooler adjacent edge portions, so that substantial strains were formed in the transition area therebetween. In this regard, the present splicing apparatus utilizes a thin sheet plate having a Young's modulus that is lower than the Young's modulus for stainless steel. It has been found that the amount of stress that the platen experiences is less than that of stainless steel for a given strain. Thus, despite having a low Young's modulus and the fact that the platen of the present invention will exhibit deflection upon pressure from the pressure device, the current platen can withstand greater strain caused by thermal expansion at elevated than the previous steel platens before reaching its yield point and becoming permanently deformed. In a similar manner, the metallic material preferably has a low coefficient of thermal expansion to further reduce the amount of strains caused by the platen material expanding at elevated operation temperatures. In addition, the metallic material preferably has a high yield strength to further enhance the ability of the platen to withstand high temperatures prior to reaching its yield point and becoming permanently deformed. In one form, the metallic material is titanium, which has a high yield strength and a low coefficient of thermal expansion.

The metallic material of the thin sheet plate platen produces a well defined heated elongate central portion heated to a temperature sufficient to melt the belt material in overlying engagement therewith (less any thin sheet of non-stick material therebetween. The metallic material will restrict the flow of heat from the elongate central portion to the side edge portions adjacent thereto so that the side edge portions remain at a cooler temperature that is well below the melting temperature of the belt material. In this manner, the belt material overlying the cooler side edge portions remains solid to act as a barrier to the flow of melted belt material from the hot zone and to act as a spacer for restricting the platens applying pressure to the belt ends from extruding melted belt material from the hot zone. In this manner, the metallic platen of the present belt splicing apparatus will generate a quality splice having generally uniform thickness and generally continuous upper and lower surfaces. Despite the modern use of insulator plates to develop sufficient temperature gradients across the clamping device, as discussed previously, the present belt splicing apparatus creates the necessary temperature gradient without an insulating member positioned between the thin sheet platen and the belt ends to be joined. To this end, the metallic material of the thin sheet platen preferably has a low heat conductivity, e.g. titanium or titanium alloy. It has been found that the low thermal conductivity of the predetermined material advantageously restricts the flow of heat from the heated central region to the adjacent side edge portions, thereby maintaining the side edge portions at the desired cooler temperature. The thin sheet configuration of the lower platen and lack of any thick insulating member between the platen and the belt ends provides the additional benefits of reducing the amount of mass that must be heated during operation of the splicing apparatus so that the heat applied to the belt ends can be carefully controlled and the amount of time required to cool the press to perform a subsequent splice is reduced.

In one form, the present splicing apparatus also includes a fan device that is mounted to one of the upper and lower frame portions. The fan device is configured to draw ambient air and direct the ambient air toward the upper and lower platens for cooling the upper and lower platens. The thin sheet configuration of the platen and the lack of any substantially rigid heat absorbing members positioned between the platen and the belt ends, advantageously allows the fan device to rapidly cool the belt splicing apparatus because the amount of mass that is heated during operation of the heating device is low. The rapid cooling allows heat to be quickly removed from the platen to provide high quality splices and adequately cool the splice press to allow the operator to quickly perform additional subsequent splicing operations.

In accordance with another aspect, the portable conveyor belt splicing apparatus is self-contained to optimize its portability and provide convenience to operators to allow them to easily transport the belt splicing apparatus for use at different facilities. In one preferred form, the belt splicing apparatus only requires an operator to connect a power cord to an available power supply of a facility and otherwise does not require the operator to transport additional equipment or connect the belt splicing apparatus to pneumatic or hydraulic power supplies at the facility so that the press is easily transported and can be used in a variety of locations. To this end, the portable belt splicing apparatus includes an inflatable bladder and an on-board air compressor for providing pressurized air to inflate the inflatable bladder to drive one of the upper and lower platens to apply pressure to the belt ends. The portable belt splicing apparatus may also include an on-board air cooling system for cooling the platens, the belt ends, and the heating device. In one form, the on-board air cooling system includes at least one fan for directing ambient air toward the platens, belt ends, and heating device, and provides rapid cooling of the components of the splice press apparatus, without having to wait for the heated elements to passively cool before a subsequent splicing operation can be initiated. In this manner, external pneumatic or hydraulic supplies are not required for operation so that the conveyor belt splicing apparatus can be used at a variety of locations within a facility regardless of the availability supplies and without requiring additional equipment for connecting to such sources.

In one preferred form, the portable belt splicing apparatus includes an on-board control system mounted to the housing assembly of the belt splicing apparatus with the on-board control system having circuitry connected to the heating elements and being configured for receiving power from different types of standard power supplies and operating electrical components of the belt splicing apparatus using the available power supply. The on-board control system provides the benefit of allowing the portable conveyor belt splicing apparatus to be used in a variety of facilities and at various locations within the facility regardless of the type of standard power supply available at the facility. Similarly, in one form, the belt splicing apparatus can be used in different countries because it is also capable of operating using standard power supplies offered in different countries. The portable conveyor belt splicing apparatus preferably further includes an on-board user operated control of the control system mounted to the housing to control the amount of heat applied by the heating elements to the respective platens, so that the heat provided to the belt ends can be carefully controlled to provide a high quality splice without the need for an operator to transport an additional external controller for regulating the temperature of the platens.

In one form, the portable conveyor belt splicing apparatus may include a plurality of different source specific power cords corresponding to different standard power supplies. The power cords each include a common electrical connector at one end that has the same physical configuration for each power cord and is configured to electrically connect to an electrical connector of the on-board control system. The opposite end of each power cord includes a source specific connector so that the power cords can be coupled to different standard power supplies. In one form, in order to operate using power sources having different voltage ratings, upper and lower heating elements of the belt splicing apparatus each have a predetermined voltage rating. The on-board control system is configured to supply power to the upper and lower heating elements in parallel if the power supply voltage is about the same as the predetermined voltage rating of the heating elements and to supply power to the heating elements in series when the power supply voltage is larger than the predetermined voltage rating of the heating elements. In this manner, common heating elements can be used regardless of the voltage rating of the available power supply at a particular facility and without the need for an external transformer. In another form, the upper and lower heating elements each include a pair of heating elements. In this regard, each pair of heating elements can be connected in series or in parallel as described above depending upon the power supply as described previously, but the upper and lower pairs of heating elements are connected in parallel so that they can be controlled independently.

According to yet another aspect, an automated control system is provided for controlling the temperature of a heating mechanism and which allows the user to utilize user inputs to preset a preheat time, a melt temperature and a melt time to allow for the belt ends to be preheated before being exposed to the melt temperature so as to avoid scorching of the outer surfaces of the belt ends. More particularly, the control system is operable to control the heating mechanism to perform a preheat operation and to maintain the preheat operation for the preheat time. Subsequently, the control system is configured to automatically increase the temperature of the heating mechanism to the melt temperature, which is maintained for the melt time so that the material of the belt ends is sufficiently melted to be joined. Preheating the belt ends in this manner allows inner belt material or the belt core of the belt ends to be heated to a temperature below the melt temperature without subjecting outer surfaces of the belt ends to the full melt temperature. With the inner material already heated, the melt time during which the melt temperature is applied to the belt surfaces required to sufficiently melt the material of the belt ends for joining the belt ends together is less than it would be if the preheat operation was not completed. The lower melt time reduces the potential for scorching of the upper and lower surfaces of the belt ends that otherwise would more likely occur from prolonged exposure to the elevated melt temperature. This is particularly problematic with thicker light duty polyurethane and polyvinyl chloride (PVC. belts. In addition, the operator is not required to closely observe the splicing operation to ensure that the belt end surfaces are not being scorched or to manually control the temperature to apply a lower temperature to the belt ends prior to manually raising the temperature for melting the belt material. In one approach, the user inputs include a preheat temperature input so that the user can preset a preheat temperature below the preset melt temperature for the preheat operation. In one form, the automatic control system may be configured to maintain the temperature of the heating mechanism at approximately the same preheat temperature preset by the user for the preheat time.

In accordance with another aspect, a conveyor belt splicing apparatus includes an on-board cooling system for cooling the heated belt ends and a heating device used to heat the belt ends. The cooling system includes a fan device mounted to the upper housing for drawing ambient air and forcing the ambient air down toward the heating device. For directing the forced ambient air along the heating device to provide even and rapid cooling thereof, the cooling system also includes a duct member positioned between the fan device and the heating device. Preferably, the duct member has an upper plate portion including slot openings formed therein and depending walls projecting downwardly from the plate portion toward the heating device. In this manner, the forced air from the fan device travels downwardly through the slot openings and is directed along the upstanding walls.

In one form, the heating device has an elongate configuration extending in a lengthwise direction, and the depending walls include walls that extend in the lengthwise direction for directing air along the elongate heating device and walls that extend obliquely to the lengthwise direction for directing air obliquely across and out from the duct member. In this manner, cooler ambient air is continually drawn into the upper housing to cool the heating mechanism and heated air that has passed along the heating mechanism is continually exhausted from the upper housing to rapidly cool the heating mechanism and the belt ends. In this regard, the heating device and belt ends can be rapidly cooled without requiring an external pneumatic or hydraulic hookup. In one form, the heating device includes upper and lower heating assemblies mounted to the upper and lower housing portions for being engaged against the clamped belt ends with the duct member positioned above the upper heating assembly. A pressure device mounted to the lower housing is configured to drive the lower heating assembly toward the clamped belt ends. In this regard, the depending walls of the duct member also serve to engage against the upper heating assembly to provide rigid support thereto.

BRIEF DESCRIPTION OF THE DRAWINGS

FIG. 10A is an end view of the belt splicing apparatus of FIG. 4 with handles cut away to shown upper and lower control interfaces;

FIG. 10B is a cross-sectional view of belt splicing apparatus of FIG. 4 taken along line B-B and illustrating upper and lower control interfaces and clamping devices of the belt splicing apparatus;

FIG. 11 is a front view of the belt splicing apparatus of FIG. 2 showing upper and lower control interfaces and electrical connectors for supplying power to the belt splicing apparatus;

FIG. 16A is a perspective view of a platen schematically illustrating the location of heated elongate central portion and cooler side edge portions of the lower platen in one form;

FIG. 16B is a perspective view of a platen schematically illustrating the location of heated elongate central portion and cooler side edge portions of the lower platen in an alternative form;

DETAILED DESCRIPTION OF THE PREFERRED EMBODIMENTS

Figure 1:
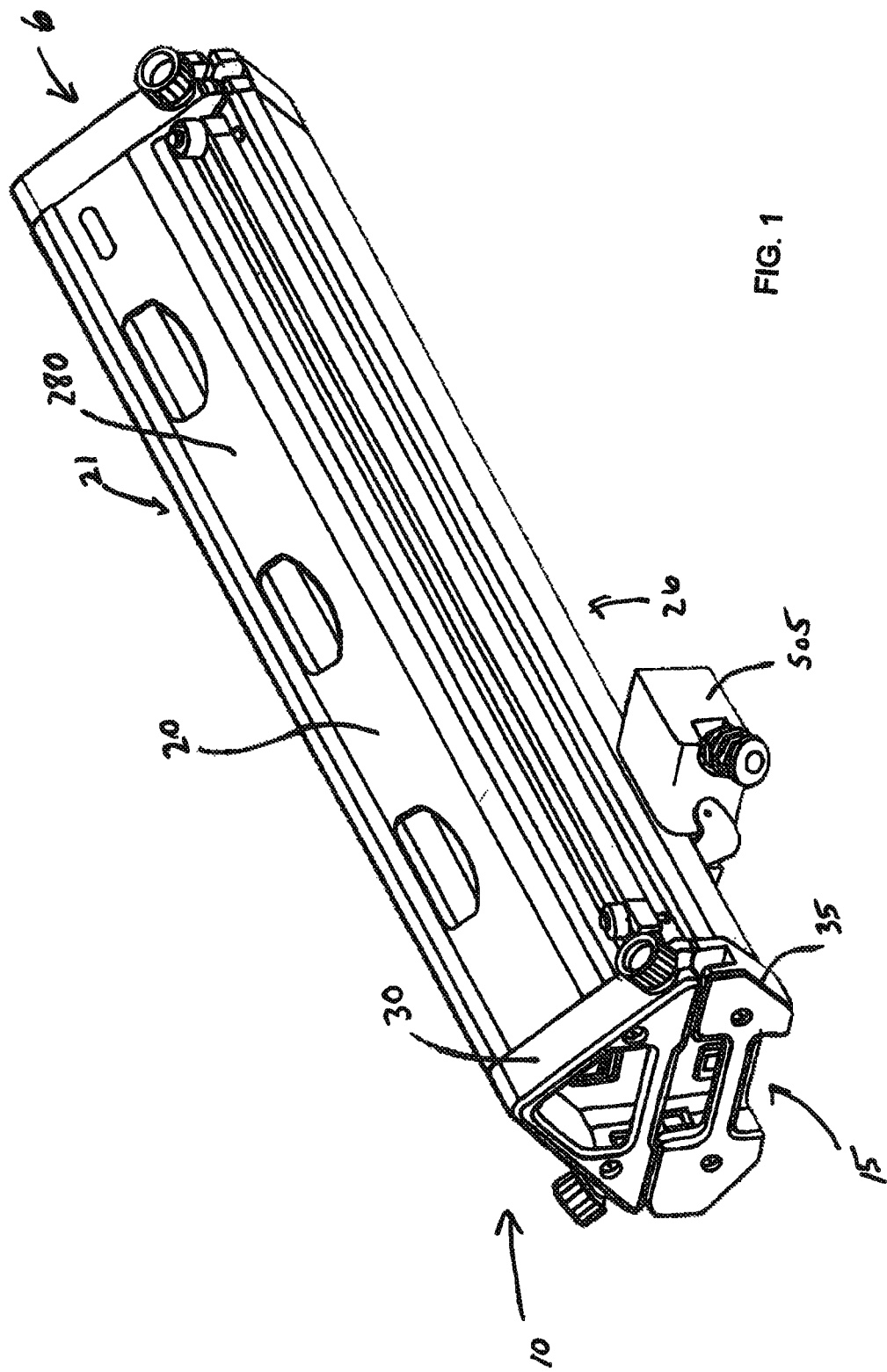
FIG. 1 is a perspective view of a conveyor belt splicing apparatus in accordance with one form showing an upper press assembly and a lower press assembly in a clamped or operative position.
Figure 2:
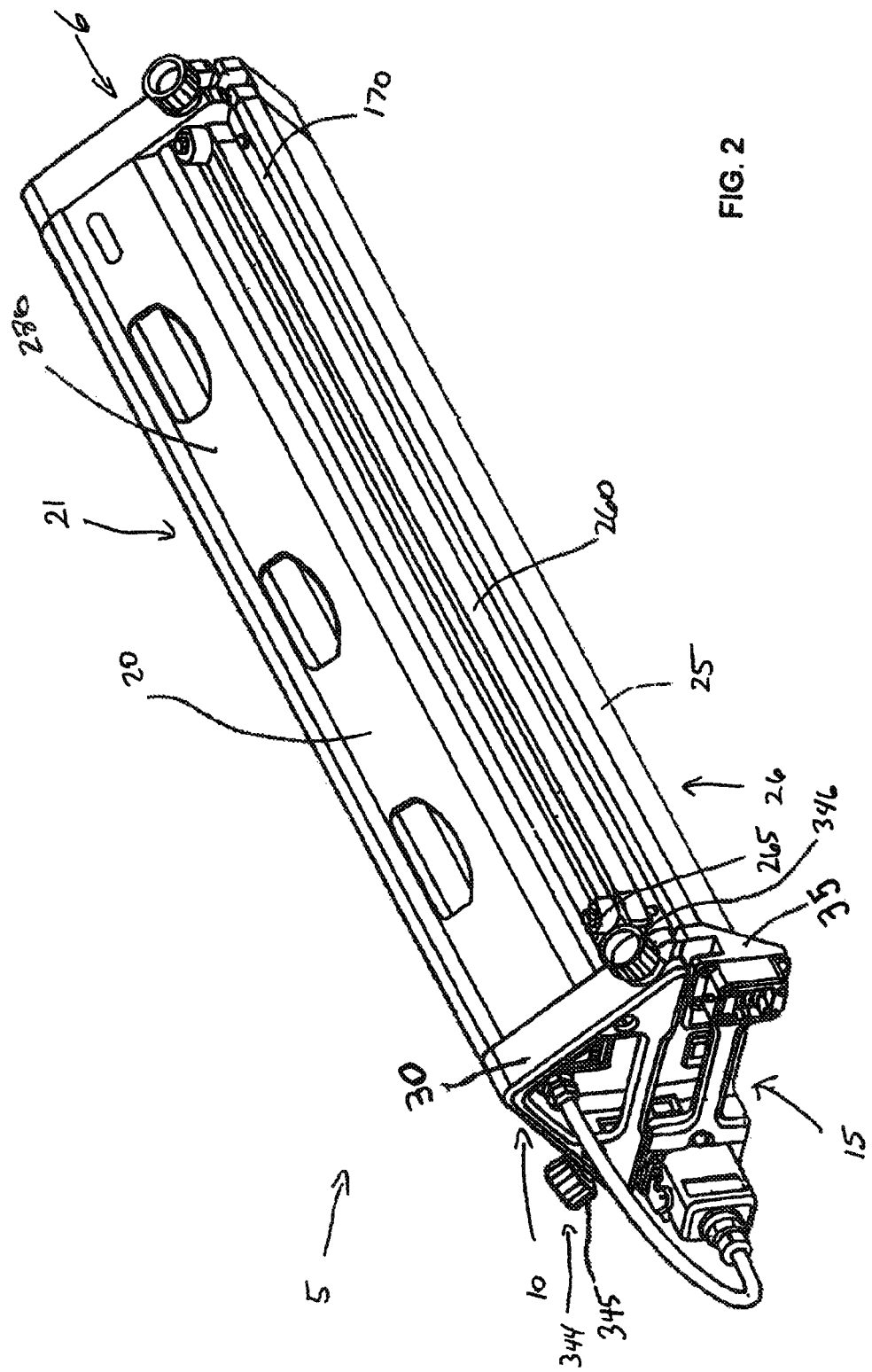
FIG. 2 is a perspective view of an alternative conveyor belt splicing apparatus, showing an upper press assembly and a lower press assembly in a clamped or operative position.
Figure 3:
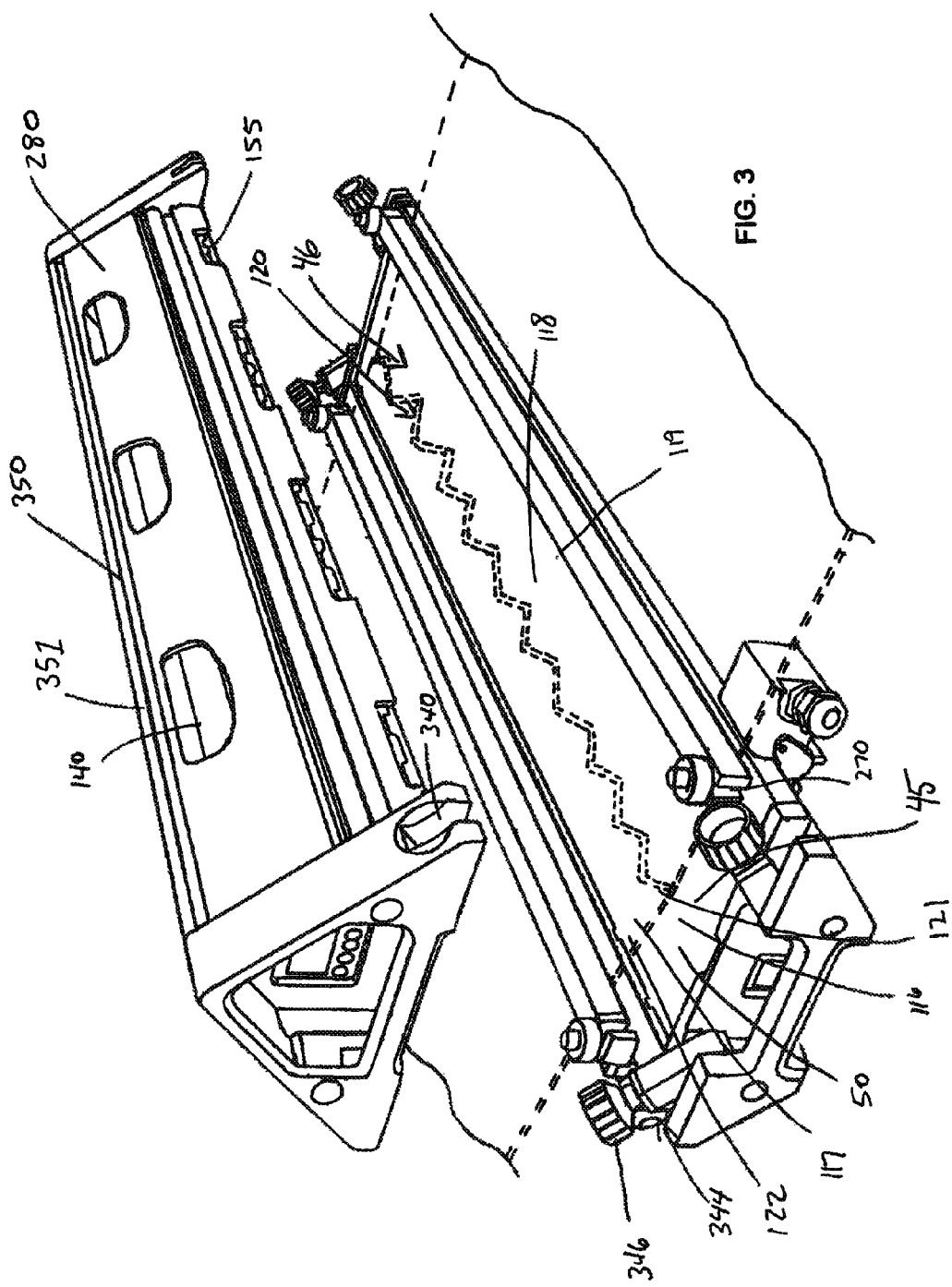
FIG. 3 is a perspective view of the conveyor belt splicing apparatus of FIG. 1 in an unclamped configuration with the upper press assembly above the lower press assembly showing conveyor belt ends positioned therebetween.

In FIG. 1-3 a portable belt splicing apparatus or splice press apparatus 5 in accordance with one form of the invention is illustrated, which includes a housing assembly 6 having upper and lower press assemblies 10 and 15 formed generally from upper and lower elongate frames 20 and 25 of lightweight extruded material and end walls 30 and 35 to form upper and lower frame portions or housing frames 21 and 26.

Figure 6:
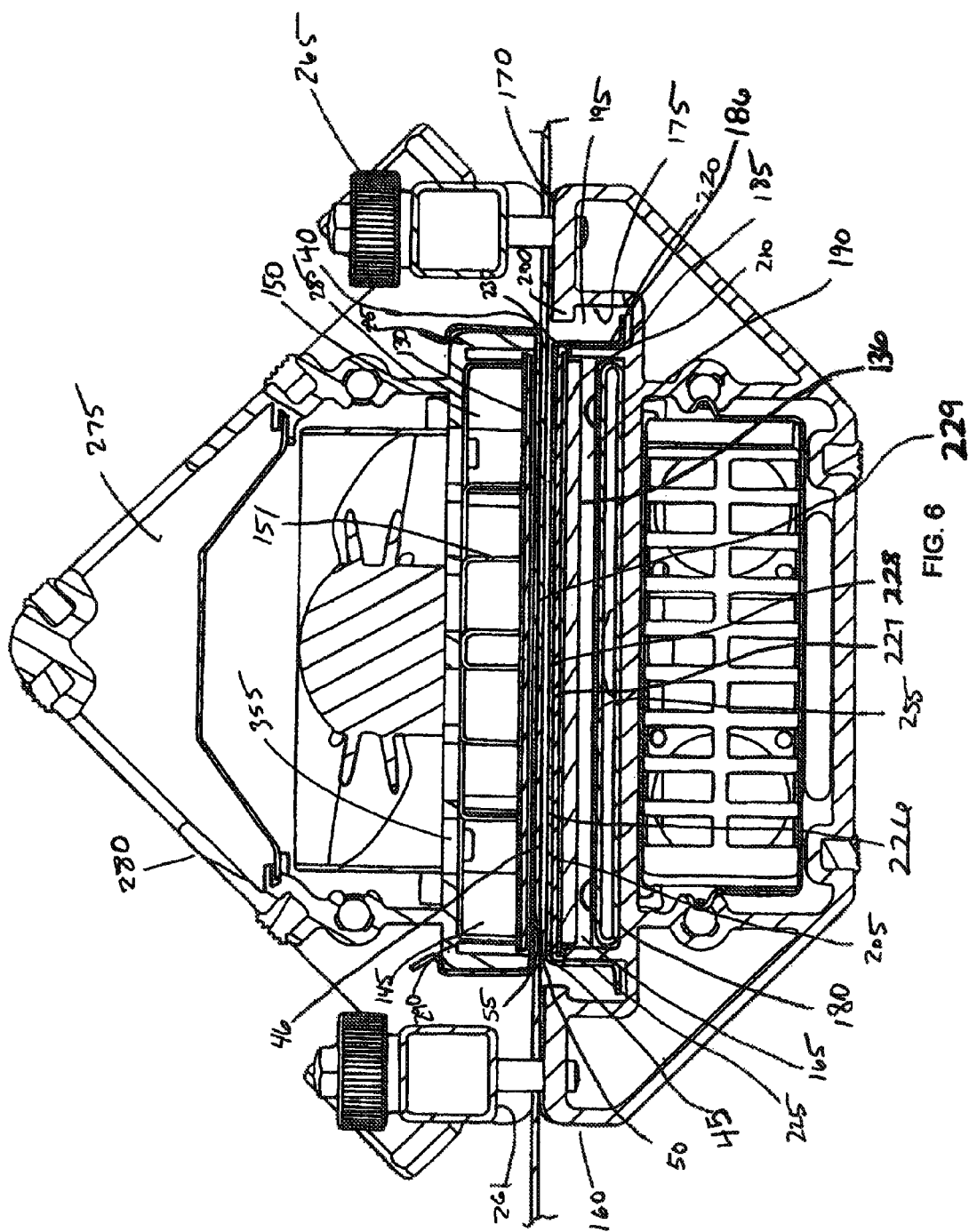
FIG. 6 is a cross-sectional view of the belt splicing apparatus of FIG. 4 taken along line A-A, illustrating a heating assembly and cooling system of the upper press assembly and a lower heating assembly and a pressure device of the lower press assembly with conveyor belt ends clamped between upper and lower platens.

In one approach, shown in FIGS. 1, 3 and 6 the upper and lower press assemblies 10 and 15 include corresponding oppositely facing upper and lower platens 40 and 45 that are mounted to the upper and lower frame portions 20 and 25. During operation, the belt ends 46 to be joined are supported by an upper press surface 50 of the lower platen 45 and are clamped between the upper press surface 50 and a lower press surface 55 of the upper platen 40 as illustrated in FIG. 6.

Figure 7:
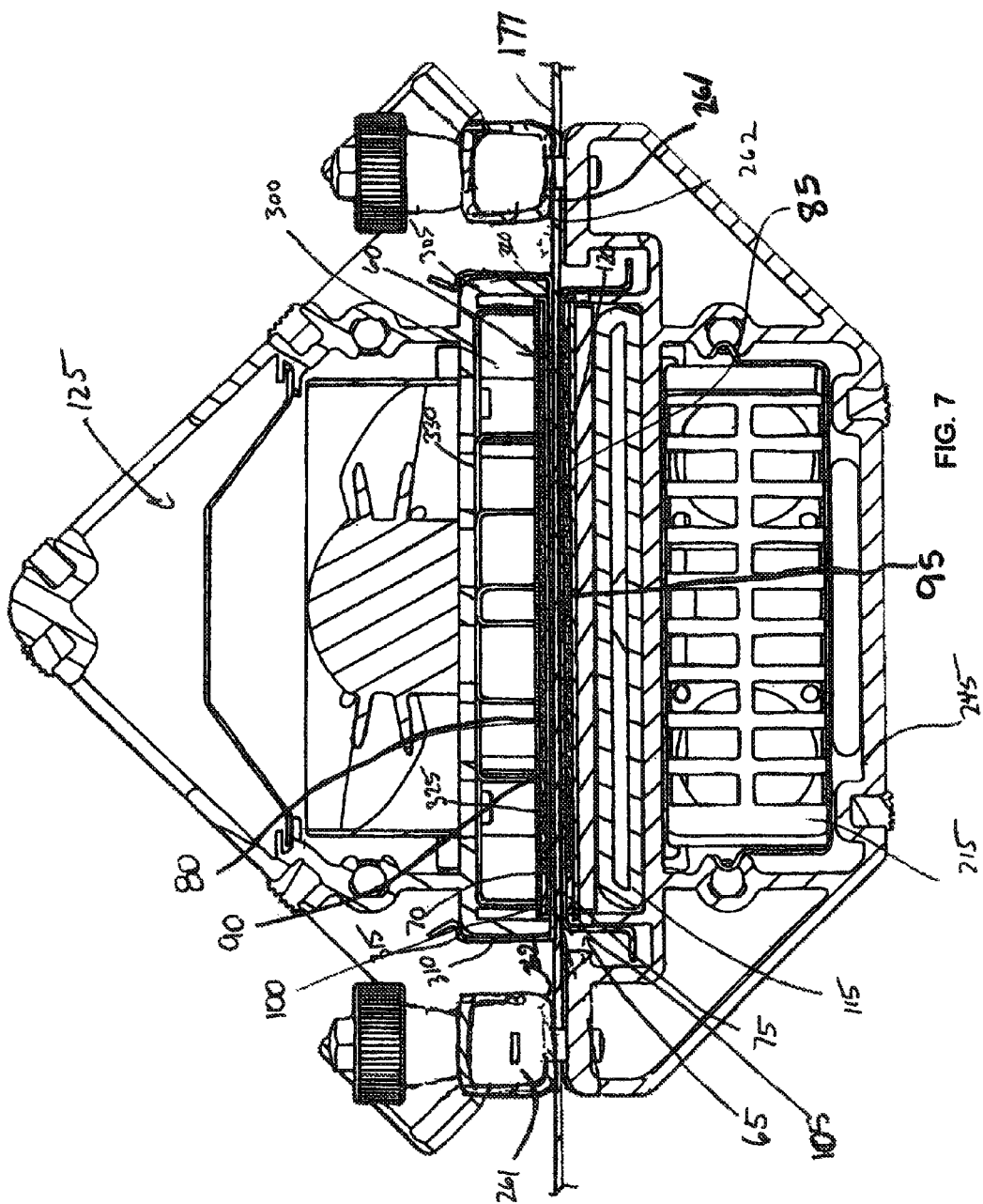
FIG. 7 is a cross-sectional view similar to FIG. 6 showing the splice press apparatus in an operating configuration with an inflatable bladder in an expanded configuration and heating elements heating the platens.

A heating device is arranged for heating at least one of the upper and lower platens 40 and 45 at an elongate central region thereof. As shown in FIGS. 3 and 6-7, when the housing assembly 6 is in an operative or clamped position so that the upper press assembly 10 rests on the belt ends 46 and is secured to the lower press assembly 15, the upper and lower platens 40 and 45 form the innermost belt facing or pressing surfaces of upper and lower heating assemblies 60 and 65. Although a thin sheet of non-stick material may be positioned between the upper and lower platens 40 and 45 and the belt ends 46 to restrict melted belt material from sticking to the upper and lower press surfaces 50 and 55, no thick, substantially rigid heat insulating member is positioned between the upper and lower platens and the belt ends during operation.

The heating assemblies 60 and 65 each have a generally layered or laminate structure with the belt facing platens 40 and 45 being the most inwardly positioned or belt facing layer. In one approach, upper and lower heating elements 70 and 75 are arranged adjacent to the platens 40 and 45 for heating the platens to provide heat to the conveyor belt ends 46. Prior to operation, a pair of dams formed, for example, by small square pieces of the same type of belt being spliced, may be positioned to abut the lateral (with respect to the belt) sides of the belt, to restrict the flow of belt material from the lateral edges of the belt. So configured, during operation of the splice press 5, the upper and lower heating elements 70 and 75, and specifically laterally central heated zones or regions 80 and 85 thereof, are heated to provide heat to the upper and lower platens 40 and 45 to a desired temperature. In this regard, only the central heated zones 80 and 85 of the heating elements 70 and 75 are heated, so that heat is provided generally to heated elongate central regions or central hot zones 90 and 95, of the platens 40 and 45, which thereby reach an operation or melting temperature.

The platens 40 and 45 are formed of a metallic material which restricts heat from transferring laterally from the heated elongate central regions 90 and 95, so that elongate opposite side edge portions or adjacent cool zones 100 and 105 of the platens 40 and 45 remain relatively cooler than the elongate central regions 90 and 95, at a temperature generally below a melt temperature of the belt material, forming temperature gradients across the lateral widths of the upper and lower heating elements 40 and 45, as illustrated in FIGS. 16A and 16B. It should be noted that the temperature will typically not abruptly drop off at the transition between the hot zones 90 and 95 and the adjacent cool zones 100 and 105 but will more gradually decrease laterally outwardly along the platens 40 and 45 between the hotter temperature of the hot zones 90 and 95 and the cooler temperature of the cool zones 100 and 105. The metallic material of the platens 40 and 45 restrict the flow of heat to the side edge portions from the heated central region, and to this end are preferably formed from a metal having a relatively low thermal conductivity. In addition, the upper and lower platens 40 and 45 may undergo deflection during operation at elevated pressures but resist permanent deformation due to high operation temperatures of up to about 200° C. In this regard, the platens 40 and 45 are preferably formed of a predetermined material having a low coefficient of thermal expansion, a low Young's modulus, and a high yield strength.

The belt splicing apparatus 5 is preferably self-contained and does not require additional external equipment or pneumatic or hydraulic supplies other than a power cord to be connected to a standard power supply source. In addition, the belt splicing apparatus 5 may include an on-board control system to draw power from a variety of different standard power supply sources to enable its use at a variety of locations regardless of the available power supplies. Preferably, in one approach, the belt splicing apparatus includes a power cord for connecting to a power supply source and otherwise does not require additional equipment or external hook-ups for operation. In one example, the entire belt splicing apparatus 5 is relatively lightweight, and may weigh less than about 150 lbs to provide easy portability. More particularly, a 300 mm belt splicing apparatus may have a weight of about 46 lbs, a 1500 mm belt splicing apparatus may have a weight of about 123 lbs, and splice presses with lengths between 300 and 1500 mm may have weights between about 46 lbs and 123 lbs.

During operation, as the heating elements 70 and 75 are heated to a preset splice temperature, an on-board air compressor 110 preferably mounted to the lower housing frame 15 generates compressed air and provides the air to an on-board inflatable bladder 115, positioned below the lower heating assembly 65, and also mounted to the housing frame 15. The compressed air inflates the bladder 115 to a preset pressure to drive the heating assembly 65 upwardly and the press surfaces 55 and 50 of the upper and lower platens 40 and 45 toward each other to tightly clamp against the belt ends 46 (FIG. 72) providing substantially uniform pressure to the splice zone 120 of the belt ends 46 without the need for external hoses or pneumatic sources so that the belt splicing apparatus 5 can be easily transported and used in a variety of locations. In one approach, the belt ends 46 are prepared in a finger-over-finger configuration, as known in the art, prior to splicing, wherein each of the belt ends is first split between plies of the belt and then the end of each ply is punched or cut in an overlapping and longitudinally offset pattern of triangular teeth configured to intermesh with teeth on the corresponding top or bottom ply on the opposite belt end. However, splices of belt ends having other configurations such as a standard finger patterns, or lap or step patterns can also be made with the belt splicing apparatus 5.

To quickly cool the heating assemblies 60 and 65 after completing a splice cycle to allow the belt splicing apparatus 5 to be used again after a relatively short period of time for forming subsequent high quality splices between belt ends 46, an on-board cooling system 125 is mounted to the upper press assembly 10 for directing forced ambient air along the upper surface 130 of the upper heating assembly 60 to cool both the upper and lower heating assemblies 60 and 65. To this end, in one example, one or more air movers in the form of ventilator fans 135 are positioned within the upper press assembly 10 and draw ambient air through intake vents 140 formed in the upper frame 20 inclined walls 280. The ventilator fans 135 force the air downwardly into a duct member or structure 145 wherein it is directed through a series of ducts or passageways 150 along the upper surface 130 of the upper heating assembly 60 until the air exits through exhaust vents 155 of the duct structure 145. In one form, the cooling system is formed of one or more cooling modules arranged in series along the longitudinal length of the upper frame 20, each being of a substantially universal size, and each including a ventilator fan 135 drawing air from intake vents 140 and being positioned above a corresponding duct structure 145 wherein the cooling module is sized to correspond to the smallest length belt splicing apparatus 5.

Turning first to the construction of the lower press assembly 15, the lower press assembly 15 includes a pair of trapezoidal end plates 35 mounted at each end of an elongate, generally hollow frame 25 having a similarly shaped trapezoidal cross section to form a lower housing frame or frame portion 26. The lower frame 25 may be formed from extruded aluminum to provide a lightweight structural frame, but may also be formed from different materials. As illustrated in FIG. 6 the frame upper portion 160 includes a center recess 165 extending longitudinally along the length of the of the lower frame 25 between two raised and longitudinally extending upper edge clamping surfaces 170. The center recess 165 is formed by depending recess walls 175 extending downwardly from the clamping surfaces and a generally horizontal recess lower wall 180. A pair of upstanding lower heating assembly housing sidewalls or guidewalls 185 protrude orthogonally upwardly from the recess lower wall 180 and extend along the longitudinal length of the recess 165 parallel to and slightly laterally inward from the recess walls 175 defining an upwardly open lower heating assembly housing 190. The guidewalls 185 and the recess walls 175 form a pair of platen retaining channels 195 extending longitudinally along both sides of the heating assembly housing 190. Laterally outer surfaces of the guidewalls 185 form a sliding guide surface 186 for guiding the upward and downward movement of the lower platen and restricting lateral movement thereof. A pair of elongate lower platen retaining tabs 200 protrude laterally inward from the clamping surfaces 170 beyond the recess walls 175 to provide a lower abutment surface for retaining the lower platen 45 and restricting the lower platen from moving vertically upward beyond a predetermined distance.

The lower heating assembly 65 is generally retained within the center recess 165 above the inflatable bladder 115, and includes an elongate layered or laminated structure of generally horizontally situated elements. With this configuration, during operation of the belt splicing apparatus, the inflatable bladder 115 inflates, urging the lower heating assembly 65 upwardly toward the upper heating assembly 60, and specifically the upper press surface 50 of the lower platen 45 is urged against the bottom surface of the conveyor belt ends 46 positioned between the platens 40 and 45 to increase the clamping force on the conveyor belt ends 46 between the upper and lower platens 40 and 45. As illustrated in FIG. 6, the heating element 75 is positioned below and adjacent to the lower platen 45. The lower heating element 75 may be disposed between the lower platen 45 and a rigid support plate 205 positioned thereunder to maintain the heating element against the lower platen 45. An insulating plate 210 is positioned below the support plate 205. The insulating plate 210 directs heat generated by the heating element 65 away from a lower housing 215 of the lower housing frame and toward the lower platen 45 during operation of the belt splicing apparatus 5 to reduce the amount of mass that is heated during operation of the heating element 75 and to generally protect sensitive electrical components that are mounted to the lower housing frame 26, for example, a pressure controller 415 and pressure device 110 mounted within the lower housing frame 26.

In one approach, the lower platen 45 forms the uppermost layer of the lower heating assembly 65 and is slidably retained by a pair of lower retaining portions 220 extending outwardly from a pair of depending lower platen leg portions 225 extending downwardly from a main elongate body portion 226 of the lower platen. The lower platen has a generally elongate thin plate configuration with opposite main surfaces 227 and 228, where the upper main surface 228 is a belt facing or upper press surface 50 and engages the conveyor belt ends 46 when the upper and lower frame portions are in the clamped or operative position as illustrated in FIG. 1. "Engaging" as used with respect to the platen/belt interface means that the upper and lower press surfaces 50 and 55 are clamped against the belt ends 46 without having a thick sheet of rigid insulating material positioned therebetween, but may include a thin sheet of flexible non-stick material positioned therebetween as discussed further below.

The width of the lower platen 45 is sized so that the belt facing surface or upper press surface 50 thereof provides a belt support surface with the upper clamp surfaces 170 when the press is not operating and so that lower platen leg portions 225 abut or are closely adjacent to outer surfaces of lower heating assembly housing sidewalls 185. The lateral extent of lower retaining portions 220 is sufficient so that an outer edge thereof is positioned below the platen retaining tabs 200. So configured, upon inflation of the bladder 115 during operation the lower platen 45 is restricted from moving laterally by the guidewalls 185 but is able to move vertically upward from the resting position as the depending leg portions 225 slide along the guidewalls 185 until the upper press surface 50 tightly engages the conveyor belt ends 45 or the lower retaining portions 220 contact the lower surface of the platen retaining tabs 200 restricting further upward vertical movement. Typically, during operation, the lower platen 45 will first contact the belt ends so that the upper platen 40 restricts further upward movement thereof prior to the lower retaining portions actually contacting the tabs 200.

The width of the upper press surface 50 of the lower platen 45 is also sized to provide a sufficient temperature gradient along the upper press surface for forming a high quality splice during heating thereof, with an elongate central hot region or central hot zone 95 and sufficient cooler adjacent lateral side edge portions or cool zones 105. In this regard, belt material adjacent to the cool zones 105 does not melt and provides a barrier to the flow of belt material adjacent to the hot zone 95 that melts during operation. To this end, in one form, the upper press surface 50 is wider than at least a central heated zone 80 of the lower heating element 75 and the heating element is arranged with the central heated zone along the elongate center region 95 of the lower platen. In this manner, the lower platen 45 is preferably formed of a material having a low thermal conductivity so that the heat generated at the central hot region 95 does not rapidly transfer laterally to the cool zones 105. In one example, the upper press surface is sized so that the elongate side edge portions 105 have a combined width that is less than about half of the width of the central hot region 95.

Figure 8:
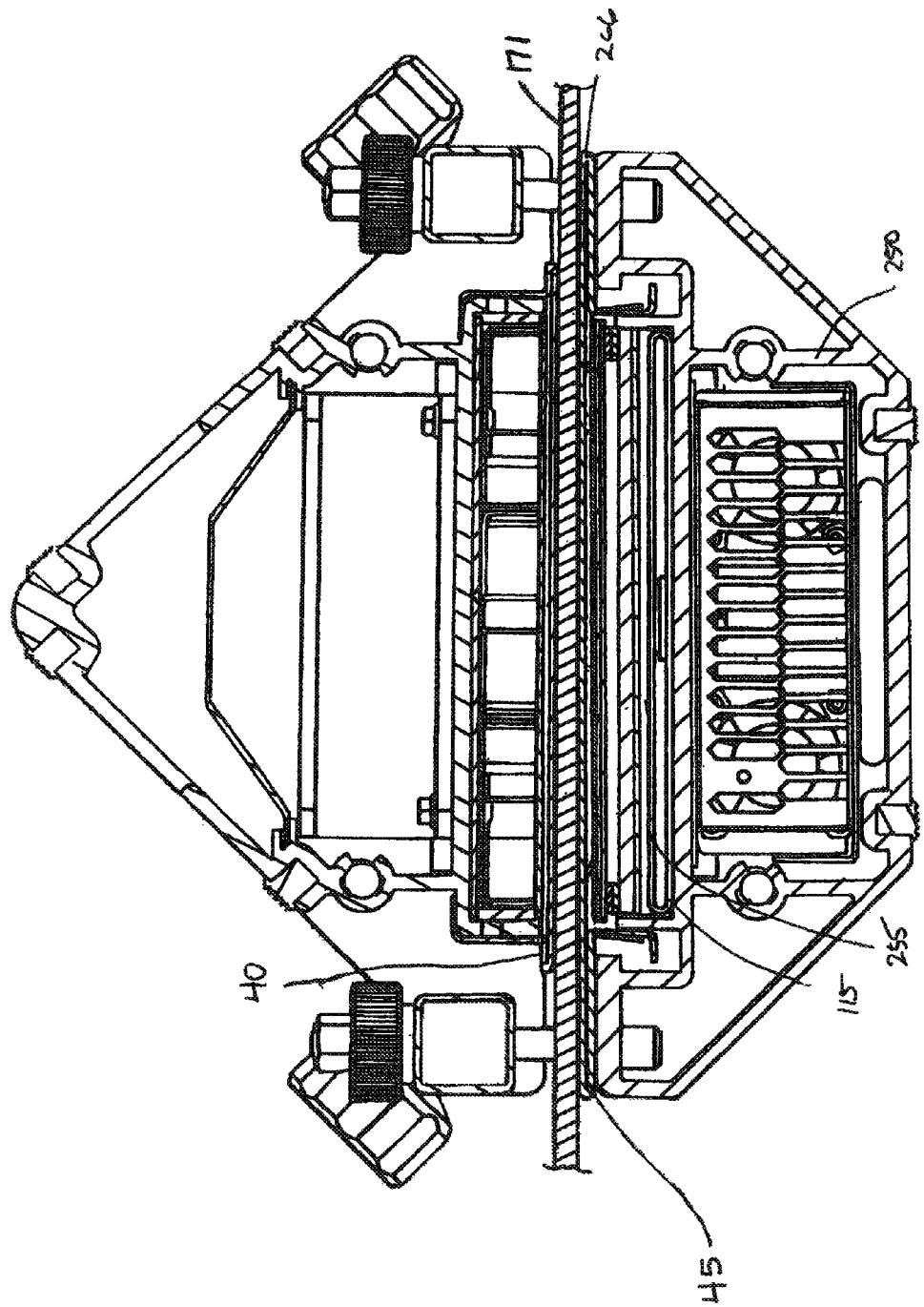
FIG. 8 is a cross-sectional view of the belt splicing apparatus of FIG. 5 taken along line A-A, illustrating a heating assembly and cooling system of the upper press assembly and a lower heating assembly and a pressure device of the lower press assembly with conveyor belt ends clamped between upper and lower platens and the lower platen extending below clamping bars.
Figure 9:
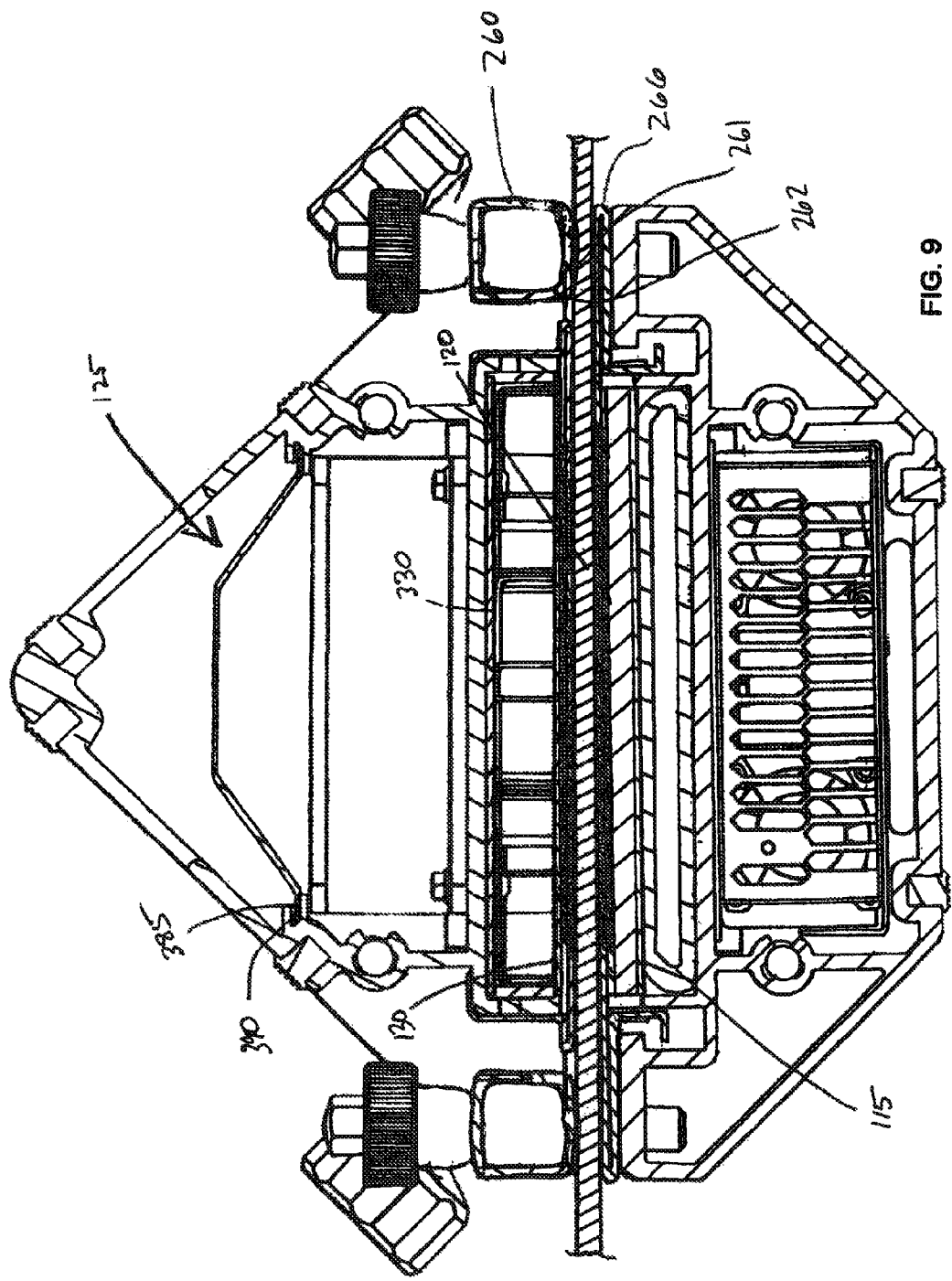
FIG. 9 is a cross-sectional view similar to FIG. 8 showing the splice press apparatus in an operating configuration with an inflatable bladder in an expanded configuration and heating elements heating an alternative platen configuration.

In another example, illustrated in FIGS. 8, 9, and 16B, in order to provide side edge portions 105*b* that are sufficiently wide to maintain the side edge portions 105*b* at a cooler temperature than the hot central region 95*b*, in one form, the lower platen 45*b* upper surface 50*b* extends beyond the housing sidewalls or guidewalls 185. In this regard, the platen is formed of a thin sheet of material that includes outboard portions 266 that extend beyond the lower platen leg portions 225. The platen 45*b* according to this example may be formed of a single thin sheet of metallic material with outboard portions being formed from overlapping folded portions 266 of the thin sheet so that the single thin sheet of material can be used for forming the platen 45*b* without the need for welding or cutting thereof. In this approach, the combined width of the elongate side edge portions 105*b* is greater than the width of the elongate hot central region 95*b*. In one example, the elongate side edge portions 105b are each about 42 mm wide and the central hot region is about 120 mm wide.

The belt splicing apparatus 5 can be configured to join various types of conveyor belts, including monolithic type conveyor belts, positive drive conveyor belts, and typical conveyor belts formed in layered plies including layers of a thermoplastic material, for example PVC or polyurethane, separated by layers of fabric, for example polyester, or other material used to increase the tensile strength of the belt. In this regard, in order to join the belt ends 46 together, the heating elements 70 and 75 are configured to heat the elongate central regions 80 and 85 of the platens so that the elongate central regions reach a temperature sufficient to melt the belt material so the belt material of the belt ends can join together. For joining conveyor belts formed of plies, the temperature of the elongate central regions 80 and 85 is typically set to a temperature at or above the melt temperature of the thermoplastic layers of the belt material. The elongate cool side edge portions 100 and 105, on the other hand, are maintained at a temperature below, and preferably substantially below the melt temperature of the belt materials, so that the belt material adjacent to the elongate side edge portions does not melt and remains sufficiently hard to form a barrier to the melted material flowing from the belt ends. For example, to join the ends of a two-ply PVC belt that is between about 1.9-5.3 mm thick together, the elongate central region may be heated to temperature of between about 340 and 380° F., while the elongate side edge portions remain substantially cooler during the splice operation. The temperatures may be maintained for this type of belt for about 1 to 2 minutes to sufficiently melt the belt material to join the belt ends together prior to cooling. To join the ends of a single or two-ply polyurethane belt together that are between about 0.7 and 3.7 mm thick together, the elongate central region may be heated to temperature of between about 330 to about 360° F., while the elongate side edge portions remain substantially cooler during the splice operation. The temperatures may be maintained for this type of belt for about 1 to 2 minutes to sufficiently melt the belt material to join the belt ends together prior to cooling.

During operation, a thin sheet of generally flexible non-stick material may optionally be positioned between the upper and lower press surfaces 50 and 55 of the upper and lower platens 40 and 45 and the belt ends 46 to prevent the melted belt material from sticking to the upper and lower platens. However, the thin sheet does not substantially insulate the heat flowing along the upper and lower press surfaces 50 and 55 or provide a significant amount of additional rigidity to the heating assemblies 60 and 65 or the platens 40 and 45. As mentioned previously, no thick substantially rigid heat insulating member is positioned between the platens 40 and 45 and the belt ends 46. The non-stick sheet may be formed of any non-stick material, such as silicone or Teflon and typically is formed of a flexible material having a thickness of between about 0.2 mm and about 1.5 mm. The thin non-stick sheet may be included to prevent sticking of the belt end material to the belt facing surfaces and the potential material loss at the splice location of the belt ends 46 that this could cause.

As mentioned previously, the lower heating element 75, extending longitudinally below and adjacent to the lower platen 45 provides heat to an elongate central region or central hot zone 95 of the lower platen 45 during operation. The heating element 75 can include a variety of conventional and commercially available flat heating elements of relatively thin construction that provide proper dimensions and heating area. In one example, the heating element 75 is formed of electrical resistance wires embedded in a silicone rubber sheet. While the heating element 75, as illustrated in FIG. 6 extends laterally below substantially the entire width of the lower platen 45, the actual resistive heating wires are located in a central heated zone 85 (FIGS. 7 and 9) so that only the central heated zone 85 of the heating element 75 is electrically heated during belt splicing, providing the central hot zone 95 and 95b along the width of the adjacent lower platen 45 with laterally adjacent cool zones 105 and 105b being formed on either side thereof.

The lower support plate 205 formed of steel or other rigid material is positioned directly below the heating element 75 to provide support thereto and to maintain the heating element 75 in tight engagement with the lower platen 45. The support plate also acts as a spacer to make up for thickness variations in the heating element 75 caused by resistive heating wires running through the heating element 75. In one form, the lateral width of the support plate 205 is sized so that the outermost edges thereof extend above upper edges 230 of the guidewalls 185 so that when the belt splicing apparatus 5 is not operating, and the inflatable bladder 115 is not inflated, the lateral edges of the support plate 205 may rest on the upper edges 230.

Figure 12A:
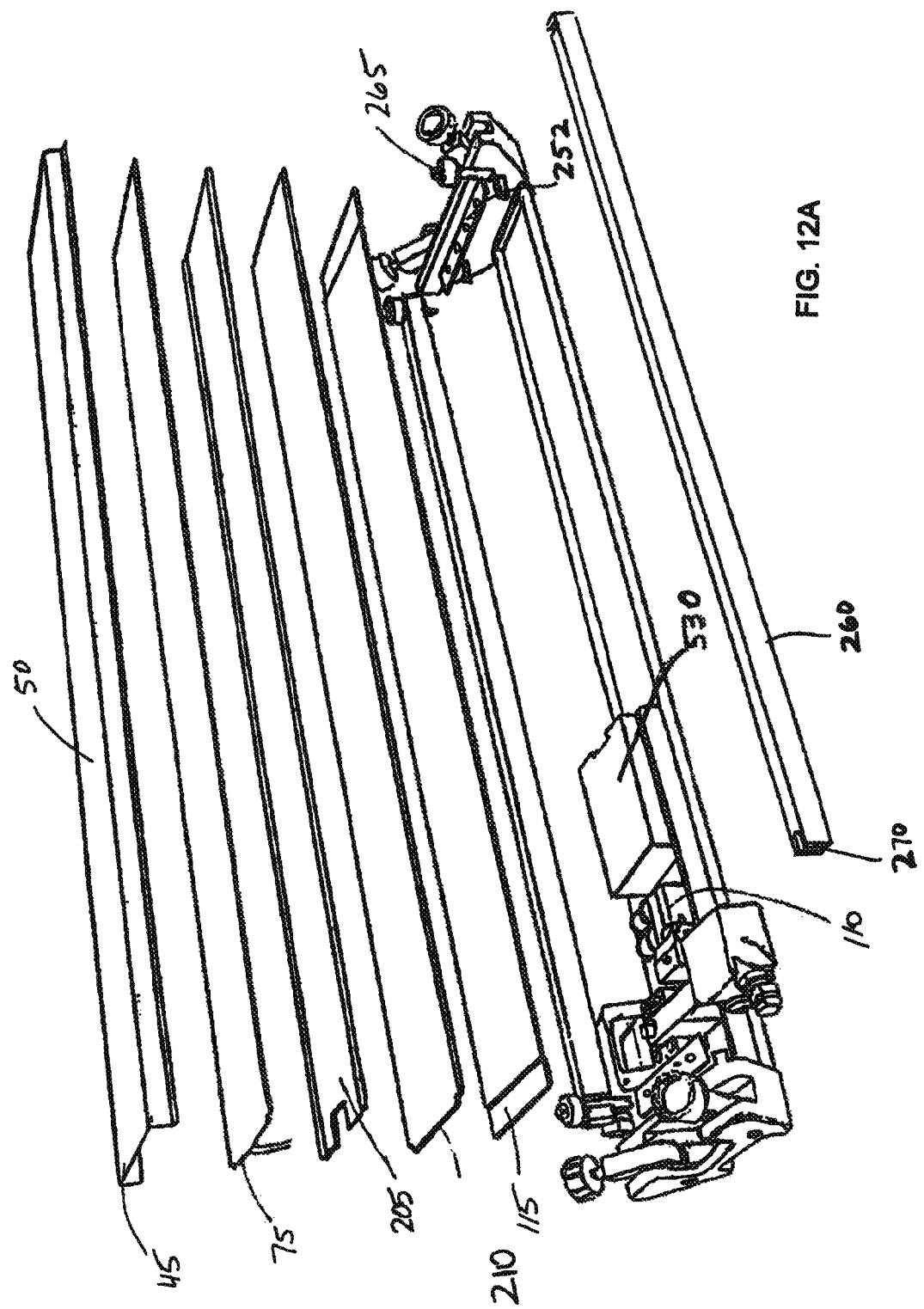
FIG. 12A is an exploded perspective view of a lower press assembly of the belt splicing apparatus of FIG. 1.

As illustrated in FIGS. 6 and 12A the insulator plate 210 formed of heat insulating material is positioned below the support plate 205. The insulator plate 210 provides a barrier to restrict heat from flowing toward the lower housing 215 and lower frame 25 generally. In this regard, the lower insulator plate 210 protects electrical components therein and maintains the lower frame 25 at a lower relative temperature during splicing, while additionally directing the heat toward the lower platen 45 reducing the amount of heat that the heating element 75 must generate to sufficiently heat the belt ends 46 for joining together. In addition, by directing the heat toward the lower platen 45, less mass is actually heated during operation that must be cooled after completing a splice prior to a subsequent splice being made by the press 5 than if the entire lower press assembly 15 were heated so that cycle time is reduced and more control is provided over the heat being applied to the belt ends. The insulator plate 210 extends longitudinally below substantially the entire lower platen 45, however, its lateral width is sized to provide a slight clearance between its lateral edges and the inner surface of the lower heating assembly housing sidewalls 185 so that the insulator plate may move vertically into the heating assembly housing 190. During operation, the insulator plate 210 is engaged from below by the inflatable bladder 115 which drives the heating assembly 65 upwardly toward the belt ends 46. In another approach, in a non-operation or resting position, the insulator plate 210 rests on the end clamps 252 or other support structures at opposite longitudinal end portions thereof.

In a preferred form, both the upper and lower platens 40 and 45 are formed from a metallic material providing a relatively high yield strength, while also exhibiting a relatively low coefficient of thermal expansion ($\alpha$), Young's modulus (E) and thermal conductivity ($\kappa$). The platens 40 and 45 are formed in relatively thin sheets, allowing them to undergo deflection during operation at high pressures, but reducing the overall amount of mass that must be heated and subsequently cooled after each splicing cycle, thereby providing greater control over the temperature being applied to the belt ends while also reducing the amount of time an operator must wait before making a subsequent splice. In one approach, the heating elements 70 and 75 also have a thin sheet configuration, and the platen body portions 226 and 229 have a thin thickness between main surfaces thereof that is less than the thickness of the heating elements 70 and 75. In one approach, the thin thickness of the platen bodies is about 1 mm.

Due to the elevated temperatures of up to about 200° C. that the platens 40 and 45 reach during operation, forming them from a material with a relatively low coefficient of thermal expansion reduces the amount of thermal expansion that they will undergo during a splicing cycle in response to the elevated temperatures. In addition, because only an elongate central region 90 and 95 of the platens 40 and 45 is heated so that a temperature gradient is formed across the platens 40 and 45 with adjacent cool zones 100 and 105, deformation caused by thermal expansion will create corresponding stresses and strains at the transition between the hot and cool zones. It is believed that permanent deformation is not caused by the elevated pressures causing deflection during operation as previously believed, but instead results primarily to the high temperatures causing a center heated portion of the platen to expand more rapidly than the lateral cooler edges and other restrictions to even expansion of the platens due to other structures and components of the belt splicing apparatus. It is believed that these stresses were ultimately responsible to platens of prior approaches reaching their yield stresses and undergoing permanent warping.

The thin sheet platen metallic material of the present belt splicing apparatus 5 having a relatively low Young's modulus and coefficient of thermal expansion, therefore, allows the platens 40 and 45 to undergo deflection during operation, but advantageously resists permanent deformation that the platens would otherwise undergo during operation, if formed of another material such as steel. It is believed that the low Young's modulus decreases the amount of stress formed in the platens 40 and 45 due to a particular strain caused by thermal expansion, thereby increasing the strain that the material can undergo before reaching its yield stress. In this sense, the metallic material of the platens 40 and 45 of the present belt splicing apparatus, having both a low coefficient of thermal expansion and a low Young's modulus can significantly decrease the amount of permanent deformation or warping that the platens 40 and 45 undergo compared to other materials such as steel when subjected to the elevated temperatures, even though the low Young's modulus of the material will increase the amount of deflection that the platens 40 and 45 will undergo when subjected to the pressures exerted by the pressure device 110 during each splicing operation. Reducing the amount of permanent deformation that the platens experience produces a more uniform pressure that is applied by the press surfaces 50 and 55 to the belt ends 46 over the splice zone 120 during operation, which results in a stronger splice with a more uniform thickness than would otherwise result if non-uniform pressure were applied, as may occur with other materials that do undergo permanent deformation, such as steel or aluminum. The additional deflection of the upper and lower platens 40 and 45 is accounted for by including the elongate inflatable bladder 115 which applies generally uniform pressures along the lower platen 45 so that the platens provide generally uniform heat and pressure to the belt ends 46. The upper and lower platens 40 and 45 are preferably formed from a material that also has a high yield strength. The high yield strength of the material further increases the amount of strain the platens 40 and 45 can experience due to thermal expansion thereof without becoming permanently deformed.

In one aspect, the upper and lower platens 40 and 45 are formed of a predetermined material having a low thermal conductivity. In this manner, a temperature gradient can be formed across the width of the upper and lower platens 40 and 45 with a heated elongate central region 90 and 95 and lateral cooler side edge portions 100 and 105 without the need for a thick, substantially rigid insulating member to be positioned between the platen and the conveyor belt ends 46. The low heat conductivity of the predetermined material restricts the conduction of heat across the surface of the platens 40 and 45 from the heated elongate central regions 90 and 95 to the lateral cool side edge portions 100 and 105, without the need for positioning an additional insulating layer along the press surfaces of the platens or running a cooling fluid along the side edge portions. As mentioned earlier, forming this large temperature gradient assists in creating a high quality final splice because the cool zones 100 and 105 do not reach a temperature sufficient to soften the belt material located therebetween to an extent necessary for the material to melt. The belt material located between the cool zones, thereby creates a solid material barrier that restricts the softened material adjacent to the hot zones from flowing outside of the splice zone 120 under the pressure of the platens 40 and 45. The non-softened adjacent areas of the belts also act as spacers to restrict the platens from moving together substantially closer than the original thickness of the belt, so that the splice zone 120 does not become thinner than the original thickness of the belt and the upper and lower platens 40 and 45 do not squeeze melted belt material from the heated belt area. This reduces the likelihood of forming a splice of uneven thickness or a belt having a surface ridge formed at a location of the splice where the platens squeezed the belt together to an extent greater than the original thickness of the belt.

In one approach, the upper and lower platens 40 and 45 are formed from a relatively thin sheet of a predetermined material having a low coefficient of thermal expansion below about $13.1 \times 10^{-6}$ in./in./° F., the coefficient of thermal expansion for aluminum. In another approach, the predetermined material of the upper and lower platens 40 and 45 has a coefficient of thermal expansion of below about $6.7 \times 10^{-6}$ the coefficient of thermal expansion of steel, a material that has been used for press plates in the past and has been found to undergo unacceptable permanent deformation or warping during the splice cycle. In yet another approach, the predetermined material has a coefficient of thermal expansion of about $4.7 \times 10^{-6}$ in./in./° F., which is about the coefficient of thermal expansion of titanium.

In one approach the upper and lower platens 40 and 45 are formed of a relatively thin sheet of a predetermined material having a low Young's modulus below about 30,000,000 psi, which is about the Young's modulus of steel, a material that has exhibited unacceptable permanent deformation or warping upon being heated to operation temperatures of up to about 200° C. after several splicing operations. In one approach, the predetermined material has a low Young's modulus of about 16,000,000 psi, which is about the Young's modulus of titanium.

In one approach, the upper and lower platens 40 and 45 are formed from a relatively thin sheet of a predetermined material having a high yield strength above about $502 \times 10^6$ N/m$^2$, which is about the yield strength of stainless steel. In another approach, the predetermined material has a yield strength of about $730 \times 10^6$ N/m$^2$, which is about the yield strength of titanium alloy.

In one form, the predetermined material has a low thermal or heat conductivity below about 135 Btu/hr-ft-° F., which is the thermal conductivity of aluminum, a material that has been found to unacceptably conduct heat across its surface so that a sufficient temperature cannot be formed in press plates made of this material. In another approach, the thermal conductivity of the predetermined material is about 12.65 Btu/hr-ft-° F., which is about the thermal conductivity of titanium.

In one form, the predetermined material is formed of titanium or titanium alloy because it provides an ideal platen material that includes a sufficiently low coefficient of thermal expansion and Young's modulus and high yield strength to restrict permanent deformation at operation temperatures of up to about 200° C., and has a sufficiently low thermal conductivity so that an adequate temperature gradient can be formed across the width of the upper and lower platens 40 and 45 by heating a center portion thereof to produce a heated elongate central region and cooler elongate side edge portions adjacent thereto for forming high quality splices. In addition, the material choice allows the upper and lower platens 40 and 45 to directly engage the belt ends 46 with an optional thin sheet of non-stick material positioned therebetween, without the need for positioning a thick, substantially rigid insulating member between the platens 40 and 45 and the belt ends 46

In one approach, to provide the pressure required to urge the lower platen 45 toward the upper platen 40 to provide a clamping force on the belt ends 46 during operation, the air compressor 110 is located within inner housing 215 of the lower frame 25, which is generally formed by the lower surface 180, the frame bottom portion 245, a pair of inner housing sidewalls 250, and the lower end walls 35. The air compressor 110 is in fluid communication with the inflatable bladder 115 for providing pressurized air thereto. The air compressor inflates the bladder without requiring an external air supply source for supplying compressed air to the belt splicing apparatus 5. In one approach, the air compressor 110 is capable of generating a pressure of up to about 2 bar to the inflatable bladder 115 which is generally sufficient for purposes of the splicing operation.

During operation, the air compressor 110 provides compressed air to the inflatable air bladder 115 to cause it to fill with compressed air so that the upper portion 255 thereof rises from its resting position and engages the lower heating assembly 65 to urge it upwardly so that the lower platen 45 upper press surface 50 tightly engages the bottom surface of the belt ends 46. As a result, the upper surfaces of the belt ends 46 tightly engage the upper platen 40 lower press surface 55 so that the belt ends 46 are tightly clamped between the upper and lower platens 40 and 45 and substantially uniform pressure is applied across their flat pressing surfaces 50 and 55 as described above. The inflatable bladder 115 may be formed from flexible hollow tubing that can sufficiently expand to apply pressure to the lower heating assembly 65 and has sufficient strength to reduce the likelihood of failure of the bladder 115. As an example, a length of fire hose that when flattened is approximately equal in width to the width of the lower heating assembly housing 190 so that the fire hose securely rests within the lower heating assembly housing 190 provides a sufficiently flexible and strong inflatable bladder 115. So configured, during inflation of the bladder 115, the heating assembly housing guidewalls 185 and lower wall 180 restrict lateral and downward expansion of the bladder 115 urging it instead to expand generally in the upward vertical direction toward the lower heating assembly 65.

The bladder 115 may be mounted to the lower frame 25 at each longitudinal end thereof with end clamps 252 and bolts 251 or other fasteners. A lower aperture is formed at a lower portion of the bladder to communicate with the air compressor through a corresponding aperture formed in the recess lower surface 180. So configured, tubing may be connected between the air compressor 110 and the bladder 115 to supply the fluid communication. In one example, the width and length of the inflatable bladder are sufficient so that a substantially uniform pressure is applied against the heating assembly 65 upon inflation, reducing the deflection of the lower platen 45 to apply more uniform pressure to the belt ends 46 for the reasons described previously.

It has been identified that in some circumstances, uniform pressure is not applied along the entire longitudinal length of the lower platen 45 upper press surface 50 during inflation of the bladder 115, particularly near longitudinal end portions 116 thereof where the edge portions 117 of the belt ends are positioned (FIG. 3). More particularly, it is believed that because belt clamps 252 are used to hold the belt ends portions 116 down against the lower wall 180, the longitudinal end portions 116 of the inflatable bladder 115 do not inflate as much as intermediate portions thereof. In this regard, the pressure applied to the lower platen 45 and therefore against the lateral edges portions 117 of the belt ends 46 is less than the pressure applied to the center portion 118 of the platen 45 and the lateral center portion 119 of the belt ends 46. This uneven pressure distribution has been found to creating scorching or insufficient melt width at the lateral belt edge portions 117, particularly at portion of the belt edges contacting the laterally central portion 121 of the lower platen 45 at the longitudinal end portions 116 thereof. Not to be limited by theory, it is believed that the scorching may be caused by the uneven pressure distribution causing the longitudinal end portions 116 of the lower platen to engage the belt ends at the laterally central portion 121 thereof, but insufficiently contact the belt ends 46 at the adjacent side edge portions 122. Because of this small region of contact between the platens 40 and 45 and the belt ends 46, the heat from the platens during operation becomes focused at this contact region rather than being transferred at the non-contacting lateral edge portions 122 thereof, so that the belt material engaging the platen at this region receives excessive heat from the platen causing the scorching of the belt ends at the region.

Figure 12C:
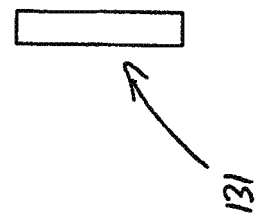
FIG. 12C is a top view of a spacer for raising the end clamp for the inflatable bladder.
Figure 12B:
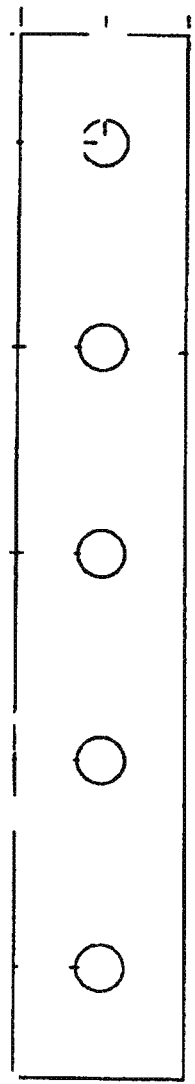
FIG. 12B is a top view of a spacer for raising the end clamp for the inflatable bladder.
Figure 13:
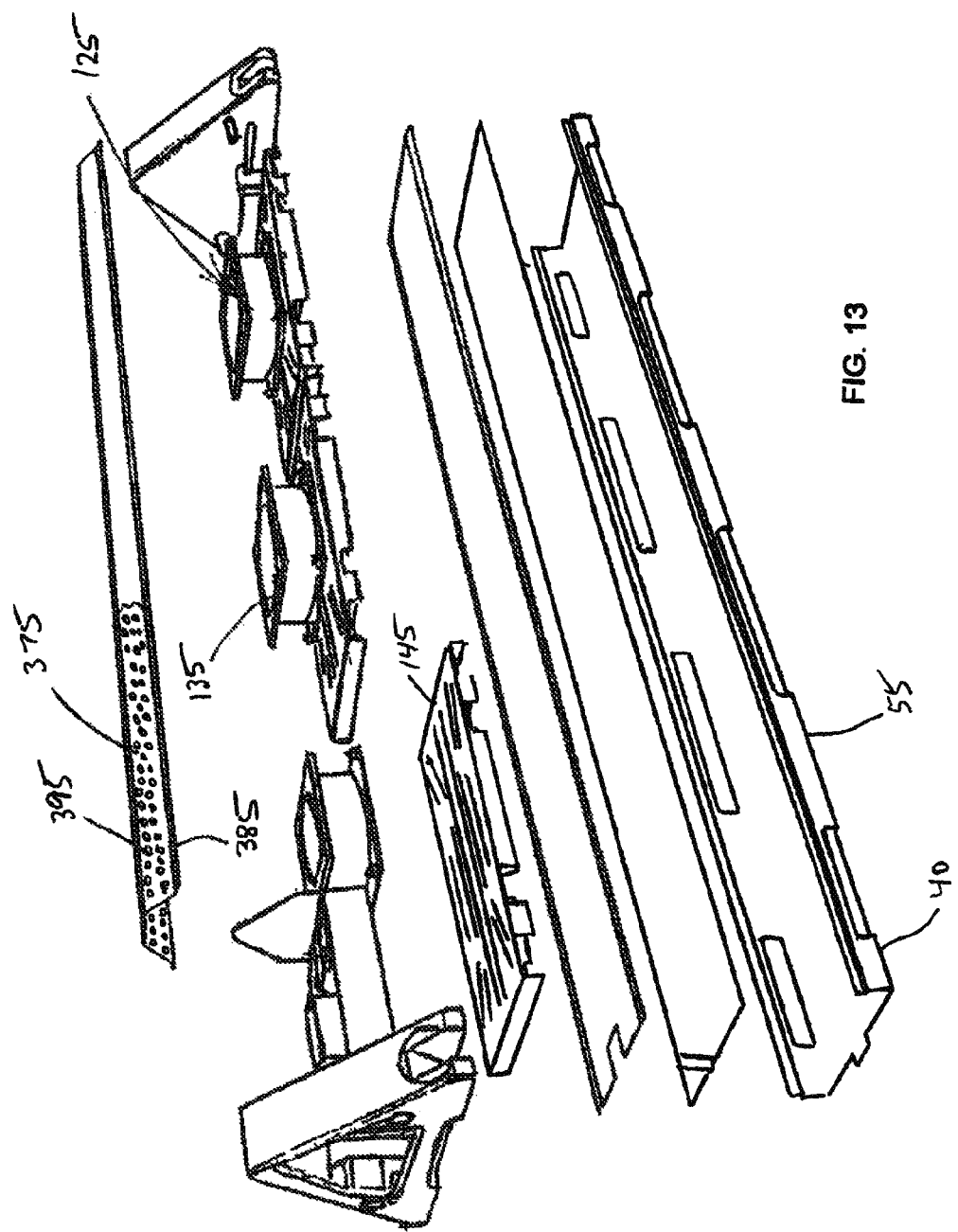
FIG. 13 is an exploded perspective view of a upper press assembly of the belt splicing apparatus of FIG. 1.

In one form, to address the uneven heating distribution at the longitudinal ends of the platen 45 caused by the uneven pressure distribution applied by the bladder 115 at these locations, the end clamps 252 for securing the inflatable bladder at the longitudinal ends thereof are raised during inflation thereof. To this end, in one example, a spacer 131 (FIG. 12B-12C) is disposed between each of the ends clamps 252 and the lower wall 180 to raise the end clamps 252 above the lower wall 180. The spacers 131 should be sized to sufficiently lift the end clamps 252 to restrict their interference with the pressure applied by the bladder 115 to the longitudinal end portions 116 of the lower platen 45. In one example, the spacers may be about 5 mm in thickness. In another example, the spacer raises the end clamps 252 so that they are closely adjacent to a lower surface 136 of the lower heating assembly 65. According to another example, the end clamps 252 are slidably mounted to the lower housing so that they are generally restricted from shifting longitudinally and laterally, but are configured to shift vertically. In this regard, upon inflation of the inflatable bladder 115, the end clamps 252 may shift upwardly with the longitudinal end portions of the inflating bladder 115 to avoid restricting the upward movement of the upper portion of the bladder 115 at its longitudinal edges so that the inflatable bladder 115 upper surface can apply more uniform pressure to the longitudinal end portions 116 of the lower platen 45 during operation thereof. In another approach, the end clamps 252 are narrow in the longitudinal or lengthwise direction to minimize their interference with the inflation of the bladder 115. In one example, the narrow width of the end clamps 252 may be about 25 mm.

As seen in FIG. 6, a relatively small gap 137 is formed between the lower surface 136 of the heating assembly 65 and the upper surface 138 of the inflatable bladder 115, prior to inflation thereof, so that the bladder 115 only needs to inflate by a small amount before contacting and driving the heating assembly 65 upwardly. The small vertical movement by the bladder 115, maintains the bladder 115 in a generally flat state to apply uniform pressure across the lower heating assembly 65, rather than forming a circular profile, as would occur if the bladder 115 were completely inflated. This also allows the lower press assembly 15 to be assembled with a lower profile, for fitting under conveyor belts so that belt splicing can be performed without removing the belt from its support structure in its operation position.

When the belt ends 46 are positioned against one another and resting on the lower platen 45 and the clamping surfaces 170, the lower press assembly 15 also includes a pair of clamping bars 260 (FIGS. 1 and 3) that can be positioned above portions of the belt adjacent to the splice zone 120 above the clamp surfaces 170. In one approach, clamp bars are elongated metal bars with substantially tubular or square cross sections having end slots 270 sized for capturing retaining studs 265 extending upwardly from the clamping surfaces 170. With the clamping bars 260 resting on the belt ends 46 and the retaining studs 266 within the end slots 265, retaining nuts 266 disposed on retaining studs 265 can be tightened to urge the clamping bars 260 into tight engagement with the belt ends 46 upper surfaces to secure the belt ends 46 and ensure that the splice zone 120 does not shift during operation of the belt splicing apparatus. After the conveyor belt ends 46 are clamped between the upper press assembly 10 and the lower press assembly 15, the clamp bars may be removed to minimize their interference with the heating of the lower platen 45 and to avoid the pressure that they would otherwise apply to the upper surfaces of the conveyor belt ends 46 upon inflation of the inflatable bladder 115.

It has been identified that while clamping bars 260 help maintain the position of the belt ends 46 between the upper and lower platens 40 and 45, they can also contribute to splices having uneven thicknesses and surface discontinuities. More particularly, as seen in FIG. 7, with the clamping bars 260 clamped against the upper surfaces 171 of the conveyor belt ends 46, as the inflatable bladder 115 expands and drives the lower heating assembly 65 upwardly, the upper press surface 50 of the lower platen 45 is capable of moving upwardly beyond lower surfaces 261 of the clamping bars 260 into the lateral space between the clamping bars 260. However, the clamping bars 260 restrict the upward movement of the portions of the belt ends 46 positioned under the clamping bars 260. In this regard, inner belt facing corners 262 of the clamp bars 260 may impart a large localized shear force against the belt end upper surfaces 171 at this location forming a thinner portion thereof and a groove or surface discontinuity where the corners 262 contact the belt ends upper surfaces 171 during operation. Thus, in one approach illustrated in FIG. 9, the lower platen outboard portions 266, described previously, extend below the clamping bars so that pressure is applied to the belt ends 46 by the lower platen 45*b* even below the clamping bars 260. In this regard, the central portion of the belt ends 46 is not raised substantially higher than the laterally adjacent portions positioned beneath the clamp bars 170, to reduce the shear force applied against the belt end upper surfaces 171 to avoid the inner corners 262 from forming thinner portions of the belt and discontinuities in the belt surfaces 171.

Turning now to the construction of the upper press assembly or housing frame 10; the upper press assembly 10 includes a pair of generally triangular shaped end plates 30 connected at each end of an elongate extruded upper frame 20 of lightweight extruded material to form an upper frame portion or housing frame 21. The upper frame 20 may be formed of extruded aluminum to provide light weight and structural support to the upper frame portion 21. The upper frame 20 includes a main upper housing 275 and includes a generally inverted V-shaped upper surface with opposite inclined upper surface portions or walls 280 and downwardly extending sidewalls 285 which terminate at lower junctions with a frame lower portion 290. The frame lower portion 290 has a pair of platen retaining portions 295 that project laterally outward beyond the sidewalls 285. A downwardly opening upper heating assembly housing 300 is formed by a frame lower portion 290 and a pair of generally parallel depending sidewalls 305 extending downwardly from outer edges of the platen retaining portions 295.

The upper heating assembly 60 is similar in construction to the lower heating assembly 65, and has a similar laminated or layered construction, except in a substantially mirror image relationship relative thereto with the upper platen 40 forming a lower platen facing layer of the upper heating assembly 60. In addition, as described below, a duct member or portion may be positioned intermediate the upper heating assembly below an upper insulating member. The upper platen 40 retains the upper heating assembly 60 within the heating assembly housing 300 through a slide-fit connection with the platen retaining portions 295. More specifically, the upper platen 40 includes a pair of upwardly extending leg portions 310 terminating at an inwardly formed notch 315. In this manner, the leg portions 310 tightly abut the housing sidewalls 305 restricting lateral movement of the platen 40 relative to the heating assembly housing 300. The notch portions 315 are formed at a sufficient distance upward along the leg portions 310 from an upper surface 320 of the platen 40 so that the housing sidewalls 305 and the platen retaining portions 295 can be received within the space between the upper surface 320 and the notch portions 315, forming a secure connection therebetween. The upper platen 40 is preferably formed from a predetermined material similar to the lower platen 45 as described previously and has a width sufficient to form a temperature gradient thereacross with an elongate heated central region 90 and cooler side edge portions 100.

The upper heating element 70, having substantially similar construction to the lower heating element 75 described earlier, is positioned directly above and adjacent to the upper platen 40 and rests thereon, with a upper support plate 325, having similar construction to the lower support plate 205, positioned adjacent to the heating element 70 so that the heating element 70 is sandwiched between the upper support plate 325 and the upper platen 40. As mentioned, in contrast with the lower press assembly 15, an upper insulating plate 330 (shown in FIGS. 7 and 9) is not positioned directly adjacent to the upper support plate 325, but instead the duct structure 145 is positioned between the upper support plate 325, and the insulating plate 330 positioned thereabove. In this regard, the air cooling system 125 does not force ambient air against the top of the insulating plate 330, but directly against the heated portions of the upper heating assembly 60 to more efficiently cool the belt splicing apparatus 5 after a splicing cycle. In addition, positioning the insulating plate 330 above the duct structure 145 effectively provides resistance to heat traveling upward toward the upper housing, and directs heat toward the upper heat assembly 60. As described above, this configuration reduces the overall amount of heat that must be generated to sufficiently heat the conveyor belt ends 46, while additionally reducing the amount of overall heated mass that must be cooled after a splice cycle. The upper support plate 325 also serves to secure the heating element against the upper platen as well as protect the heating element from downwardly extending duct walls 151 immediately above the support plate 325. The upper support plate 325 also serves as a spacer to account for resistive heating wires within the upper heating element 70 that provide additional localized thickness.

The end walls 30 of the upper press assembly 10 additionally include clamping devices 344 with a clamp actuator 346 operable to generate a clamping force on the belt ends 46 with the upper and lower frame portions in the closed or clamping configuration. More specifically, a pair of opposite outwardly opening slots 340 are included in the upper frame portion 21 corresponding to rotatable shaft members or bolts 345 rotatably connected to the end walls 35 of the lower frame portion 26. The slots 340 are configured and sized to capture the rotatable bolts 345 when the upper press assembly 10 is positioned above the belt ends 46 in an operating position and the rotatable bolts 345 are rotated upwardly into the slots 340. The clamping devices 344 include pivot mounts 347 about which the rotatable bolts can rotate for being positioned into and out of mating relationship with the outwardly opening slots 340. With the rotatable bolts 345 captured within the slots 340, the actuator members 346 can be engaged, for example by tightening the bolts, to urge the upper press assembly 10 toward the lower press assembly 15 and securely retain the upper press assembly 10 in its operation position even when the pressurized inflatable bladder 115 applies pressure to the upper press assembly 10 through the lower platen 45 during operation.

In one approach, due to the generally inverted V-shaped configuration of the upper surface 279, the bolts have upper actuator devices 346 that can be actuated to engage against the inclined surface portions 280 so that the clamping devices 344 exert a clamping force against the upper frame portion that is generally normal to the inclined surface portions 280 to provide an inwardly and downwardly directed clamping force on the belt ends 46. The pivot mounts 347 of the clamping bolts is disposed inwardly of the outer surfaces 348 of the housing assembly 6 so that the clamping bolts 345 have operable and stowed positions. In the stowed position the bolt or shaft members 345 rest on upper support surfaces 349 with the clamp actuators 346 closely adjacent to the outer surfaces 348, so that the clamp actuators 346 are closely adjacent to the outer surfaces 348 in both the operable and stowed positions to reduce interference or damage that could otherwise be cause during transportation of the belt splicing apparatus 5.

As mentioned previously, the belt splicing apparatus 5 includes an on-board cooling system 125 mounted to the upper frame portion 21 and in one example, is located within the upper press assembly 10. The cooling system 125 performs a cooling cycle after a splice cycle is completed to rapidly cool the heating assemblies 60 and 65 to a sufficiently low temperature to prepare for a subsequent splice without requiring hoses for connection to external pneumatic or hydraulic supplies. The positioning of the cooling system in the upper press assembly 10 rather than the lower press assembly 15 allows it to cool the heating assemblies 60 and 65 without having to transfer heat through the inflatable bladder 115, and also allowing for a lower profile of the lower press assembly 15, which must be positioned under a belt on a conveyor system if the splice is being performed in-situ.

In one approach, the cooling system may be formed in one or more uniformly sized modules, with each module corresponding to a longitudinal section of the heating assembly underlying the module, such that each cooling module is used primarily to cool the longitudinal section located thereneath. In one example each module includes a ventilator fan positioned above a duct structure 145 at a location generally central to the duct structure 145. The size of each module may be determined based on the overall length of the press and the typical widths of belts used with the press along with thermal properties of the heating assembly and the size of the ventilator fan 135 being used. In other words, the belt splicing apparatus 5 may be constructed having one of several discrete lengths, with the modules corresponding in length to the smallest of such discrete lengths of the belt splicing apparatus 5 so that for longer splice presses, one or more cooling modules can be arranged end to end along the length of the belt splicing apparatus 5. In one example, the modules are made in increments of about 300 mm, so that the presses can be formed in 300, 600, 900, and other multiples of 300 mm, while using the same module, because conveyor belts are typically formed in widths of 300 mm multiples.

Figure 4:
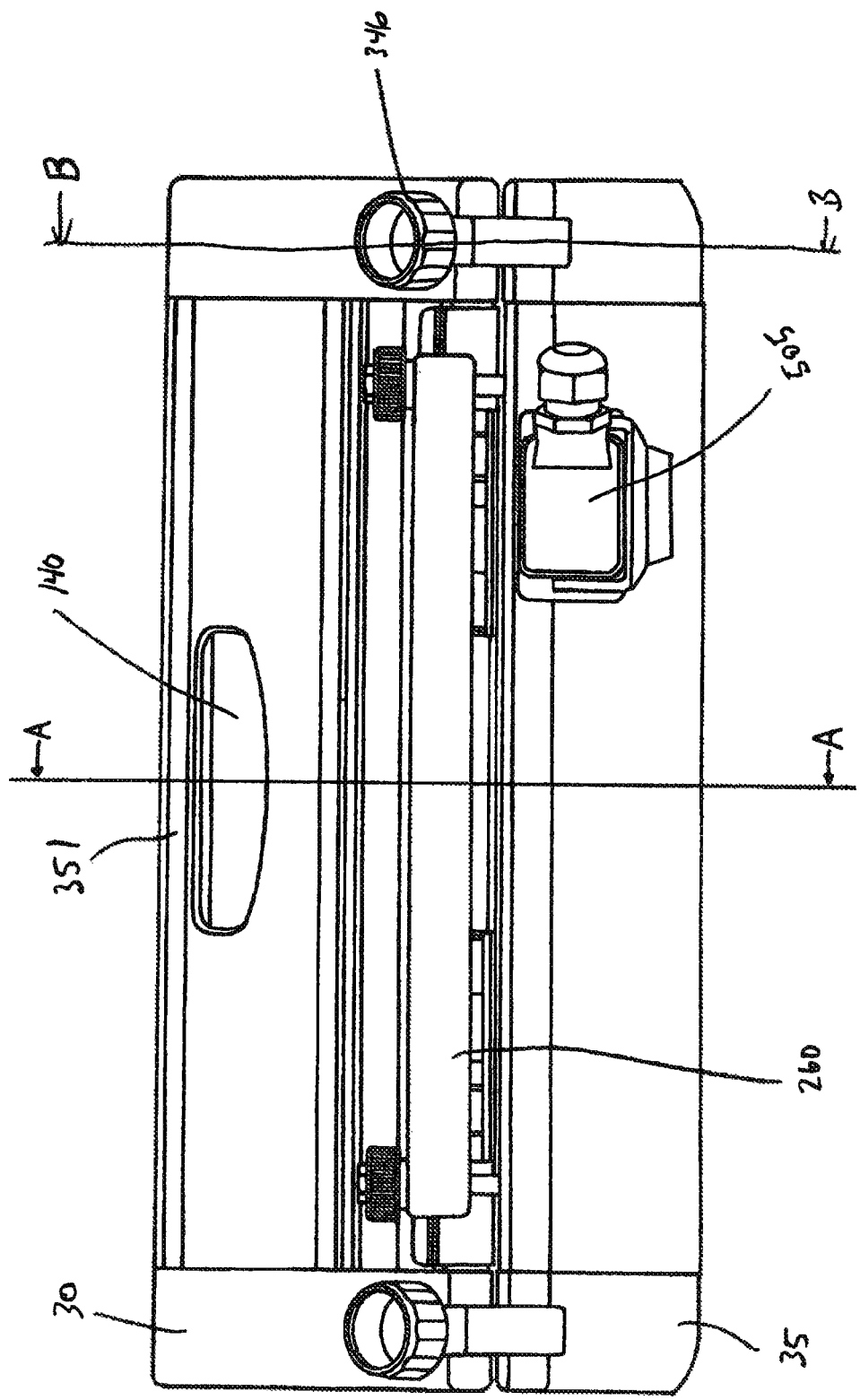
FIG. 4 is a side elevational view of another alternative conveyor belt splicing apparatus in accordance with another approach having a shorter longitudinal length and a single cooling module.

In this regard, a user that primarily repairs belts having a relatively small lateral width may purchase a small sized belt splicing apparatus of one length containing a single cooling module as illustrated in the embodiment of FIG. 4, capable of splicing belts of smaller widths, while a user that requires a belt splicing apparatus for splicing wider belts, may purchase a larger size belt splicing apparatus 5 as illustrated in FIG. 1 that is, for example, about three times longer than the smaller press and includes three cooling modules having the same length as the single module in the smaller press. Thus, the cooling system modules can be manufactured at a single uniform size. More, specifically, the duct structures 145 can all be manufactured having the same length, and then positioned end-to-end along the length of the belt splicing apparatus 5 depending on the length of the belt splicing apparatus 5. Similarly, a uniform ventilator fan 135 can be utilized for any of the available lengths of belt splicing apparatuses and is configured for cooling a single module, with multiple ventilator fans being positioned along the longitudinal length of the belt splicing apparatus 5 depending on its length. This modular configuration also provides generally uniform cooling across the entire length of the heating assemblies, which is particularly important in long presses where using a single longer cooling system would otherwise require the forced air to travel a further distance to reach the surfaces of the heating elements closer to the longitudinal ends of the heating assemblies 60 and 65 causing non-uniform cooling with the greatest cooling occurring in close proximity to the fan.

As previously mentioned, in one example, each cooling module includes a ventilator fan 135 and a duct structure 145 forming a series of ducts 150 for directing the flow of air from the fan above. Intake vents 140 are formed in the inclined upper walls 280 of the upper frame 20 at longitudinal positions generally corresponding to the longitudinal position of the ventilator fans 135 and generally above the ventilator fans 135 so that the fans 135 may draw ambient air through the intake vents 140 and force the air into the ducts 150 located below without the intake of air being impeded by belt ends extending laterally from between the upper and lower press assemblies 10 and 15. In one approach, the intake vents 140 are positioned with one on each side of the inclined upper walls 280 near the upper juncture 350 thereof so that the upper juncture 350 at these positions provides a handle 351 for lifting the upper press assembly 10 by allowing a user's fingers to fit through the vents 140 to grasp the upper juncture or handle 350. The size and power of the fan should be selected in conjunction with the size of the modules to ensure adequate airflow is provided for reaching and cooling the heating assemblies 60 and 65 at the longitudinal end portions of each module or duct structure 145. To allow air to pass from the fans 135 to the ducts 150 below while still providing support for the ventilator fans 135 within the upper housing 275, slots 355 (FIG. 6) are formed in the frame lower portion 290 below each ventilator fan 135. A corresponding opening 360 (shown in phantom in FIG. 14) is formed in the upper insulator plate below the ventilator fans 135 to allow air to pass therethrough. The air may then pass through cutouts or slot openings 365 in an upper duct plate 370 and into the ducts 150 below where it is directed by the depending duct walls 151 along the upper surface of the support plate 325 along a flow path 367 generally illustrated in phantom in FIG. 14 and in solid lines in FIG. 15.

To prevent debris and large foreign objects from falling into or being drawn into the upper housing 275 through the intake vents 140, and potentially causing damage therein, a protective screen 375 having a plurality of apertures 395 through its surface is positioned between the ventilator fans 135 and the intake vents 140. The protective screen 375 rests with lower mounting portions 385 inserted into slide fit reception with corresponding slots 390 extending longitudinally along each side of the upper frame 20.

The duct members or structures 145 include depending duct walls 151 that form air passageways or ducts 150 that serve to direct the forced air along the upper surface of the upper heating assembly 60 toward exhaust vents 155 located at the lateral edges of the upper housing 275 during a cooling cycle. In one example, the duct member includes a generally horizontal upper duct plate 370 including slot openings 365 and the duct walls 151 extend downwardly from edges or junctions 366 of the slot openings 365. The duct plate slot openings 365 (FIG. 14) may be formed by cutting their shape into the duct plate 370 with the exception of a connection junction 405 and bending the cut shapes downward along the junction 405 by approximately ninety degrees forming the duct walls 151 that extend orthogonally downward from the duct plate 370. By this approach, the upper cutouts 365 are also formed in the plate 370 to allow the forced air to pass from the fan 135 located above the duct plate 370, through the duct plate cutouts 365 and into the ducts 150. Lower edges of the orthogonal duct walls 151 also provide rigid support to restrict the upper platen 40 from bowing at its center during the pressurized splice cycle because the upper support plate 325 will tightly engage the lower edges restricting further vertical movement. The exhaust vents 155 are formed from corresponding cutouts in the upper platen sidewalls 310, duct plate sidewalls 410, and upper heating assembly housing sidewalls 305.

Figure 14:
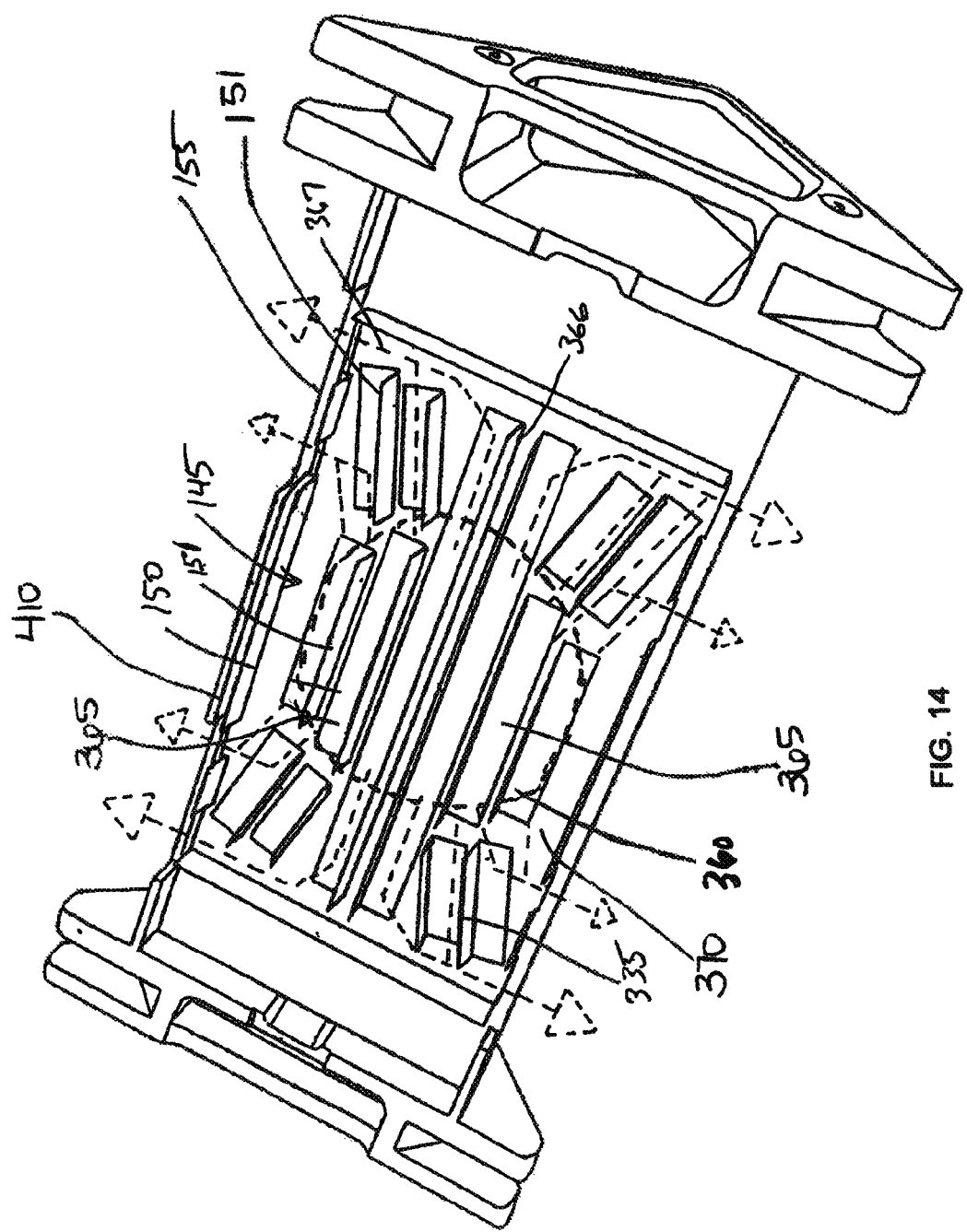
FIG. 14 is a cut-away perspective view of the upper press assembly shown from below with a portion of a heating assembly removed with phantom lines to schematically show the air flow as guided through the duct members.
Figure 15:
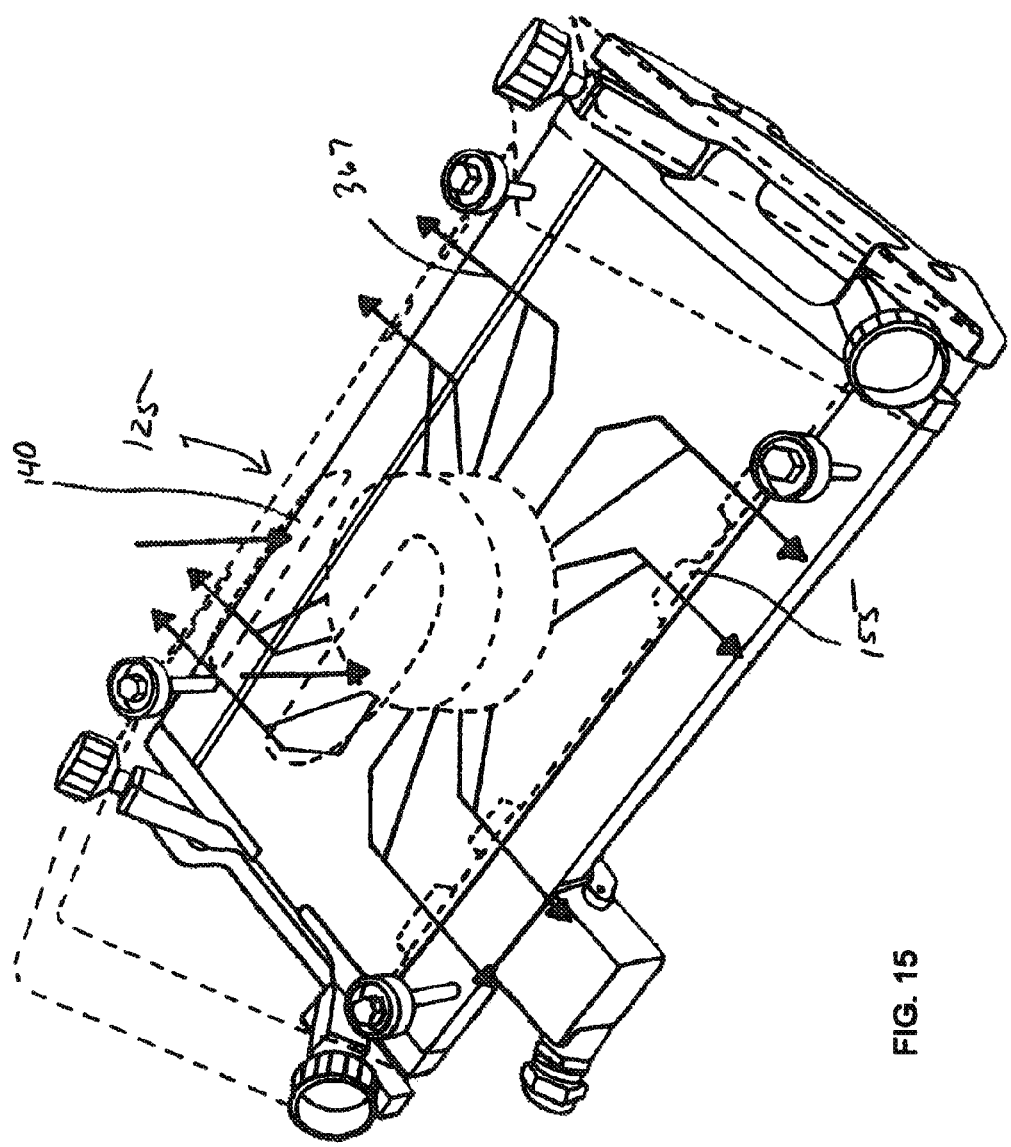
FIG. 15 is a perspective view of the belt splicing apparatus of FIG. 4 with the frame in phantom lines to schematically show the air flow as entering the vent openings and guided through the duct member.

Forced air travels through the ducts, along the upper surface of the upper heating assembly 60 and exits through exhaust vents 155, to quickly and uniformly cool the heating assemblies 60 and 65. To this end, the duct walls include walls 371 that extend in the longitudinal or lengthwise direction for directing air along the elongate upper heating assembly 60 and walls 372 that extend obliquely to the lengthwise direction for directing air obliquely across the upper heating assembly 60 and toward the exhaust vents 155. FIGS. 14 and 15 schematically show the ambient air flow 367 as guided by the duct member.

To reduce the overall profile of the belt splicing apparatus 5, in one example, the air cooling system 125 is mounted to the upper press assembly 10 and the pressure device 110 is mounted to the lower press assembly 15. More particularly, because both the air cooling system 125 and the pressure device 110 require a particular amount space, mounting them separately to the upper and lower press assemblies 10 and 15 allows space already provided therein, for example for providing structural support and housing the on-board electrical components, to be most effectively utilized without requiring significant additional space. Moreover, because the air cooling system 125 requires more headspace than the pressure device 110, mounting the air cooling system 125 in the upper press assembly 10 adds additional height to the upper press assembly 10 instead of the lower press assembly 15. In this manner, the lower press assembly 15 retains a small footprint and can be easily positioned beneath a conveyor belt in most applications without removing the conveyor belt from its operative configuration on a conveyor belt support structure. In one example, the upper and lower press assemblies both have an overall width of about 250 mm. The upper press assembly has a height of about 135 mm and the lower press assembly has a height that is less than the upper press assembly and is about 83 mm.

In one approach, an upper controller 415 is mounted to the upper frame portion 21 (FIG. 10). In one example, the upper controller 415 includes a temperature controller and has a user interface 416 thereof disposed on an outer surface 420 of the upper end wall 30 that allows the operator to enter a preset operation or melt temperature for the heating elements 70 and 75 to reach during the splicing cycle. Using the temperature controller, an operator can also select a melt time or dwell time for the heating elements 70 and 75 to specify the amount of time that the heating elements will maintain the melt temperature to heat the belt ends 46. The temperature controller also controls the air cooling system 125, and thus actuates the cooling cycle after the splicing cycle. During the splicing cycle, the upper controller 415 is used to control the temperature of the heating elements 70 and 75 by sensing the temperature of the upper heating element 70 using a thermocouple or other temperature sensing device (not shown) and adjusting the temperature and/or the power applied to the heating elements 70 and 75 to reach and maintain the preset temperature. The upper controller 415 additionally includes a timer for timing the length of the heating and cooling cycles and stopping the cycles after the preset operation or dwell time has elapsed.

Figure 17A:
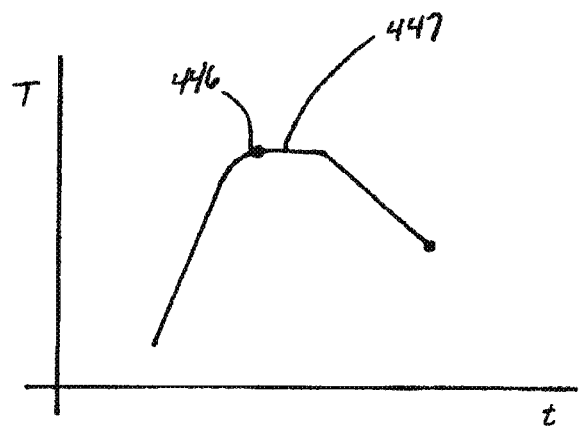
FIG. 17A is a graph showing the operational platen temperature during a belt splicing cycle with a typical prior press apparatus during operation.

Temperature control of a typical splice operation is represented by the graph in FIG. 17A which includes time on the x-axis and the temperature generated by the heating element on the y-axis. During a typical splice operation, a user selects a melt temperature 446 and the temperature of a heating device is increased to the melt temperature 446 and maintained at the melt temperature for a preset dwell time 447. It has been found, that performing a splice operation in this manner often leads to belt scorching, particularly in circumstances where a belt having a relatively large thickness is being spliced, because the belt material near the belt surfaces where the heated platens are contacting the belt ends is heated more rapidly than the core material of the belt at a location intermediate the belt surfaces. To sufficiently melt the core material of the belt, the melt time must be large, so that the heated platens engage the belt surfaces for an excessive amount of time. Because the surface material is heated rapidly, this material may become overheated and scorched.

In one approach, the problem of scorching of thicker belts has been overcome by providing an automated control system of the belt splicing apparatus 5 for performing a preheat operation prior to melting the belt ends for joining them to each other. More particularly the user interface 416 of the controller includes a plurality of user inputs 418 for allowing a user to preset heating times and temperatures into the control system for regulating the temperature of the heating elements 70 and 75 and the heat applied to the belt ends 46. In one form, the user inputs include digital inputs 417 and a digital display 419 of the user interface 416 is provided for allowing a user to preset the digital inputs. In one example, the user inputs include a preheat time, a melt temperature, and a melt time. Based on the user inputs, the control system is configured to perform a preheat operation for the duration of the preheat time. After the preheat operation is complete, the control system is configured to increase the temperature of the heating elements 70 and 75 to the melt temperature and maintain the heating elements 70 and 75 at the melt temperature for the melt time.

Figure 17B:
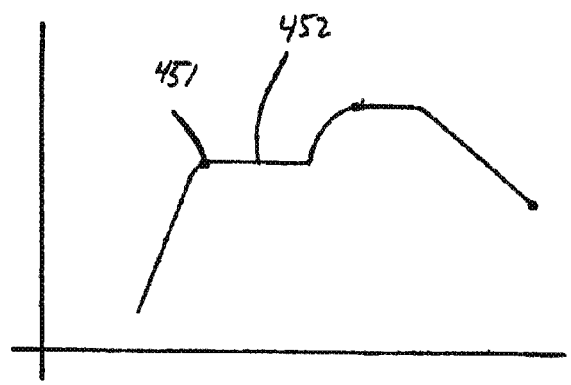
FIG. 17B is a graph showing the operational platen temperature during a belt splicing cycle with a press apparatus according to one form.
Figure 17C:
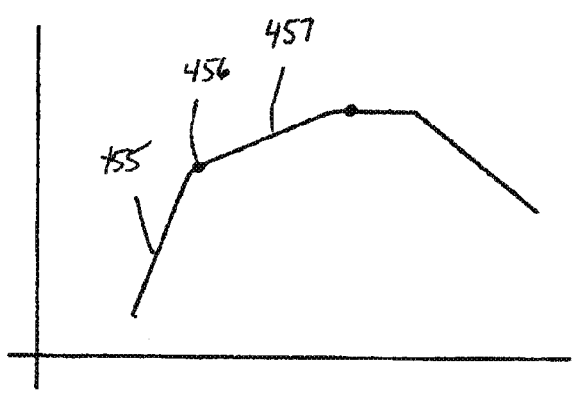
FIG. 17C is a graph showing the operational platen temperature during a belt splicing cycle with a press apparatus according to an alternative form.

In one example illustrated in FIG. 17B, one of the user inputs 418 of the controller 415 is a preheat temperature 451 and the preheat operation includes increasing the temperature of the heating elements 70 and 75 to the preheat temperature 451 and maintaining the temperature of the heating elements 70 and 75 at the preheat temperature 451 for the preheat time 452. In another example illustrated in FIG. 17C, the user inputs include an initial preheat temperature, and the preheat operation includes rapidly increasing the temperature 455 of the heating elements 70 and 75 to the initial preheat temperature 456 and then more gradually increasing the temperature of the heating elements 457 above the initial preheat temperature with a lower rate of temperature increase. The purpose of the preheat operation is to increase the temperature of the belt material at the core of the belt ends 46 using a preheat temperature that is less than the melt temperature prior to applying the platens to the surfaces of the belt at the full melt temperature thereof. In this manner, the melt time can be decreased to avoid scorching the outer surfaces of the belt ends 46 which could otherwise be caused by prolonged exposure to the full melt temperature.

In certain applications, it is desirable to independently control the temperatures of the upper and lower heating elements 70 and 75 so they can be set at different temperatures. According to one approach, a control system, for example the upper controller 415 and associated control circuitry, may include user inputs 440 to allow a user to independently control the temperatures of the upper and lower heating elements 70 and 75. As described previously, the user interface 416 may include analog or digital inputs and in one example includes a digital display 419 that displays the user inputs 418 and allows a user to preset the user inputs utilizing buttons, switches, or other electrical or physical devices for providing user inputs. In one example, the user inputs 418 may include separate preset upper and lower temperature inputs for the upper and lower heating elements 70 and 75 respectively. In this example, the control system will control the temperature of the upper and lower heating elements 70 and 75 independently to reach the preset temperatures. The control system may include one or more temperature sensors or thermocouples to monitor the temperature of at least one of the upper and lower heating elements so that the temperature can be accurately controlled.

In another example, the user inputs include a preset temperature of the upper heating element 70 and a percentage of the preset temperature or power being supplied to the upper heating element 70 for the lower heating element 75. In this example, the control system is configured to supply power to the lower heating element 75 at the preset percentage of the power supplied to the upper heating element. In this example, it is assumed that when equal power is provided to both the upper and lower heating assemblies; they will reach about the same temperatures. Providing power to the lower heating assembly as a positive or negative percentage of the upper heating assembly will result respectively in a greater or lower temperature of the lower heating element 75. In this example, only a single temperature sensor is required for sensing the temperature of the upper heating assembly to reach the preset temperature, reducing the size and complexity of the controller required. This also advantageously reduces the need for separate thermocouples for sensing separately the temperatures of the upper and lower heating elements 70 and 75 which would otherwise require additional inputs for the controller, and a junction for a thermocouple sensing the temperature of the lower heating element 75 to provide an output from the lower press assembly 10 to the upper press assembly 70, which can create inaccurate temperature readings. It should be understood that in this example, the user inputs 418, temperature sensor, and control system can be reversed with so that the temperature of the lower heating element 75 is controlled with the power supplied to the upper heating element 70 being provided as a percentage of the power supplied to the lower heating element 75.

In one approach, a control system is provided to control the pressure applied by the inflatable bladder 115 to the lower heating assembly 65. A lower pressure controller 430 is disposed on an outer surface 435 of the lower end wall 35 on the same end of the belt splicing apparatus 5 as the upper controller 415 and is connected to control circuitry for the air compressor 110 that allows the operator to enter a preset pressure for the inflatable bladder 115. To this end, similar to the upper controller, the lower pressure controller 430 includes a user interface 431 mounted to the lower end wall 35 and having similar user inputs 418 for selecting a preset pressure for the inflatable bladder. During operation of the belt splicing apparatus 5, the pressure controller 430 senses the pressure being supplied to the inflatable bladder 115 by the air compressor 110 and adjusts the compressed air supplied by the compressor 110 to reach the preset pressure during the splice operation. The pressure device and pressure controller are operable to reach pressure in the inflatable bladder of up to about 2 bar.

In one approach, the belt splicing apparatus 5 is capable of operating by drawing power from a variety of different standard power supply sources without requiring the use of an external transformer or power adapter. In this regard, the belt splicing apparatus 5 can be conveniently used at a variety of locations regardless of the available power supplies simply by utilizing a corresponding one of the plurality of power cords. In one approach, the belt splicing apparatus 5 includes a control system with internal circuitry 500 (FIG. 20) and a connection interface or electrical connector 505 for connecting to a plurality of power cords 510 that correspond to different power sources to allow it to draw power from different standard power sources to power electrical components, including the heating elements 70 and 75, the ventilator fans 135, and the air compressor 110.

Figure 19B:
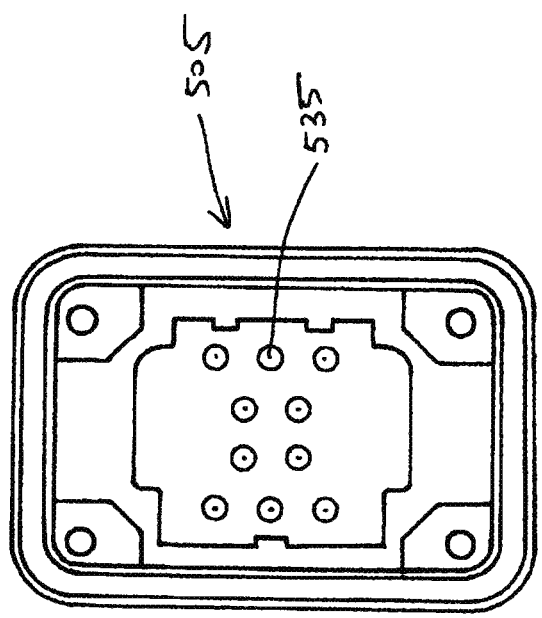
FIG. 19B is a plan view of an electrical connector of a power cord.

In one approach, the plurality of detachable power cords 510 are provided with each configured to provide power from one or more different standard power supply sources to the belt splicing apparatus 5 to allow the belt splicing apparatus 5 to operate using a variety of different available power supply sources without requiring a bulky external transformer or power adapter to be transported therewith. In this manner, the belt splicing apparatus 5 is also capable of operating utilizing available power sources in different countries or facilities without the need for special external adapters. For example, in one approach, one or more power cords 510 are provided each having a source specific connector or plug end 511 (FIG. 19A) corresponding to the different standard power supply sources and a common electrical connector or splice press interface 515 end (FIG. 19B) having a common physical arrangement for connecting to a corresponding electrical connector or power cord interface 505 of the belt splicing apparatus.

Figure 18:
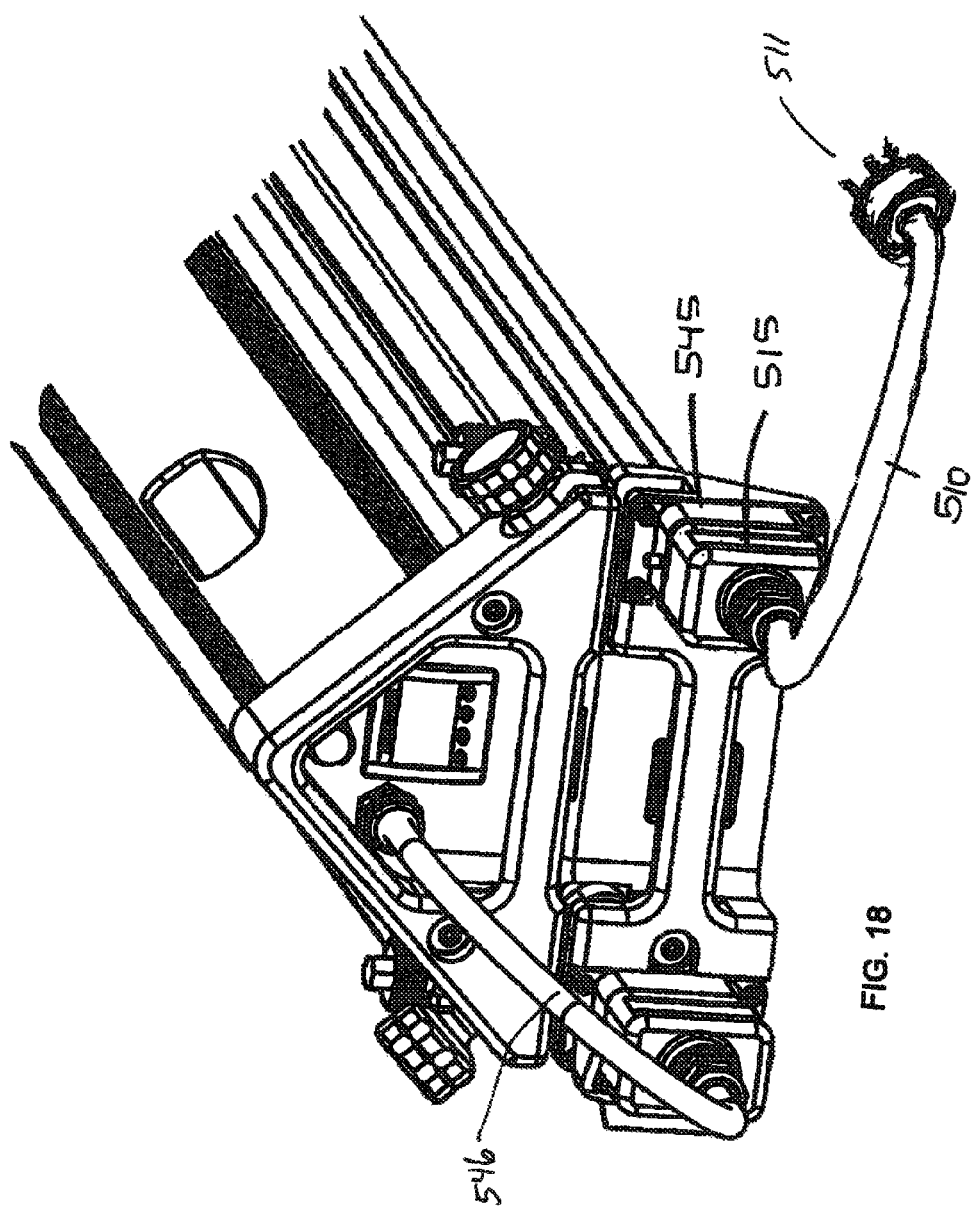
FIG. 18 is a perspective view of the belt splicing apparatus of FIG. 1 showing a detachable power cord connected to an electrical connector.

In one approach, the power cord interface 505 of the belt splicing apparatus 5 comprises one or more terminals 535 corresponding to the number of input pins 540 of the internal control circuitry 500 of the belt splicing apparatus 5. For example, FIG. 18 displays one exemplary embodiment of the power cord interface 505 having seven terminals 535 corresponding to seven output pins of the internal circuitry 500 as illustrated in FIG. 17. In this example, the power cord interface 505 is mounted to the lower frame portion 26 on one lateral side thereof (FIG. 4). In another example, the power cord interface 505 is mounted to the lower frame portion at the end wall 35 thereof to avoid interfering with the belt ends 46 extending out from the lateral edges of the belt splicing apparatus. The power cord interface 505 could also be mounted to the upper frame portion 21 with the corresponding control system of the belt splicing apparatus modified to support such a configuration.

In one approach, the terminals 535 at the power cord interface are formed as pins 535 made of an electrically conducting material that can form an electrically mating connection with corresponding sockets 545 at a tool interface 515 of the power cord 510. It should be understood that the number of pins 535 may vary according to the number of output pins of the internal circuitry of the belt splicing apparatus 5. For example, in another form, illustrated in FIG. 24, the internal circuitry 700 comprises 10 output pins 740, and as such the power cord interface 505 will be modified to include 10 pins 535 to provide power to the internal circuitry 700. As may be apparent to one of ordinary skill in the art, the number of pins on the power cord interface 505 can be easily modified to include any number of pins as is required by the internal circuitry of the belt splicing apparatus 5.

Figure 19A:
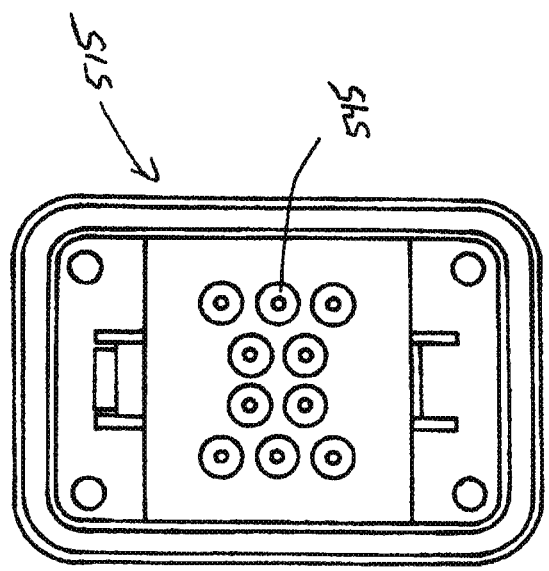
FIG. 19A is a plan view of an electrical connector of a belt splicing apparatus.

The electrical connector or splice press interface 515 of the plurality of power cords 510, on the other hand, includes one or more sockets 545 for receiving the one or more pins 535 of the power cord interface 505 of the belt splicing apparatus 5. For example, FIG. 19A illustrates one example of the splice press interface 515 having 10 sockets 545. In this example, each of the one or more sockets 545 will receive a corresponding pin 535 of the power cord interface 505. In one example, the splice press interface 515 will be customized for a specific power cord interface 505 and therefore will comprise the same number of sockets 545 as the number of pins 535 on the power cord interface 505. In another embodiment, the tool interface 515 may comprise more sockets than the corresponding number of pins 535 of the power cord interface 505. In such embodiments, the tool interface 515 is still usable to provide an electrical connection for the belt splicing apparatus 5, wherein one or more sockets 545 will remain empty and therefore will not provide a power coupling. In one approach, as stated above, the opposite end of each power cord 510 is an electrical connector or plug 511 that typically varies for each power cord 510 and corresponds to a particular power supply source having a specific input voltage and phase that can be electrically coupled to corresponding sockets 545 at a standard power supply outlet. It should also be understood, that while the power cord interface 505 of the belt splicing apparatus 5 as illustrated includes pins 535 while the splice press interface 515 of the power cords 510 includes sockets 545, these can be reversed so that the power cord interface 505 includes sockets that can be electrically coupled to corresponding pins of the power cord 510.

Figure 5:
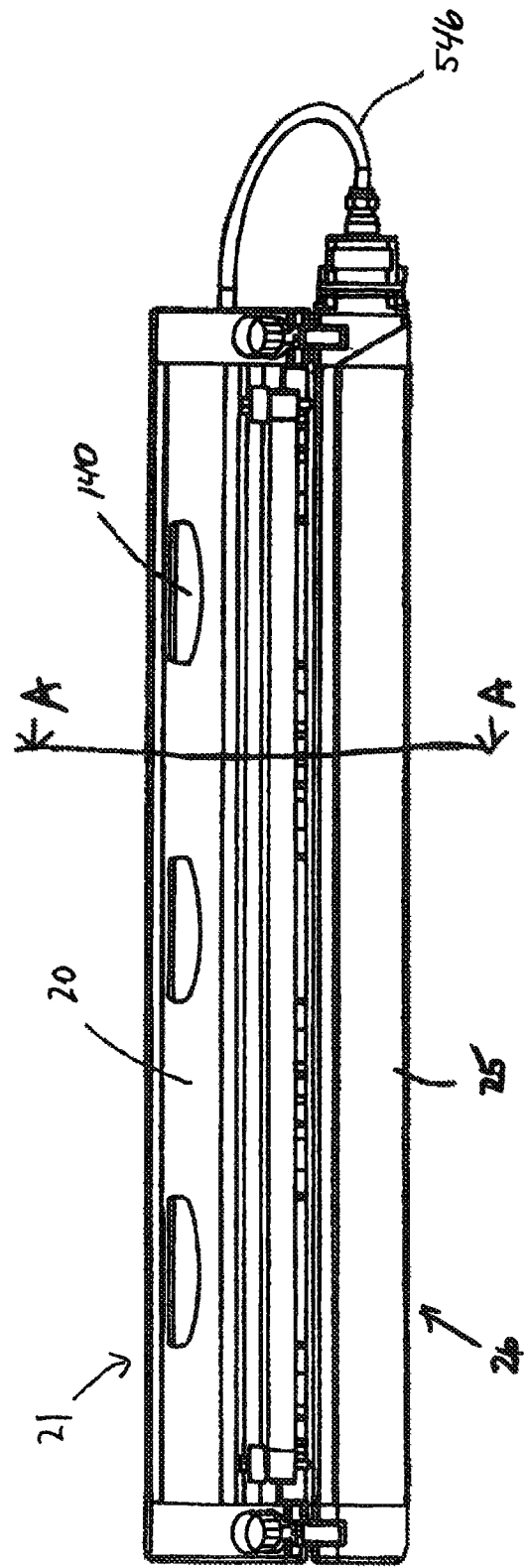
FIG. 5 is a side elevational view of the conveyor belt splicing apparatus of FIG. 2 showing the upper press assembly clamped to the lower press.

In one approach, the power supply is electrically connected to circuitry of the upper press assembly 10 from the lower press assembly 15 to provide power for the operation of the electrical components of the upper press assembly 10. In one example, a jumper cable 546, illustrated in FIG. 5, extends from the upper press assembly 10 to the lower press assembly 15 to electrically couple the electrical components within the upper press assembly 10 to the power supply resulting in power supply circuitry 500.

Figure 20:
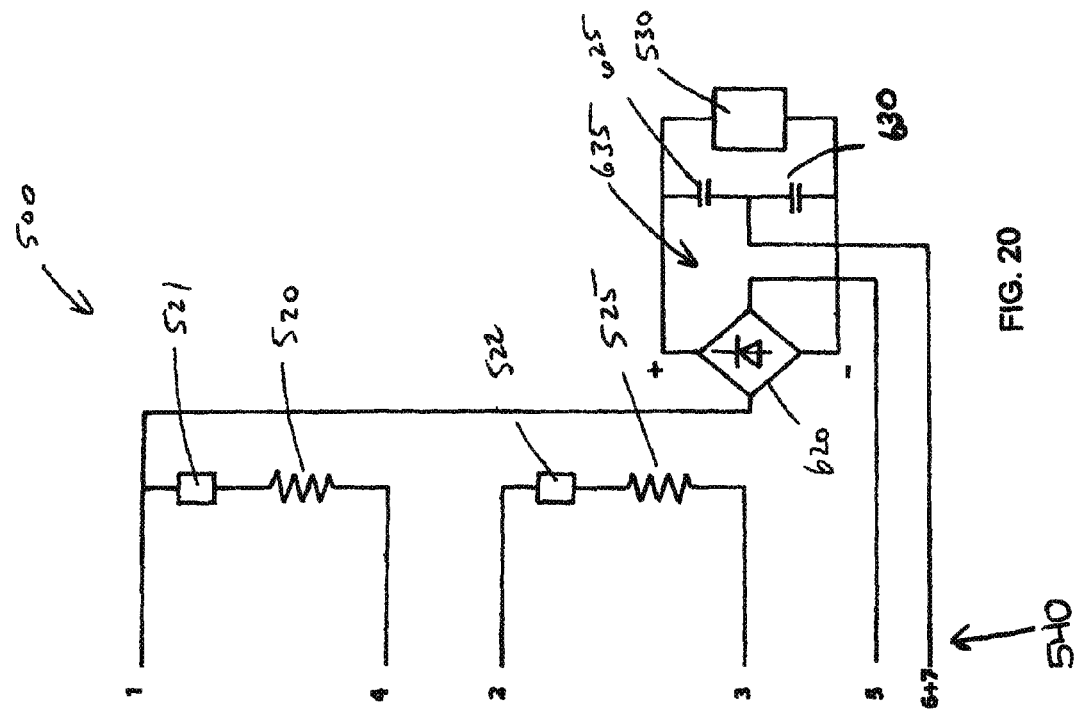
FIG. 20 is an electrical block diagram of control system circuitry for the belt splicing apparatus.

FIG. 20 shows an electrical block diagram illustrating an internal control system circuitry or internal circuitry 500 within the belt splicing apparatus 5 according to one form of the present invention. With the jumper cable 546 connected between the upper and lower press assemblies 10 and 15, the resulting electrical circuit 500 handling the power supply input is illustrated in the block diagram of FIG. 20, including resistive heating elements 520 and 525 corresponding to the on-board upper and lower heating elements 60 and 65 and an on-board 24 V transformer 530 that generates a 24 V DC electrical output for operating the cooling fan 135 and the air compressor 110 and other electrical components. In this example, the seven inputs 740, of the circuit 500 correspond to the terminals 535 at the power cord interface 505.

Turning to FIGS. 21A-D, the power cords 560, 565, 570, and 575 correspond respectively to single-phase 230 V, three-phase 230 V, three-phase 400 V plus Neutral, and three-phase 460 V power supplies. It should be understood, however, that other power cords corresponding to other available power supplies can be included with the corresponding internal circuitry of the belt splicing apparatus adapted to draw power therefrom, and are envisioned within the scope of the invention. For each of the power cords 510, the sockets 545 shown in FIG. 19A are generically represented by the electrical terminals or sockets 555 and are electrically coupled to the power supply inputs 550 through electrical conductors or wires as illustrated in FIGS. 21A-D. In this manner, one or more sockets 555 may be electrically coupled to a single input 550. One or more sockets 555 may also be electrically isolated or electrically connected to one or more other sockets 555 and not connected to any input 550 as illustrated in FIG. 21 D wherein sockets 3 and 4 are electrically coupled to one another.

Figure 21A:
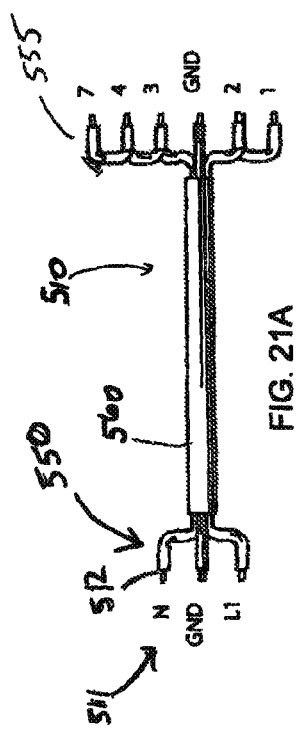
FIG. 21 A-D are perspective views of four different configurations of power cords that each may be used with the belt splicing apparatus.
Figure 22A:
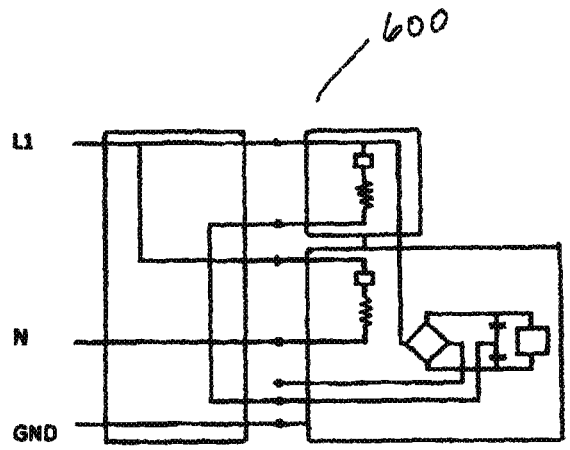
FIG. 22 A-D are electrical bock diagrams illustrating schematically the electrical circuits that are formed when each of the respective power cords of FIGS. 21 A-D are electrically coupled between the electrical connector of a belt splicing apparatus and a corresponding power supply outlet.

For example, in the power cord 560 of FIG. 21A corresponding to single-phase 230 Volt power, sockets 1 and 2 are electrically coupled together and electrically coupled to the 230 V input line L1 in parallel and sockets 3, 4, and 7 are electrically coupled to one another and electrically coupled to the neutral input N in parallel. In one example, each power cord 510 also includes a chassis ground that is indicated by GND. Because sockets 5 and 6 are not shown in FIG. 21A, these sockets are electrically isolated and are not connected to any of the inputs 550 of the power supply. In this manner, when the interface 515 of power cord 560 is coupled to the power cord interface 505 on the belt splicing apparatus 5, pins 740 labeled 1-7 illustrated in FIG. 20 are coupled to the sockets 555 with corresponding numbers 1-7 and the resulting electrical connections forms the circuit 600 (FIG. 22A). Thus, because sockets 5 and 6 of cord 560 are electrically isolated, the inputs 5 and 6 in FIG. 20 will also be electrically isolated.

Figure 21B:
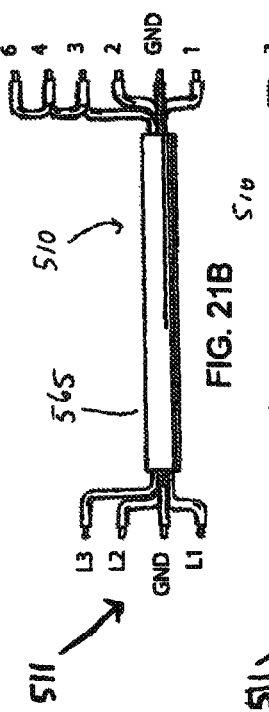
Figure 21C:
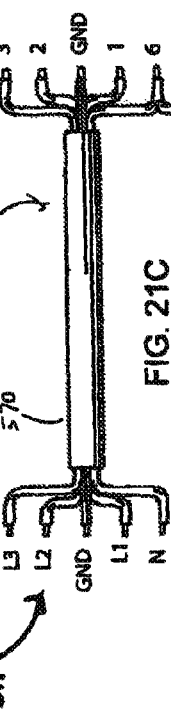

Similarly, when a three-phase, 230 V AC power cord 565 of FIG. 21B is plugged into a three-phase, 230 V AC power supply, socket 1 is electrically coupled to a first leg L1 of the three phase power supply, socket 2 is electrically coupled to a second leg L2 of the three phase power supply, and sockets 6, 4, and 3 are coupled together and electrically coupled to a third leg L3 of the three-phase power supply in parallel resulting in the circuit 605 (FIG. 22B) being formed. When a three-phase, 400 V AC power cord 570 of FIG. 21C is plugged into a three-phase, 400 V AC power supply including neutral, socket 1 is coupled to a first leg L1 of the three phase power supply, socket 2 is electrically coupled to a second leg L2 of the three phase power supply, socket 5 is electrically coupled to a third leg L3 of the three-phase power supply, and sockets 3 and 4 are coupled together and electrically coupled to a neutral wire N in parallel resulting in the circuit 610 (FIG. 22C) being formed. When a three-phase, 460 V AC power cord 575 of FIG. 21D is plugged into a three-phase, 460 V AC power supply, socket 1 is coupled to a first leg L1 of the three-phase power supply, socket 2 is electrically coupled to a second leg L2 of the three-phase power supply, and socket 5 is electrically coupled to a third leg L3 of the three-phase power supply, while sockets 3 and 4 are electrically coupled or jumpered together and not coupled to an input from the power supply resulting in the circuit 615 (FIG. 22D) being formed.

In this manner, a common electrical connection or uniform splice press interface 515 configuration can be utilized to couple various power cords 510 to the power cord interface 505 corresponding to the different power supply sources and the internal circuitry 500 of the belt splicing apparatus 5. In this regard, the resistive heating elements 520 and 525 and the 24 V transformer 530 are configured to draw power from a variety of different standard power supply sources generally available at many facilities. To this end, the on-board internal control system of the belt splicing apparatus 5 includes internal circuitry configured to provide power to the electrical components that is appropriate for running the particular electrical components. For example, the control system is configured to provide power to the resistance heaters 520 and 525 that has a voltage rating that corresponds to the voltage rating of the resistance heaters 520 and 525 regardless of the voltage rating of the standard power supply being used to power the belt splicing apparatus. Similarly, the on-board control system is configured to supply power to the electrical components, including the 24 V DC power supply or internal transformer, which in turn is used to provide 24 V DC power to other electrical components, including the cooling fans 115, the controllers 415 and 430, and the air compressor 110.

Turning now to the resulting circuits that are formed upon electrically coupling the various power cords 510 between the power cord interface 505 of the belt splicing apparatus 5 and the power supply source, in a first exemplary configuration, illustrated in FIGS. 20, 21A, and 22A, the first power cord 560 corresponding to a single-phase 230 V power supply is coupled to the power cord interface 535 and plugged into a single-phase 230 V power supply at an electrical outlet resulting in the circuit 600 of FIG. 20A being formed. In this example, the heating elements 520 and 525 are resistance heaters that are voltage rated for drawing power with a voltage in the range of between about 190 and 240 V AC. To this end, in this configuration the 230 V L1 is electrically coupled to the resistive heaters 520 and 525 in parallel so that it supplies about 230 V power to each of the 230 V resistance heaters. Because the neutral input N is electrically coupled between the capacitors 625 and 630, and the conductor inputting to the diode 620 is carrying a 230 V input, the circuit 635 acts as a voltage doubling circuit converting the 230 V AC input to 460 V DC so it can be used to power the 24 V DC transformer 530, which requires inputs in the range of 400 V-460 V DC. Thus, in this configuration, the single-phase, 230 V power supply is capable of operating the electrical components in the belt splicing apparatus 5.

Figure 21D:
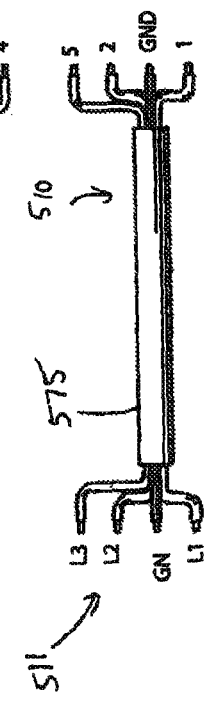
Figure 22B:
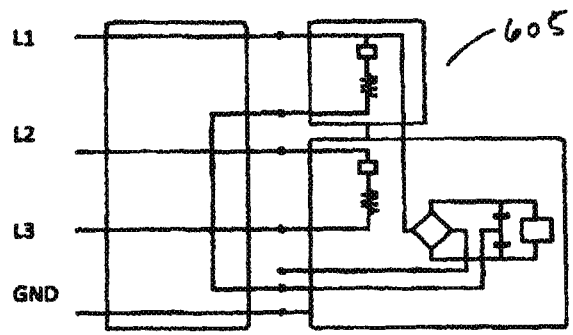
Figure 22C:
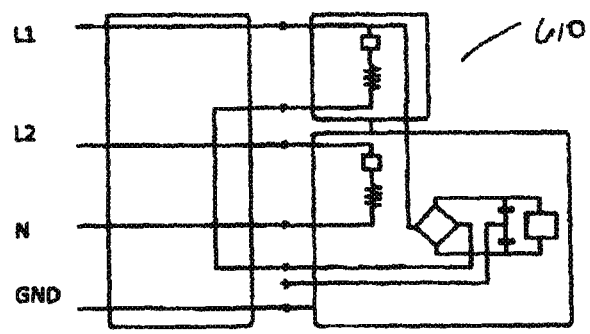
Figure 22D:
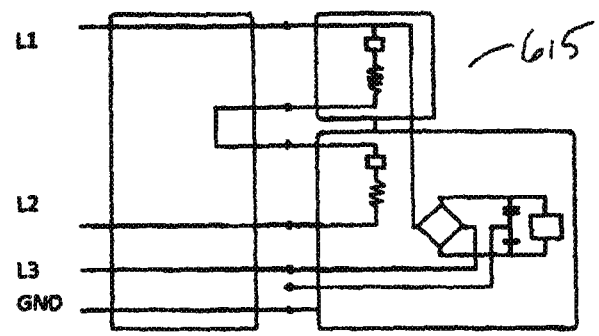

In a second exemplary configuration illustrated in FIGS. 20, 21D, and 22D the power cord 575 corresponding to a three-phase 460 V power supply is coupled to the power cord interface 505 and plugged into a three-phase 460 V power supply at an electrical outlet resulting in the circuit 615 of FIG. 20D being formed as stated previously. In this configuration, the 460 V L1 is electrically coupled to the resistive heaters 520 and 525 in series and is capable of supplying sufficient voltage to power each. In this configuration, the circuit 635 acts as a diode bridge rectifier rather than a voltage doubler circuit to rectify the 460 V AC input voltage to 460 V DC so it can be used by the 24 V DC transformer 530. Thus, in this configuration, using the appropriate power cord, the three-phase, 460 V power supply is capable of operating the electrical components in the belt splicing apparatus 5.

It will be apparent to one skilled in the art that the circuits 22B and 22C formed when using cords 565 and 570 as described above, corresponding to 3 phase 230 V and 3 phase 400 V power supplies, will also properly operate the electrical components when coupled to the power cord interface 505 of the belt splicing apparatus 5 and connected to their corresponding power supplies. In addition, other configurations of the power cords 510 and electrical circuitry are contemplated herein for allowing the belt splicing apparatus 5 to operate using other standard power supplies.

In one approach, solid state relays or switches 521 and 522 are also included in the control system and are coupled to one or both of the upper and lower controllers 415 and 430. In this regard, at least one of the controllers 415 and 430 is configured to control the solid state relays 521 and 522 to gate power to the electrical components to control their operation. For example, the upper controller 415 may be configured to control the solid state relays 521 and 522 to gate power to the upper and lower resistance heaters 520 and 525 to control the temperature thereof. Additional relays may be included to gate power to the other electrical components including the on-board ventilator fans 115 and the on-board air compressor 110 so that the controllers can regulate the operation thereof.

Figure 24:
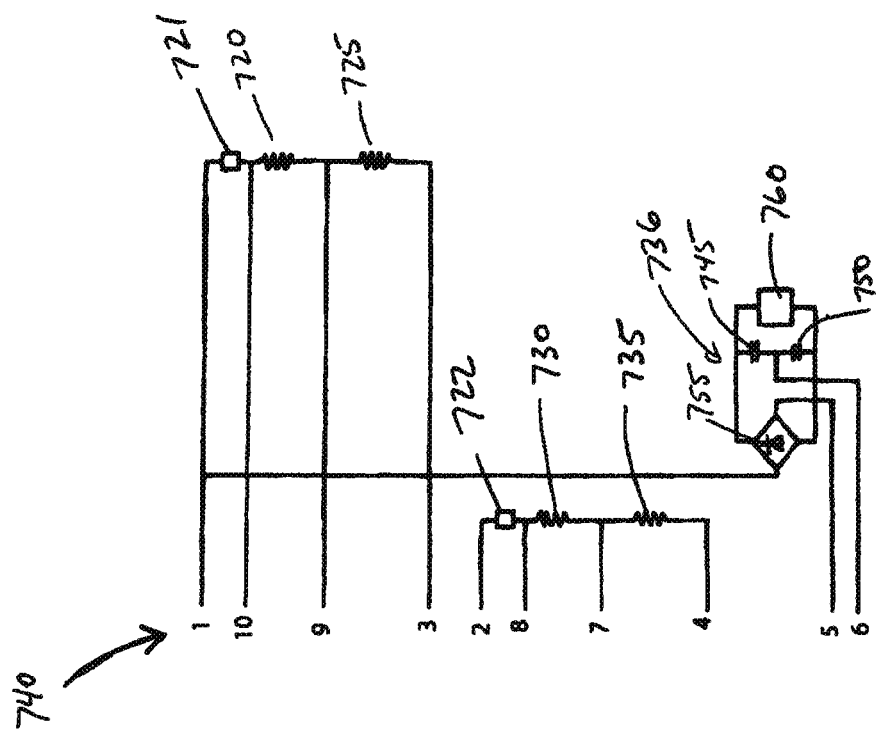
FIG. 24 is an electrical block diagram for a control system circuitry for the portable belt splicing apparatus according to another approach.
Figure 25A:
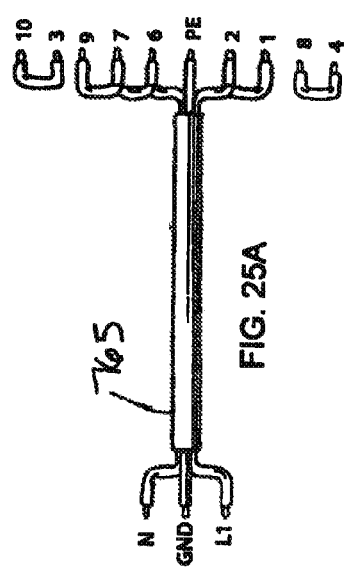
FIG. 25 A-D are perspective views of four different configurations of power cords according to another approach that each may be used with the belt splicing apparatus.
Figure 25B:
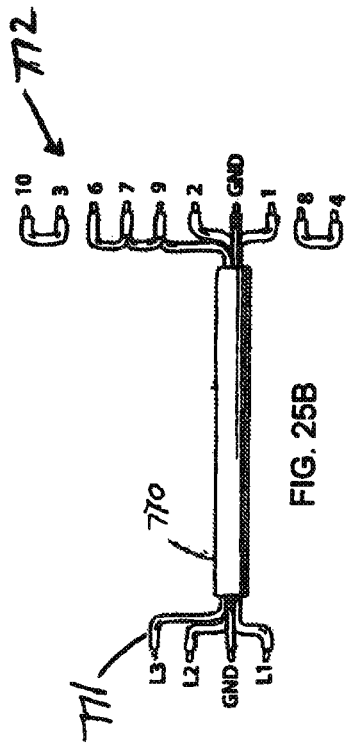
Figure 25C:
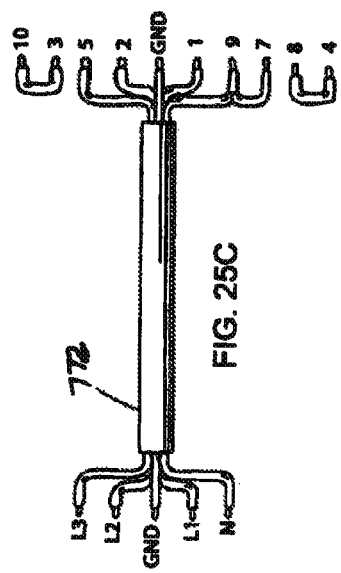
Figure 25D:
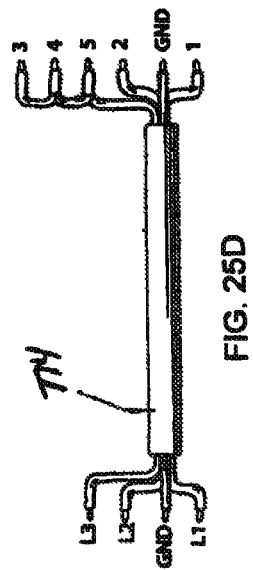

In another approach, a belt splicing apparatus 5 includes an alternative internal control system with a different internal circuitry 700 as illustrated in FIG. 24. With the jumper cable 546 connected between the upper and lower press assemblies 10 and 15, the resulting electrical circuit 700 handling the power supply input is generally illustrated in the block diagram of FIG. 24, including resistive heaters 720 and 725 corresponding to the upper heating element 60 and resistive heaters 730 and 735 corresponding to the lower heating element 65 and a 24 V internal power supply or transformer 760 that generates a 24 V DC electrical output for operating other electrical components of the belt splicing apparatus 5.

With reference to FIGS. 25A-D, similar to the approach described above with respect to FIGS. 18 and 19, the belt splicing apparatus 5 according to this approach includes a plurality of power cords 765, 770, 772 and 774 configured for electrically connecting the belt splicing apparatus to different standard power supplies. An electrical connector or power cord interface 505 that is electrically coupled to electrical inputs of the internal control circuitry 700 through electrical connection terminals 535 in the form of ten input terminals 535 that correspond to the ten inputs 740, of the circuit 700. In this example, the terminals 535 at the power cord interface are formed as pins 535 made of an electrically conducting material that can form an electrically mating connection with corresponding sockets 545 at the common electrical connector or splice press interface 515 of the power cord in the manner described above. The electrical coupling between the power source and the sockets 545 of the splice press interface is illustrated by the power cord configurations of FIGS. 25A-D and are similar to the power cords 765, 770, 772, and 774 described above.

FIGS. 25 A-D corresponding respectively to power cords coupled to single-phase 230 V and three-phase 230 V, three-phase 400 V plus Neutral, and three-phase 460 V power supplies. FIGS. 26A-D illustrate the resulting electrical connections when the power cords 25 A-D, respectively, are coupled between power cord interface 535 of the belt splicing apparatus 6 and coupled at the opposite plug end 771 thereof to a power supply outlet.

Figures 26A, 26B:
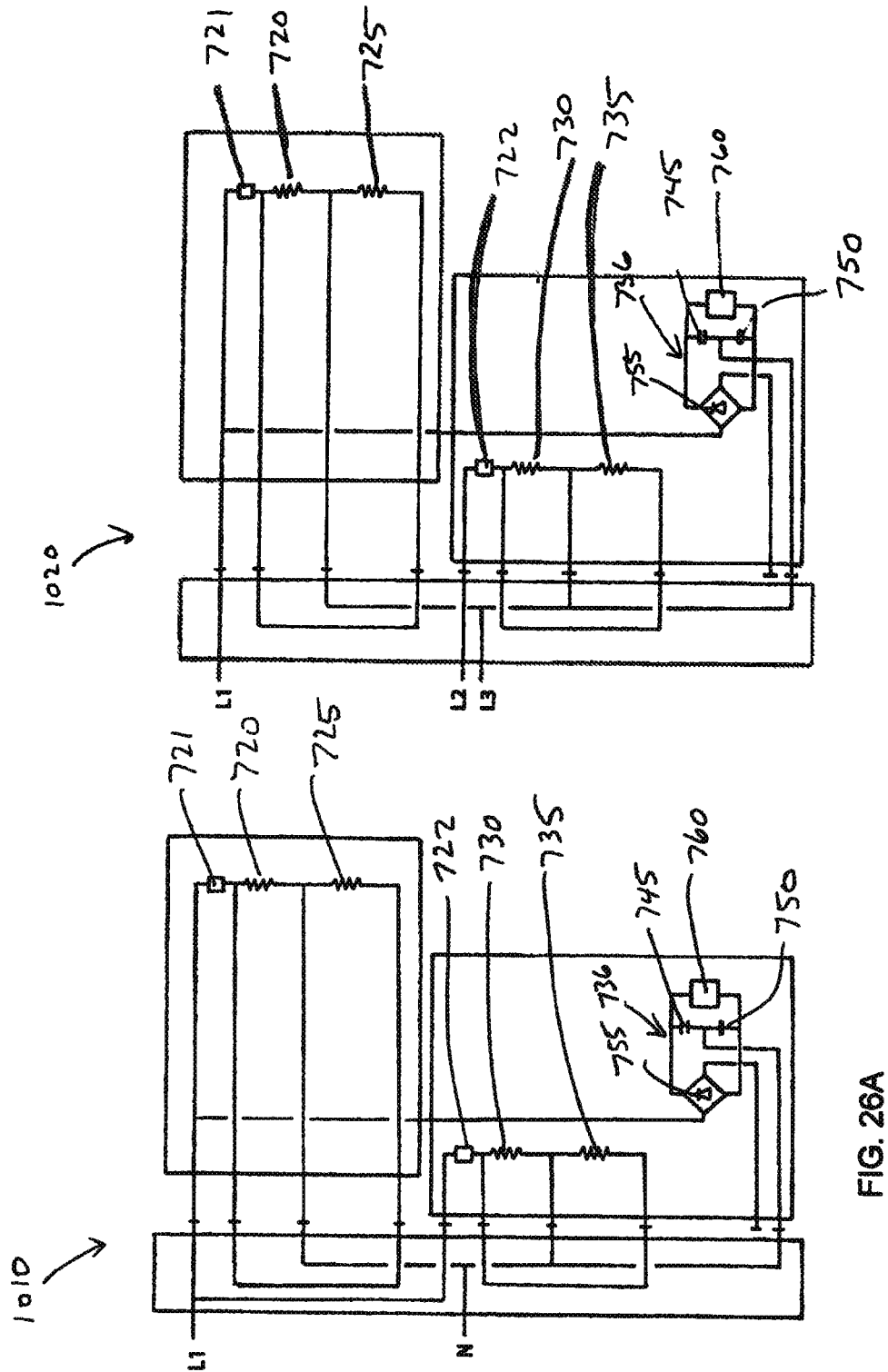
FIG. 26 A-D are electrical block diagrams illustrating schematically electrical circuits formed when the power cords of FIGS. 25 A-D are electrically coupled between the electrical connector of the belt splicing apparatus of FIG. 2 and a corresponding power supply outlet.

In one example, as illustrated in FIG. 26A, when the single phase 230 V AC power cord 765 is used, the electrical circuit 1010 is formed. In this regard, the first leg L1 of the 230V single phase power supply is coupled to input pins 1 and 2 of the control circuitry 700 of the belt splicing apparatus. Similarly, sockets 6, 7 and 9 of the splice press assembly circuit 700 are coupled together and connected to the neutral input N. Sockets 3 and 10 of the splice press control circuit 700, on the other hand, are coupled together. FIGS. 26B-D represent respectively the resulting electrical circuits when the three-phase 230 V AC power cord, the three-phase 400 V AC power cord is used, and the three-phase 460 V AC power cord are used to connect the belt splicing apparatus 5 to their corresponding power supplies.

In this manner, a common electrical connector or uniform splice press interface 515 configuration can be utilized by a plurality of power cords 765, 770, 772, and 774 to the power cord interface 505 of the belt splicing apparatus 5. The power cords correspond to the different standard power supply sources and the internal control circuitry 700 of the belt splicing apparatus 5 when coupled to the appropriate power cord 761 allows the resistive heating elements 720, 725, 730, and 735 and the 24 V transformer 760 to draw power from a variety of power sources generally available at many facilities.

Figure 23:
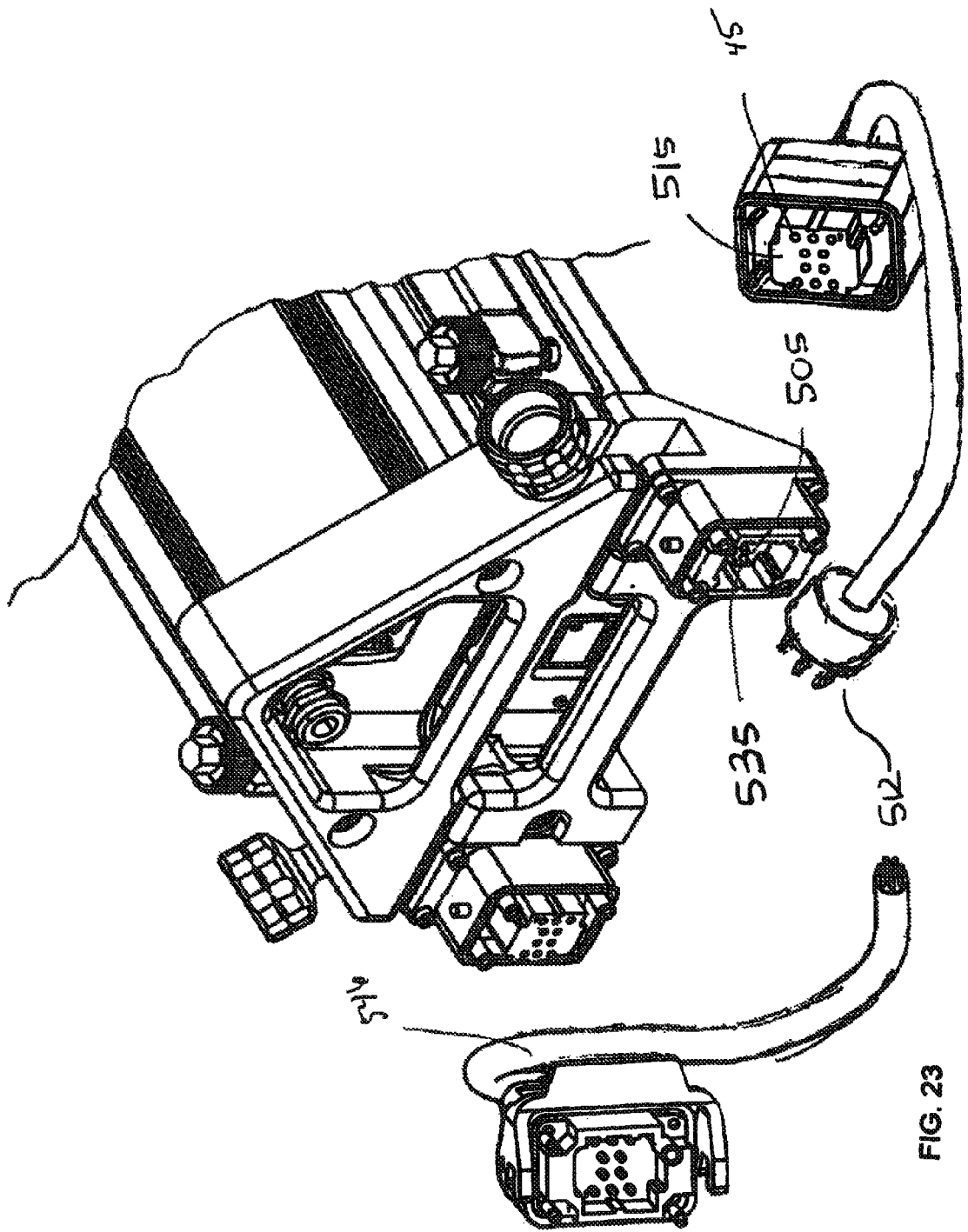
FIG. 23 is a perspective view of a power cord unplugged from the belt splicing apparatus of FIG. 2 showing the electrical connectors of the power cord and the belt splicing apparatus.

For example, as illustrated in FIGS. 21, and 23A, when the power cord 765 corresponding to a single-phase 230 V power supply is coupled to the power cord interface 505 of the belt splicing apparatus and to a single-phase 230 V power supply, the circuit 1010 of FIG. 26A results. In this example, each of the resistive heaters 720, 725, 730, and 735 have a voltage rating of between about 190 and about 240V AC. Thus, in this configuration, the 230 V L1 is electrically coupled to the resistive heaters 720, 725, 730 and 735 in parallel so that it supplies sufficient voltage, about 230V, to power each. Because in this configuration the neutral input N is electrically coupled between the capacitors 745 and 750, and the conductor inputting to the diode 755 is carrying a 230 V input, the circuit 736 acts as a voltage doubling circuit converting the 230 V AC input to 460 V DC so it can be used by the 24 V DC transformer 760 which requires inputs in the range of 400 V-460 V DC. The 24 V DC output is electrically coupled to additional on board electrical components so that it provides a power supply capable of powering these components.

In a another example, the power cord 761 corresponding to a three-phase 460 V power supply is coupled to the power cord interface 505 of the splice press 5 and electrically coupled at the opposite plug end 771 to three-phase 460 V power supply at an electrical outlet resulting in the circuit 1040 of FIG. 26D being formed, as stated previously. Similarly to the previous example, in this example, the resistive heaters have a voltage rating of between about 190 and 240 V AC. In this configuration, the 460 V L1 is electrically coupled to the resistive heating elements 720 and 725 in series and L2 is electrically coupled to the resistive heating elements 730 and 735 in series. In this regard, with the resistive heaters connected in series, the heating elements 720, 725, 730, and 735 are each configured to draw power at about 230 V from the power supply so that the 460 V three-phase power supply is capable of supplying sufficient voltage to power each the resistive heaters. In this configuration, the circuit 736 acts simply as a diode bridge rectifier rather than a voltage doubler circuit to rectify the 460 V AC input voltage to 460 V DC so it can be used by the 24 V DC transformer 760.

It will be apparent to one skilled in the art that the circuits 26B and 26C, formed when using cords 1020 and 1030 as described above, will also properly operate the resistive heating elements and other on-board electrical components when coupled between the power cord interface and their corresponding power supplies. In addition, other configurations of the power cords 765, 770, 772, and 774 and electrical circuitry are contemplated herein for allowing the belt splicing apparatus to operate using other electrical inputs and standard power supply sources.

As described previously, the upper controller 415 can be configured to independently control the upper and lower heating elements 60 and 65. However, with the upper and lower heating elements 60 and 65 (resistive heating elements 520 and 525 in FIG. 20) in series, as described in one of the previous examples, the power supplied to the heating elements cannot be independently controlled. However, as is evident by reference to the internal control circuitry of the belt splicing apparatus 5 as illustrated in FIG. 24, the internal control system, including the control circuitry 700, facilitates independent control of the upper and lower heating element 60 and 65, because the resistive heaters 720 and 725 of the upper heating element 60 and the resistive heaters 730 and 735 of the lower heating element 65 draw power from the power source in parallel. In one embodiment such control may be achieved by varying the amount of power provided to the upper and lower heating elements 60 and 65, for example by varying the amount of time that the power is provided to the each of upper and lower heater assemblies or pairs of heaters. In this regard, the controller 415 can be electrically coupled to one or more switches or solid state relays 721 and 722 for gating the supply of power to the electrical components to regulate their operation.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. A self-contained, portable conveyor belt splicing apparatus for joining conveyor belt ends together, the portable conveyor belt splicing apparatus comprising:
a housing assembly including upper and lower housing frames having unclamped and clamped positions relative to the belt ends;
upper and lower platens of the upper and lower housing frames, respectively, each of a metallic material for being clamped on the belt ends with a clamping force with the upper and lower housing frames in the clamped position and without a substantially rigid heat absorbing member between the platens and the belt ends;
upper and lower heating elements for heating the upper and lower platens with the upper platen being between the upper heating element and the belt ends and the lower platen being between the lower heating element and the belt ends;
an on-board inflatable bladder mounted to the housing assembly;
an on-board air compressor mounted to the housing assembly for supplying the bladder with pressurized air to drive the clamped lower platen against the belt ends to increase clamping force applied thereto avoiding the need for an external pressurized air supply for supplying the pressurized air to the bladder; and an on-board fan device mounted to the housing assembly operable to draw ambient air for generating high volume airflow along the clamped platens and belt ends avoiding the need for an external air supply for supplying the housing assembly with air for the clamped platens and belt ends;

an on-board control system mounted to the housing assembly having circuitry connected to the heating elements and being configured to receive power from different types of standard power supplies and supply the power to the heating elements, the on-board air compressor, and the on-board fan device; and an on-board user operated control of the control system mounted to the housing assembly operable to control the heat applied by the heating elements to the respective platens.

2. The self-contained portable conveyor belt splicing apparatus of claim 1, wherein the upper housing frame has elongate upper wall portions, the fan device is mounted to the upper housing frame, and the upper wall portions include at least one vent opening that will not be covered by the belt ends extending out from either side of the housing frames to allow ambient air to be drawn unimpeded into the upper housing frame.

3. The self-contained portable conveyor belt splicing apparatus of claim 1, wherein the inflatable bladder and air compressor are mounted to the lower housing frame to avoid increasing the size of the upper housing frame therewith.

4. The portable conveyor belt splicing apparatus of claim 1, wherein the fan device is mounted only to the upper housing frame and the inflatable bladder comprises a hose only mounted to the lower housing frame to minimize the size of the housing assembly.

5. The portable conveyor belt splicing apparatus of claim 1, wherein the on-board control system includes an electrical connector, and a plurality of different source specific detachable power cords, each including a common electrical connector at one end thereof that is the same for each power cord and is configured for connecting to the on-board control system electrical connector and a source specific connector at the other end thereof that is different for each power cord and configured for connecting to a specific type of standard power supply.

6. The portable conveyor belt splicing apparatus of claim 1, wherein the upper and lower heating elements each include a pair of separate heating elements, and the control system is configured to independently supply power to the upper and lower pairs of heating elements to allow a power supply having a voltage rating greater than that of the heating elements to supply power thereto via the control system circuitry.

7. The portable conveyor belt splicing apparatus of claim 6, wherein the on-board control system includes a temperature sensor for sensing the temperature of one of the upper and lower heating elements, and the on-board user operated control is configured to allow the user to select the power supplied to the other heating element as a percentage of the power supplied to the one heating element.

8. The portable conveyor belt splicing apparatus of claim 1, wherein the upper and lower frame portions have outer surfaces and clamping devices each including a clamp actuator operable for generating the clamping force on the belt ends with the frame portions in the closed configuration, and a pivot mount of each of the clamping devices disposed inwardly of the outer surfaces so that the clamping devices have operable and stowed positions with the clamp actuators closely adjacent the outer surfaces in both the operable and stowed positions of the clamping devices.

9. The portable conveyor belt splicing apparatus of claim 1, wherein the housing assembly includes insulator plates arranged so that the on-board air compressor, the on-board control system, and the on-board fan device are insulated from heat generated by operation of the heating elements.

10. The portable conveyor belt splicing apparatus of claim 1, wherein the upper and lower heating elements extend along elongate central portions of the upper and lower platens respectively, and the upper and lower platens are formed of a predetermined material having a low thermal conductivity to restrict the flow of heat from the elongate central portions to the elongate side edge portions so that the side edge portions are cooler than the central portions without requiring any substantially rigid heat absorbing members positioned between the upper and lower platens and the belt ends, and the predetermined material has a low coefficient of thermal expansion and a low Young's modulus to avoid permanent deformation of the upper and lower platens despite temperature differences across the heated central portions and the cooler side portions.

11. A self-contained, portable conveyor belt splicing apparatus for joining conveyor belt ends together, the portable conveyor belt splicing apparatus comprising:

a housing assembly including upper and lower housing frames having unclamped and clamped positions relative to the belt ends;

upper and lower platens of the upper and lower housing frames, respectively, each of metallic material for being clamped on the belt ends with a clamping force with the upper and lower housing frames in the clamped position;

upper and lower heating elements for heating the upper and lower platens;

an on-board inflatable bladder mounted to the housing assembly;

an on-board air compressor mounted to the housing assembly for supplying the bladder with pressurized air to drive the clamped lower platen against the belt ends to increase clamping force applied thereto;

an on-board fan device mounted to the housing assembly operable to draw ambient air for generating high volume airflow along the clamped platens and belt ends;

an on-board control system mounted to the housing assembly having circuitry connected to the heating elements and being configured to receive power from different types of standard power supplies and supply the power to the heating elements, the on-board air compressor, and the on-board fan device;

an on-board user operated control of the control system mounted to the housing assembly operable to control the heat applied by the heating elements to the respective platens, wherein the fan device is mounted to the upper housing frame and the inflatable bladder comprises a hose mounted to the lower housing frame to minimize the size of the housing assembly, and the hose has an elongate hose body and opposite end portions, with the hose body extending lengthwise therebetween, and end clamps that extend across the end portions to seal the end portions, with the end clamps having a thin width configuration in the lengthwise direction of the hose body to maximize the effective length of the hose body applying pressure to the lower platen.

12. A self-contained, portable conveyor belt splicing apparatus for joining conveyor belt ends together, the portable conveyor belt splicing apparatus comprising:
- a housing assembly including upper and lower housing frames having unclamped and clamped positions relative to the belt ends;
- upper and lower platens of the upper and lower housing frames, respectively, each of metallic material for being clamped on the belt ends with a clamping force with the upper and lower housing frames in the clamped position;
- upper and lower heating elements for heating the upper and lower platens;
- an on-board inflatable bladder mounted to the housing assembly;
- an on-board air compressor mounted to the housing assembly for supplying the bladder with pressurized air to drive the clamped lower platen against the belt ends to increase clamping force applied thereto;
- an on-board fan device mounted to the housing assembly operable to draw ambient air for generating high volume airflow along the clamped platens and belt ends;
- an on-board control system mounted to the housing assembly having circuitry connected to the heating elements and being configured to receive power from different types of standard power supplies and supply the power to the heating elements, the on-board air compressor, and the on-board fan device; and
- an on-board user operated control of the control system mounted to the housing assembly operable to control the heat applied by the heating elements to the respective platens,
- wherein the heating elements have a predetermined voltage rating and the control system is configured to supply power to the upper and lower heating elements in parallel when the power supply voltage is about the same as the predetermined voltage rating of the heating elements and to supply power to the heating elements in series when the power supply voltage is larger than the predetermined voltage rating of the heating elements.

* * * * *